United States Patent
Murayama et al.

(10) Patent No.: US 6,778,242 B1
(45) Date of Patent: Aug. 17, 2004

(54) OPTICAL COMPENSATORY SHEET COMPRISING CELLULOSE ACETATE SUPPORT AND OPTICALLY ANISOTROPIC LAYER, AN ELLIPSOIDAL POLARIZING PLATE, AND A LIQUID CRYSTAL DISPLAY

(75) Inventors: Masahiko Murayama, Minami-ashigara (JP); Yosuke Nishiura, Minami-ashigara (JP); Yoshiharu Yabuki, Minami-ashigara (JP); Hiroyuki Mori, Minami-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/468,818

(22) Filed: Dec. 22, 1999

Related U.S. Application Data

(63) Continuation-in-part of application No. 09/174,464, filed on Oct. 19, 1998, now abandoned.

(30) Foreign Application Priority Data

Oct. 20, 1997 (JP) .............................................. 9-304838
Mar. 12, 1999 (JP) ........................................... 11-066723

(51) Int. Cl.$^7$ .................... G02F 1/1335; G02F 1/1337; G02F 1/1333; C09K 19/00
(52) U.S. Cl. ...................... 349/117; 349/118; 349/119; 349/120; 349/128; 349/158; 428/1.1
(58) Field of Search ................... 349/117, 118, 349/120, 119, 128, 158; 359/494, 500; 428/1.1

(56) References Cited

U.S. PATENT DOCUMENTS

| | | | |
|---|---|---|---|
| 4,499,043 A | 2/1985 | Yabe et al. ................. 264/207 |
| 5,134,507 A | * 7/1992 | Ishii ........................... 349/119 |
| 5,243,451 A | 9/1993 | Kanemoto et al. ............ 349/75 |
| 5,410,422 A | 4/1995 | Bos ............................. 349/117 |
| 5,462,621 A | * 10/1995 | Ishii |
| 5,528,400 A | * 6/1996 | Arakawa ..................... 349/117 |
| 5,541,753 A | 7/1996 | Raynes et al. .............. 349/117 |
| 5,583,679 A | 12/1996 | Ito et al. ..................... 349/118 |
| 5,646,703 A | 7/1997 | Kamada et al. ............. 349/118 |
| 5,730,900 A | * 3/1998 | Kawata ................. 252/299.01 |
| 5,805,253 A | 9/1998 | Mori et al. .................. 349/118 |
| 6,034,755 A | * 3/2000 | Watanabe .................... 349/118 |
| 2001/0026338 A1 | * 10/2001 | Aminaka ..................... 349/117 |

* cited by examiner

Primary Examiner—Tarifur R. Chowdhury
(74) Attorney, Agent, or Firm—Burns, Doane, Swecker & Mathis, LLP

(57) ABSTRACT

An optical compensatory sheet comprises a cellulose acetate support and an optically anisotropic layer. The optically anisotropic layer contains a discotic liquid crystal molecule. The cellulose acetate support has a $Bth^{550}$ birefringence in the range of 0.0007 to 0.004.

16 Claims, 11 Drawing Sheets

51
50
52

61
60

OPTICAL COMPENSATORY SHEET COMPRISING CELLULOSE ACETATE SUPPORT AND OPTICALLY ANISOTROPIC LAYER, AN ELLIPSOIDAL POLARIZING PLATE, AND A LIQUID CRYSTAL DISPLAY

CROSS-REFERENCE TO RELATED APPLICATION

This is a continuation-in-part application of U.S. patent application Ser. No. 09/174,464 filed on Oct. 19, 1998 now abandoned.

FIELD OF THE INVENTION

The present invention relates to an optical compensatory sheet comprising a cellulose acetate support and an optically anisotropic layer containing a discotic liquid crystal molecule. The invention also relates to an ellipsoidal polarizing plate comprising a transparent protective film, a polarizing membrane, a cellulose acetate support and an optically anisotropic layer in this order. The invention also relates to a liquid crystal display using the optical compensatory sheet.

BACKGROUND OF THE INVENTION

A cellulose acetate film is used in various photographic or optical elements because it has tough and enough flame retardant properties. The cellulose acetate film is used in a liquid crystal display (LCD). The cellulose acetate film has a high optical isotropy (a low birefringence) compared with other polymer films. Accordingly, the cellulose acetate film is usually used as an optical element requiring an optical isotropy, such as a protective film of a polarizing element or a color filter.

On the other hand, an optical compensatory sheet requires a high optical anisotropy (a high birefringence). Accordingly, a synthetic polymer film having a high birefringence, such as a polycarbonate film or a polysulfone film is usually used as the optical compensatory sheet.

Japanese Patent Provisional Publication Nos. 3(1991)-9325, 6(1994)-148429, 8(1996)-50206, 9(1997)-26572, U.S. Pat. Nos. 5,583,679 and 5,646,703 disclose another optical compensatory sheet, which comprises a transparent support and an optically anisotropic layer containing a discotic liquid crystal molecule. The high birefringence of the optical compensatory sheet is obtained by the optically anisotropic layer containing the discotic liquid crystal molecule. A cellulose acetate film is usually used as the transparent support, because the support preferably has a high optical isotropy (a low birefringence).

The above-mentioned optical compensatory sheet using the discotic liquid crystal molecule has usually been constructed to optically compensate a liquid crystal cell of a twisted nematic (TN) mode, which is used in a TFT liquid crystal display. If the optical compensatory sheet is used for a liquid crystal cell of another mode, such as a veritably aligned (VA) mode, an optically compensatory bend (OCB) mode or a hybrid aligned nematic (HAN) mode, the sheet cannot completely compensate the cell.

The optically anisotropic layer containing the discotic liquid crystal molecule can be used in combination with an optically anisotropic support. The optical anisotropy of the layer is combined with the optical anisotropy of the support to optically compensate the cell of the VA, OCB or HAN mode. A synthetic polymer film having a high birefringence, such as a polycarbonate film or a polysulfone film can be used as the optically anisotropic support. However, the synthetic polymer film is inferior as a support (physical properties and affinity with a coating layer). Therefore, the optically anisotropic support preferably is a lamination of the synthetic polymer film having a high birefringence and a cellulose acetate film, which is an excellent support, but has a low birefringence.

As is described above, a synthetic polymer film is used where the film should have an optical anisotropy (a high birefringence), while a cellulose acetate film is used where the film should have an optical isotropy (a low birefringence). This is a general principle in the technical field of an optical material such as an optical compensatory sheet.

SUMMARY OF THE INVENTION

The present inventors have tried to use a cellulose acetate film where the film should have an optical anisotropy (a high birefringence) against the general principle. The cellulose acetate film is superior as a support compared with a synthetic polymer film. If a cellulose acetate film has a high optical anisotropy (a high birefringence), the cellulose acetate film can be used as an optically anisotropic support of an optical compensatory sheet.

However, a cellulose acetate film having a low birefringence has been considered excellent according to prior art. Therefore, a method of increasing the birefringence of the cellulose acetate film has scarcely been studied, while a method of decreasing the birefringence has intensively been studied.

The present inventors have studied the method of increasing the birefringence of the cellulose acetate film, and have succeeded in obtaining a cellulose acetate film having a high birefringence.

An object of the present invention is to provide an optical compensatory sheet comprising a cellulose acetate film having a high birefringence and an optically anisotropic layer containing a discotic liquid crystal molecule.

Another object of the invention is to provide an ellipsoidal polarizing plate or a liquid crystal display using a cellulose acetate film as an optically anisotropic support.

The present invention provides an optical compensatory sheet comprising a cellulose acetate support comprising cellulose acetate, and an optically anisotropic layer containing a discotic liquid crystal molecule, wherein the cellulose acetate support has a $Bth^{550}$ birefringence defined by the following formula in the range of 0.0007 to 0.004:

$$Bth^{550} = \{(nx+ny)/2\} - nz$$

in which each of nx and ny is a principal refractive index measured by light of 550 nm in plane of the support; and nz is a principal refractive index measured by light of 550 nm along a thickness direction of the support.

The invention also provides an ellipsoidal polarizing plate comprising a transparent protective film, a polarizing membrane, a cellulose acetate support and an optically anisotropic layer containing a discotic liquid crystal molecule in this order, wherein the cellulose acetate support has a $Bth^{550}$ birefringence defined by the following formula in the range of 0.0007 to 0.004:

$$Bth^{550} = \{(nx+ny)/2\} - nz$$

in which each of nx and ny is a principal refractive index measured by light of 550 nm in plane of the support; and nz is a principal refractive index measured by light of 550 nm along a thickness direction of the support.

The invention further provides a liquid crystal display comprising a liquid crystal cell and two polarizing elements arranged on both sides of the liquid crystal cell, at least one of said polarizing elements being an ellipsoidal polarizing plate comprising a transparent protective film, a polarizing membrane, a cellulose acetate support and an optically anisotropic layer containing a discotic liquid crystal molecule in this order, wherein the cellulose acetate support has a $Bth^{550}$ birefringence defined by the following formula in the range of 0.0007 to 0.004:

$$Bth^{550} = \{(nx+ny)/2\} - nz$$

in which each of nx and ny is a principal refractive index measured by light of 550 nm in plane of the support; and nz is a principal refractive index measured by light of 550 nm along a thickness direction of the support.

The present inventors have succeeded on preparation of a cellulose acetate film having a $Bth^{550}$ birefringence in the range of 0.0007 to 0.004. The film can be prepared by (1) using a birefringence increasing agent, (2) adjusting an acetic acid content of cellulose acetate, or (3) a specific film forming method. The methods (1) to (3) of increasing the birefringence are described below. The obtained cellulose acetate film can be used as an optically anisotropic support of an optical compensatory sheet.

The optical compensatory sheet having the cellulose acetate support can advantageously be used in a liquid crystal display, particularly a display of a vertically aligned (VA), optically compensatory bend (OCB) or hybrid aligned nematic (HAN) mode.

BRIEF DESCRIPTION OF THE DRAWINGS

FIG. 17 is a sectional view schematically illustrating a reflective liquid crystal display using an ellipsoidal polarizing plate.

DETAILED DESCRIPTION OF THE INVENTION

[Cellulose Acetate]

Figure 1:
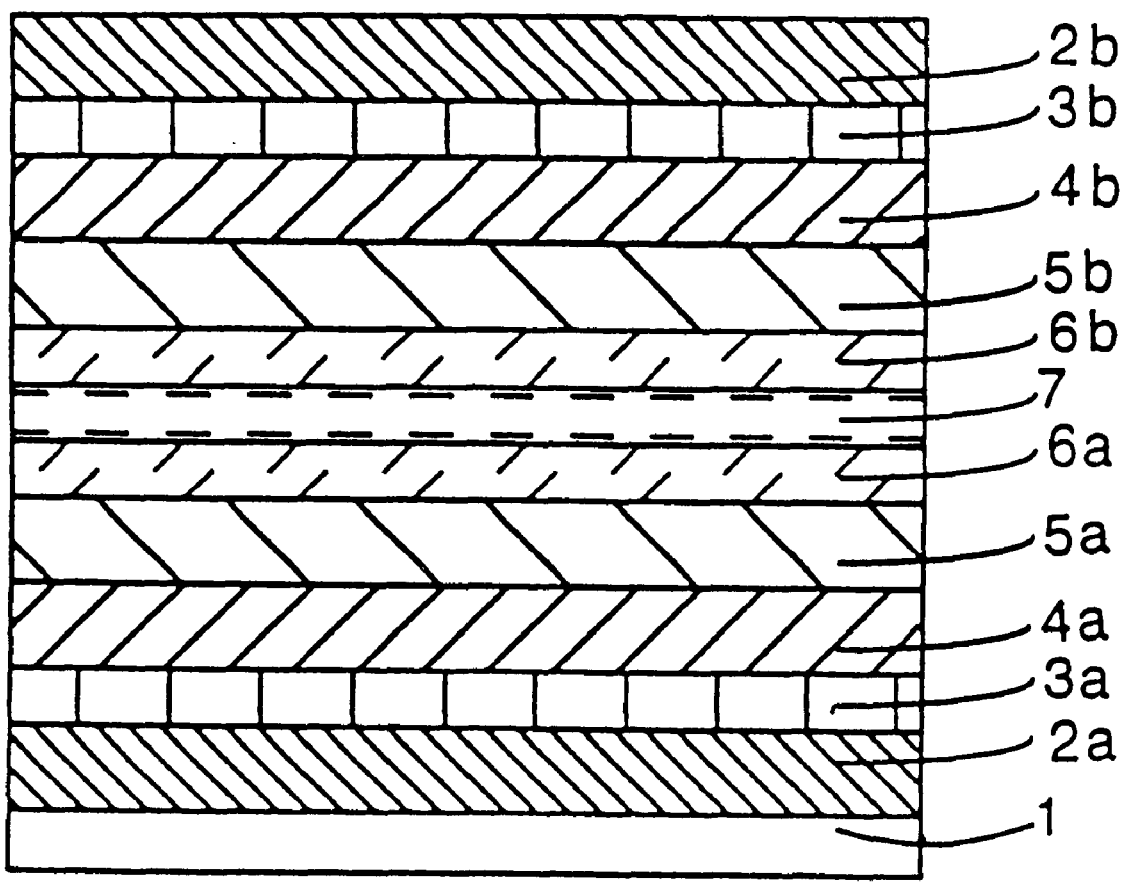
FIG. 1 is a sectional view schematically illustrating a liquid crystal display.

Cellulose acetate preferably has an average acetic acid content in the range of 55.0% to 62.5%. In view of the physical properties of the support, the acetic acid content is preferably in the range of 58.0% to 62.5%. On the other hand, a film having a high retardation value can be prepared by using cellulose acetate having an acetic acid content in the range of 55.0% to 58.0%.

The acetic acid content means the weight ratio of the combined acetic acid based on the amount of the cellulose unit. The acetic acid content can be measured and calculated according to ASTM, D-817-91 (Testing methods for cellulose acetate etc.).

Cellulose acetate preferably has a viscosity average degree of polymerization (DP) of not less than 250, and more preferably not less than 290.

Cellulose acetate preferably has a narrow molecular weight distribution in terms of Mw/Mn (wherein Mw means the weight average molecular weight, and Mn means the number average molecular weight). Mw and Mn can be measured by a gel permeation chromatography. The value of Mw/Mn is preferably in the range of 1.0 to 1.7, more preferably in the range of 1.30 to 1.65, and most preferably in the range of 1.40 to 1.60.

[Birefringence and Retardation Values of Cellulose Acetate Support]

The cellulose acetate support of the present invention has a $Bth^{550}$ birefringence in the range of 0.0007 to 0.004. The $Bth^{550}$ birefringence is defined by the following formula.

$$Bth^{550} = \{(nx+ny)/2\} - nz$$

in which each of nx and ny is a principal refractive index measured by light of 550 nm in plane of the support; and nz is a principal refractive index measured by light of 550 nm along a thickness direction of the support.

The $Bth^{550}$ birefringence is preferably in the range of 0.00075 to 0.004, more preferably in the range of 0.001 to 0.004, further preferably in the range of 0.0015 to 0.004, furthermore preferably in the range of 0.002 to 0.003, and most preferably in the range of 0.002 to 0.0025.

The cellulose acetate support preferably has a $Bi^{550}$ birefringence in the range of 0.0002 to 0.003. The $Bi^{550}$ birefringence is defined by the following formula:

$$Bi^{550}=|nx-ny|$$

in which each of nx and ny is a principal refractive index measured by light of 550 nm in plane of the support.

The $Bi^{550}$ birefringence is more preferably in the range of 0.0002 to 0.003.

A cellulose acetate support having a high $Bth^{550}$ birefringence can be prepared by (1) using a birefringence increasing agent, (2) adjusting an acetic acid content of cellulose acetate, or (3) a specific film forming method. The method (2), namely cellulose acetate having an acetic acid content in the range of 55.0% to 58.0% is described above at the item of Cellulose acetate. The method (1), namely a birefringence increasing agent is described below.

The method (3), namely a cooling dissolution method is also described below. Two or more methods can be used in combination.

The $Bi^{550}$ birefringence of the cellulose acetate film can be adjusted by stretching the film. The method of stretching the film is also described below.

The cellulose acetate support of the present invention preferably has a $Rth^{550}$ retardation value in the range of 70 to 400 nm. The $Rth^{550}$ retardation value is defined by the following formula:

$$Rth^{550}=[\{(nx+ny)/2\}-nz]\times d$$

in which each of nx and ny is a principal refractive index measured by light of 550 nm in plane of the support; nz is a principal refractive index measured by light of 550 nm along a thickness direction of the support; and d is a thickness of the support.

The $Rth^{550}$ retardation value is more preferably in the range of 75 to 400 nm, further preferably in the range of 100 to 400 nm, furthermore preferably in the range of 150 to 400 nm, still furthermore preferably in the range of 200 to 300 nm, and most preferably in the range of 200 to 250 nm.

The cellulose acetate support preferably has a $Re^{550}$ retardation value in the range of 20 to 300 nm. The $Re^{550}$ retardation value is defined by the following formula:

$$Re^{550}|nx-ny|\times d$$

in which each of nx and ny is a principal refractive index measured by light of 550 nm in plane of the support; and d is a thickness of the support. 30 The $Re^{550}$ retardation value is more preferably in the range of 30 to 300 nm.

The Re retardation value can be obtained by infringing light along a perpendicular direction to the film surface, and calculating the results based on the slow axis of the film. The Rth retardation value can be obtained by extrapolating the results of the Re retardation value by the results measured by infringing light along an inclined direction to the film surface. The measurement can be conducted by using an ellipsometer (for example, M-150, Japan Spectrum Co., Ltd.).

The absolute gradient (a) of the Rth distribution is preferably less than 0.0012. The Rth distribution is determined based on the $Rth^{550}$ retardation value as the standard value (=1). The gradient (a) is calculated by the $Rth^{400}$ retardation value (measured by using light of 400 nm), the $Rth^{550}$ retardation value and the $Rth^{700}$ retardation value (measured by using light of 700 nm) according to the following formula:

The gradient $(a)=|Rth^{700}-Rth^{400}|/300Rth^{550}$

Accordingly, the $Rth^{400}$, $Rth^{550}$ and $Rth^{700}$ retardation values preferably satisfy the following formula:

$$|Rth^{700}-Rth^{400}|/300Rth^{550}<0.0012$$

The $Rth^{400}$, $Rth^{550}$ and $Rth^{700}$ retardation values more preferably satisfy the following formula:

$$-0.0012<(Rth^{700}-Rth^{400})/300Rth^{550}<0.0006$$

The absolute gradient (b) of the Re distribution is preferably less than 0.002. The Re distribution is determined based on the $Re^{550}$ retardation value as the standard value (=1). The gradient (b) is calculated by the $Re^{400}$ retardation value (measured by using light of 400 nm), the $Re^{550}$ retardation value and the $Re^{700}$ retardation value (measured by using light of 700 nm) according to the following formula:

The gradient $(b)=|Re^{700}-Re^{400}|/300Re^{550}$

Accordingly, the $Re^{400}$, $Re^{550}$ and $Re^{700}$ retardation values preferably satisfy the following formula:

$$|Re^{700}-Re^{400}|/300Re^{550}<0.002$$

The $Re^{400}$, $Re^{550}$ and $Re^{700}$ retardation values more preferably satisfy the following formula:

$$-0.002<(Re^{700}-Re^{400})/300Re^{550}<0.001$$

[Birefringence Increasing Agent]

A birefringence increasing agent can be used to obtain a cellulose acetate support having a high birefringence. The birefringence increasing agent means a compound having a function of increasing the birefringence of a cellulose acetate film twice (usually twice to 10 times) based on a film to which the compound is not added. The amount of the compound should be so adjusted that a large amount of the compound does not cause a problem, such as a problem of bleeding out. The amount of the birefringence increasing agent is usually in the range of 0.3 to 20 weight parts based on 100 weight parts of cellulose acetate.

A compound having at least two aromatic rings can be used as the birefringence increasing agent. The compound having at least two aromatic rings has a plane of a π bond of at least seven carbon atoms. The birefringence increasing agent preferably has a molecular structure that does not cause a steric hindrance of the configuration between the two aromatic rings. According to study of the present inventors, one aromatic plane is preferably formed by two or more aromatic rings to increase a retardation value of a cellulose acetate film.

In the present specification, the term "aromatic ring" include an aromatic heterocyclic ring as well as an aromatic hydrocarbon ring. The aromatic hydrocarbon ring preferably is six-membered ring (namely benzene ring).

The aromatic heterocyclic ring usually is an unsaturated heterocyclic ring. The aromatic heterocyclic ring preferably is a five-membered or six-membered ring. The aromatic heterocyclic ring usually has the maximum number of double bonds. The hetero atom preferably is nitrogen, oxygen or sulfur, and most preferably is nitrogen. Examples of the aromatic heterocyclic rings include furan ring, thiophene ring, pyrrole ring, oxazole ring, isoxazole ring, thiazole ring, isothiazole ring, imidazole ring, pyrazole ring, furazan ring, triazole ring, pyran ring, pyridine ring; pyridazine ring, pyrimidine ring, pyrazine ring and 1,3,5-triazine ring.

The aromatic ring preferably is benzene ring, furan ring, thiophene ring, pyrrole ring, oxazole ring, thiazole ring, imidazole ring, triazole ring, pyridine ring, pyrimidine ring, pyrazine ring or 1,3,5-triazine ring.

The number of the aromatic rings contained in the birefringence increasing agent is preferably in the range of 2 to 20, more preferably in the range of 2 to 12, further preferably in the range of 2 to 8, and most preferably in the range of 2 to 6. Where three or more aromatic rings are contained in the birefringence increasing agent, the molecular structure preferably does not cause a steric hindrance of the configuration between at least two aromatic rings.

The two aromatic rings can be combined by (a) ring condensation, (b) a direct single bond, or (c) a linking group (no spiro bond can be formed because the rings are aromatic). In view of the function of increasing retardation, the bonds (a) to (c) are effective. In the case of (b) or (c), the molecular structure preferably does not cause a steric hindrance of the configuration between the two aromatic rings.

Examples of (a) the condensed rings (consisting of two or more aromatic rings) include indene ring, naphthalene ring, azulene ring, fluorene ring, phenanthrene ring, anthracene ring, acenaphthylene ring, biphenylene ring, naphthacene ring, pyrene ring, indole ring, isoindole ring, benzofuran ring, benzothiophene ring, indolizine ring, benzoxazole ring, benzothiazole ring, benzimidazole ring, benzotriazole ring, purine ring, indazole ring, chromene ring, quinoline ring, isoquinoline ring, quinolizine ring, quinazoline ring, cinnoline ring, quinoxaline ring, phthalazine ring, pteridine ring, carbazole ring, acridine ring, phenanthridine ring, xanthene ring, phenazine ring, phenothiazine ring, phenoxathiin ring, phenoxazine ring and thianthrene ring. Naphthalene ring, azulene ring, indole ring, benzoxazole ring, benzothiazole ring, benzimidazole ring, benzotriazole ring and quinoline ring are preferred.

The single bond of (b) is preferably attached to carbon atoms of the two aromatic rings. Two or more single bonds can be formed between the two aromatic rings to form an aliphatic or non-aromatic heterocyclic ring between the two aromatic rings.

The linking group of (c) is also preferably attached to carbon atoms of the two aromatic rings. The linking group preferably is an alkylene group, an alkenylene group, an alkynylene group, —CO—, —O—, —NH—, —S— or a combination thereof. Examples of the combined linking groups are shown below. In the following examples, the right and left sides are reversible.

c1: —CO—O—
c2: —CO—NH—
c3: —alkylene—O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic ring and the linking group may have a substituent group provided that the substituent group does not cause a steric hindrance of the configuration between the two aromatic rings. The steric hindrance is caused based on the nature and position of the substituent. group. A steric bulky group (for example, a tertiary alkyl group) tends to cause the steric hindrance. If a substituent group is attached to a position next to the position of a link (ortho position in benzene ring), the substituent group tends to cause the steric hindrance.

Examples of the substituent groups include a halogen atom (F, Cl, Br, I), hydroxyl, carboxyl, cyano, amino, nitro, sulfo, carbamoyl, sulfamoyl, ureido, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, an alkylsulfonyl group, an aliphatic amido group, an aliphatic sulfonamido group, an aliphatic substituted amino group, an aliphatic substituted carbamoyl group, an aliphatic substituted sulfamoyl group, an aliphatic substituted ureido group and a non-aromatic heterocyclic group.

The alkyl group preferably has 1 to 8 carbon atoms. The alkyl group preferably has a chain structure rather than a cyclic structure. A linear chain structure is particularly preferred. The alkyl group may further have a substituent group (e.g., hydroxyl, carboxyl, an,alkoxy group, an alkylamino group). Examples of the alkyl groups (including the substituted alkyl groups) include methyl, ethyl, n-butyl, n-hexyl, 2-hydroxyethyl, 4-carboxybutyl, 2-methoxyethyl and 2-diethylaminoethyl.

The alkenyl group preferably has 2 to 8 carbon atoms. The alkenyl group preferably has a chain structure rather than a cyclic structure. A linear chain structure is particularly preferred. The alkenyl group may further have a substituent group. Examples of the alkenyl groups include vinyl, allyl and 1-hexenyl.

The alkynyl group preferably has 2 to 8 carbon atoms. The alkynyl group preferably has a chain structure rather than a cyclic structure. A linear chain structure is particularly preferred. The alkynyl group may further have a substituent group. Examples of the alkynyl groups include ethynyl, 1-butynyl and 1-hexynyl.

The aliphatic acyl group preferably has 1 to 10 carbon atoms. Examples of the aliphatic acyl groups include acetyl, propanoyl and butanoyl.

The aliphatic acyloxy group preferably has 1 to 10 carbon atoms. Examples of the aliphatic acyloxy groups include acetoxy.

The alkoxy group preferably has 1 to 8 carbon atoms. The alkoxy group may have a substituent group (e.g., an alkoxy group). Examples of the alkoxy groups (including the substituted alkoxy groups) include methoxy, ethoxy, butoxy and methoxyethoxy.

The alkoxycarbonyl group preferably has 2 to 10 carbon atoms. Examples of the alkoxycarbonyl groups include methoxycarbonyl and ethoxycarbonyl.

The alkoxycarbonylamino group preferably has 2 to 10 carbon atoms. Examples of the alkoxycarbonylamino groups include methoxycarbonylamino and ethoxycarbonylamino.

The alkylthio group preferably 1 to 12 carbon atoms. Examples of the alkylthio groups include methylthio, ethylthio and octylthio.

The alkylsulfonyl group preferably has 1 to 8 carbon atoms. Examples of the alkylsulfonyl groups include methanesulfonyl and ethanesulfonyl.

The aliphatic amido group preferably has 1 to 10 carbon atoms. Examples of the aliphatic amido groups include acetamido.

The aliphatic sulfonamido group preferably has 1 to 8 carbon atoms. Examples of the aliphatic sulfonamido groups include methanesulfonamido, butanesulfonamido and n-octane-sulfonamido.

The aliphatic substituted amino group preferably has 1 to 10 carbon atoms. Examples of the aliphatic substituted amino groups include dimethylamino, diethylamino and 2-carboxyethylamino.

The aliphatic substituted carbamoyl group preferably has 2 to 10 carbon atoms. Examples of the aliphatic substituted carbamoyl groups include methylcarbamoyl and ethylcarbamoyl.

The aliphatic substituted sulfamoyl group preferably has 1 to 8 carbon atoms. Examples of the aliphatic substituted sulfamoyl groups include methylsulfamoyl and ethylsulfamoyl.

The aliphatic substituted ureido group preferably has 2 to 10 carbon atoms. Examples of the aliphatic substituted ureido groups include methylureido.

Examples of the non-aromatic heterocyclic groups include piperidino and morpholino.

The birefringence increasing agent has a molecular weight preferably in the range of 300 to 800. The birefringence increasing agent preferably has a boiling point of not lower than 260° C. The boiling point can be measured by using a commercially available machine (for example, TG/DTA100, Seiko Instruments Inc.).

Examples of the birefringence increasing agents are shown below. In the following examples, the aromaticity of a ring is represented by a circle.

(1)
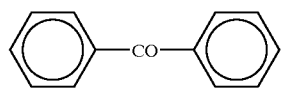

(2)
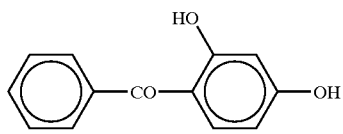

(3)
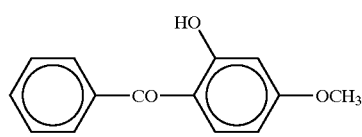

(4)
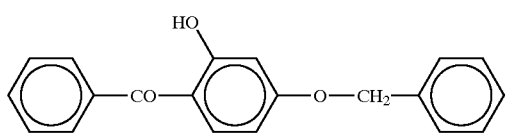

(5)
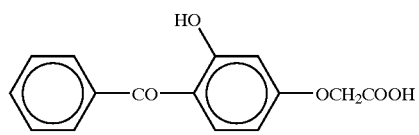

(6)
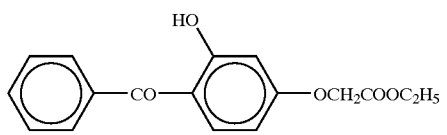

(7)
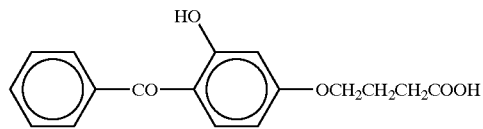

(8)
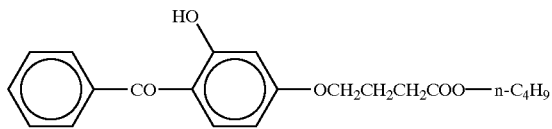

(9)
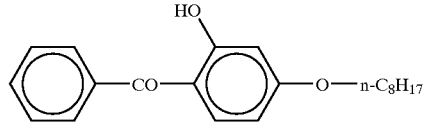

(10)
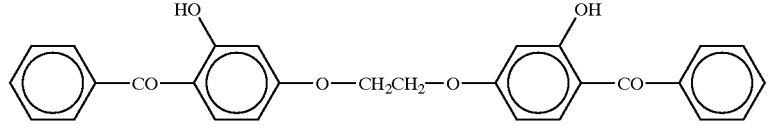

(11)
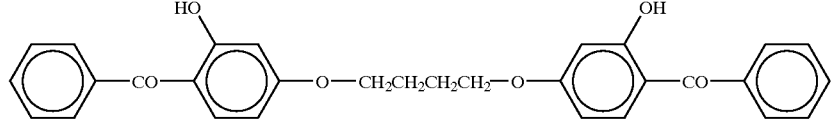

(12)
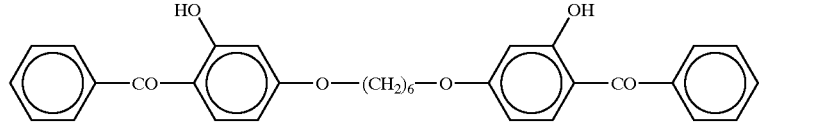

(13)
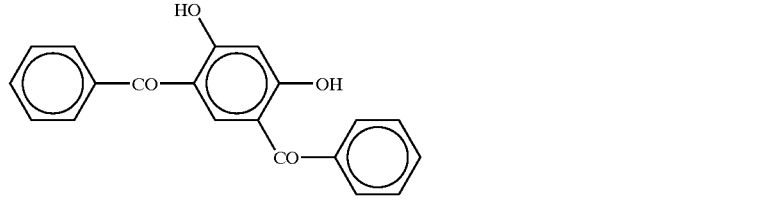

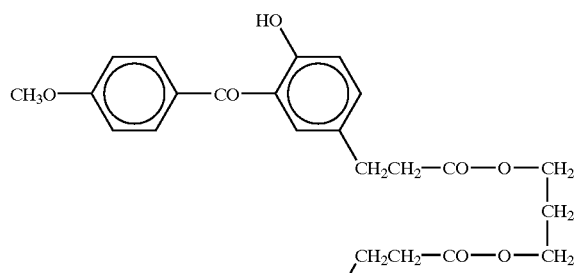
(14)
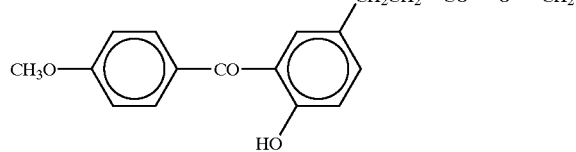
(15)
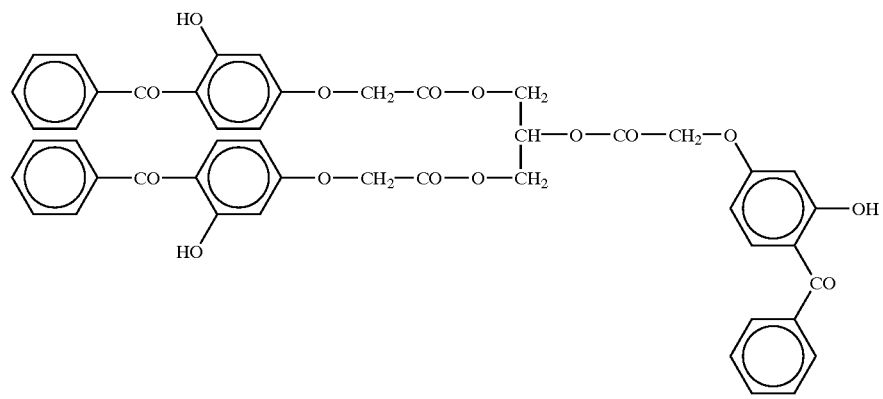
(16)
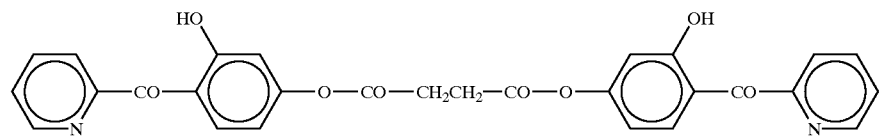
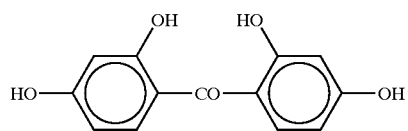
(17)
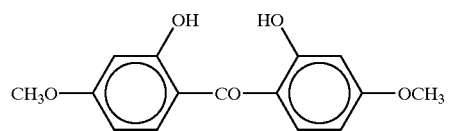
(18)
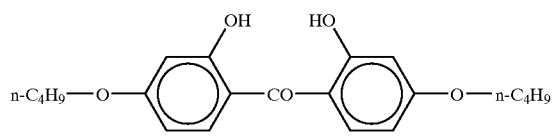
(19)
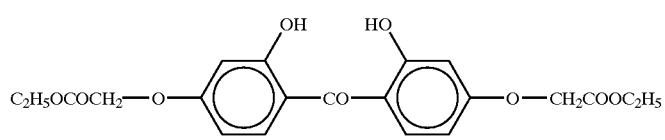
(20)
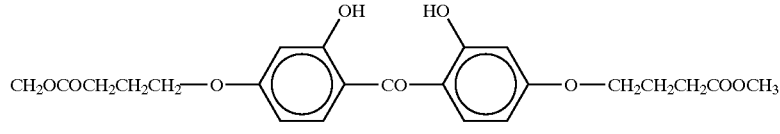
(21)
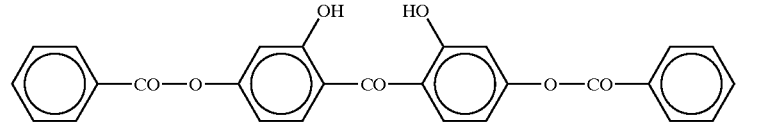
(22)

-continued
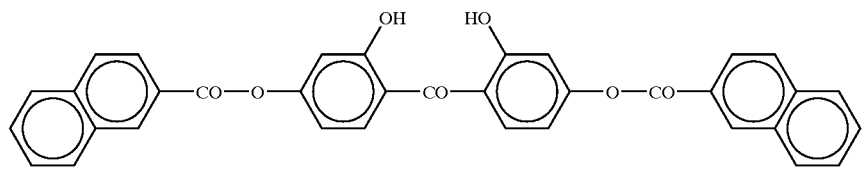
(23)
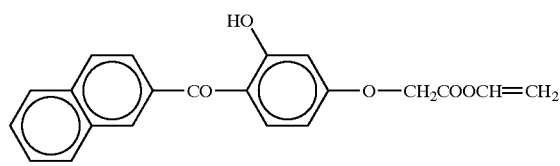
(24)
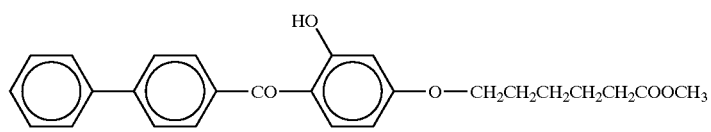
(25)
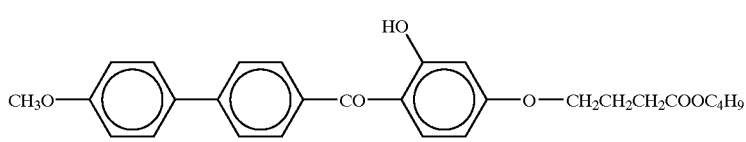
(26)
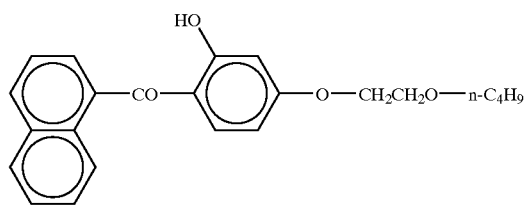
(27)
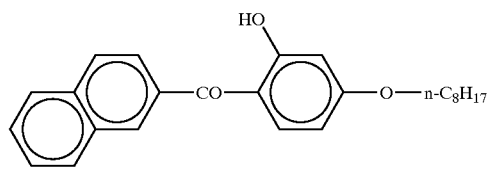
(28)
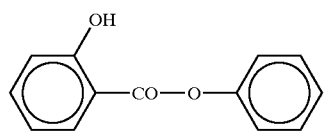
(29)
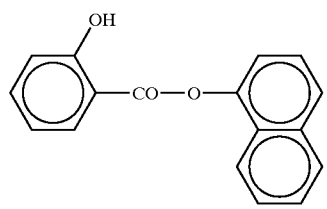
(30)
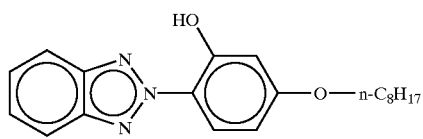
(31)
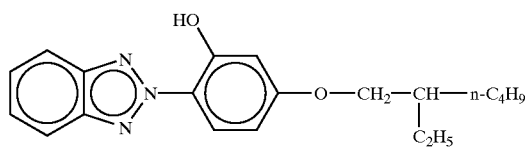
(32)
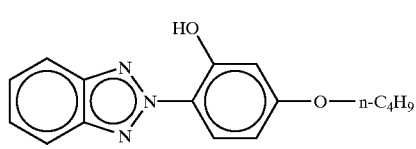
(33)
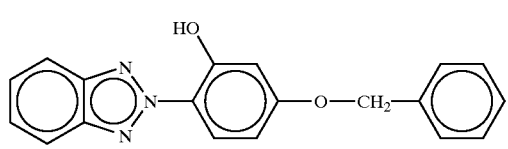
(34)

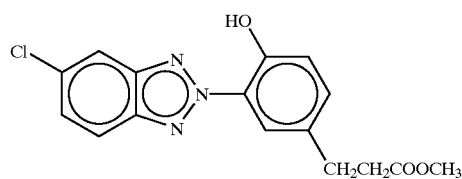
(35)
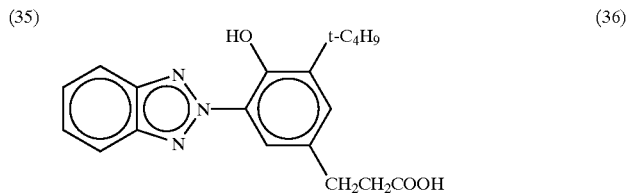
(36)
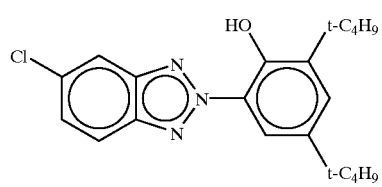
(37)
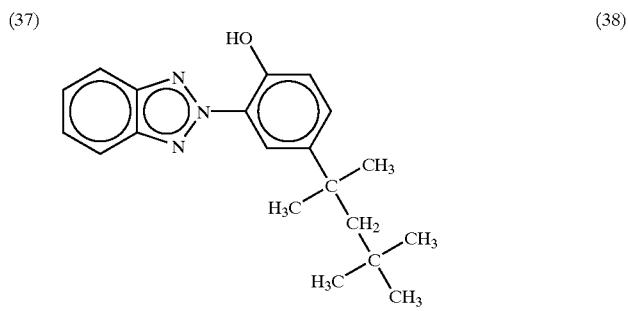
(38)
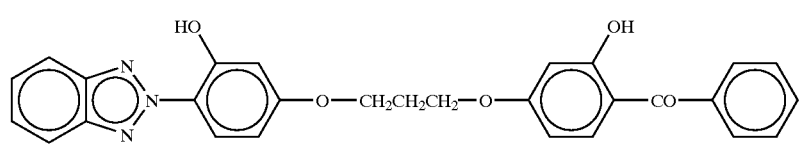
(39)
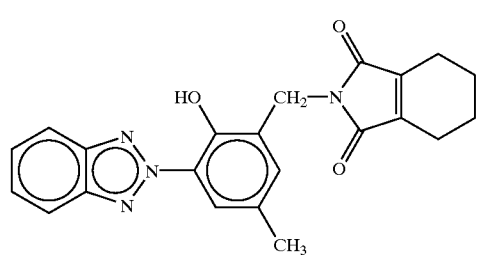
(40)
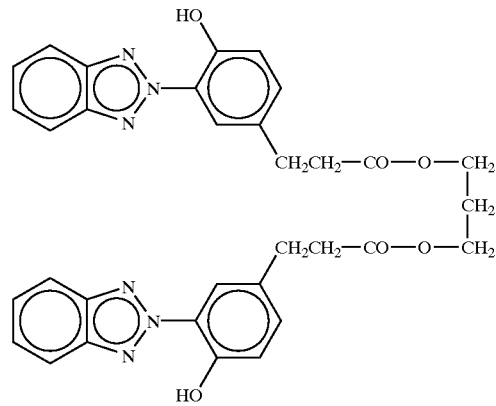
(41)
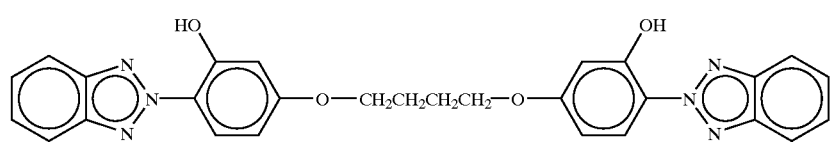
(42)
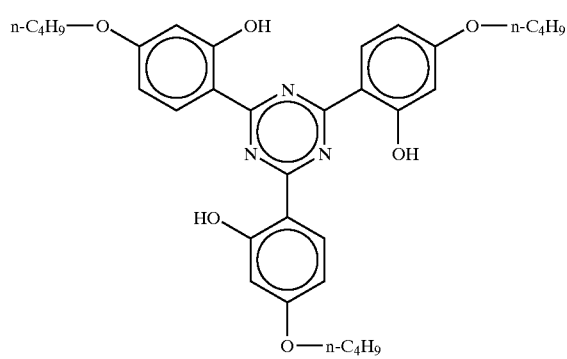
(43)

-continued
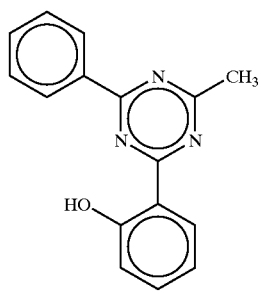
(44)
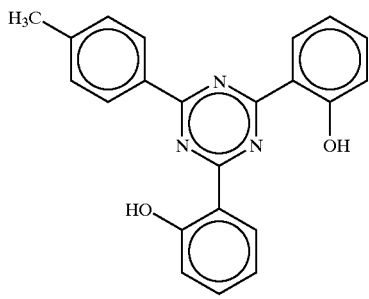
(45)
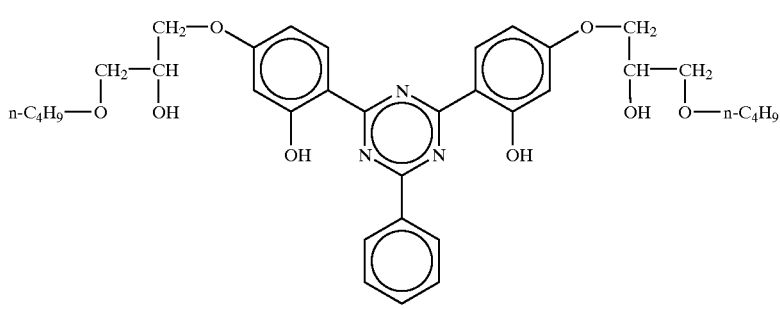
(46)
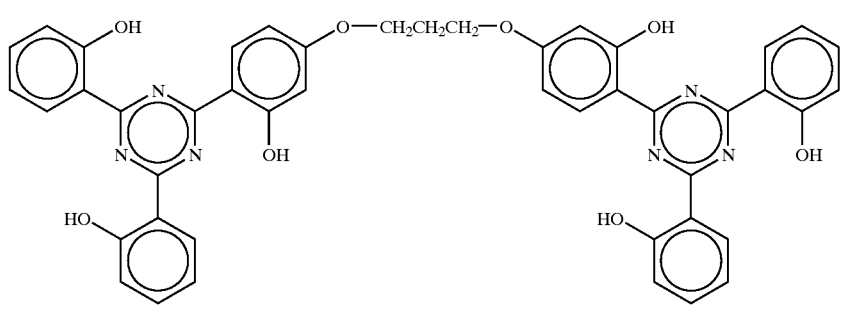
(47)
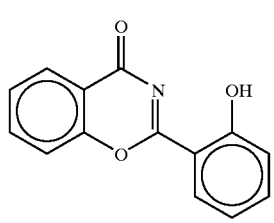
(48)
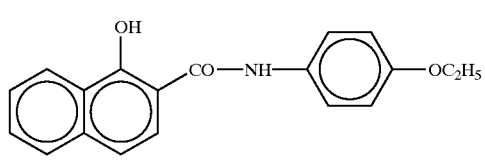
(49)
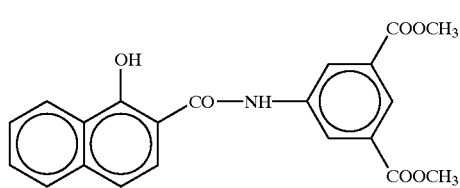
(50)
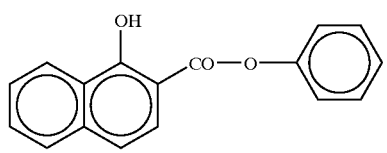
(51)

-continued
(52)
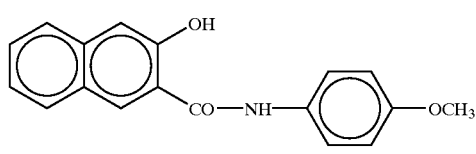
(53)
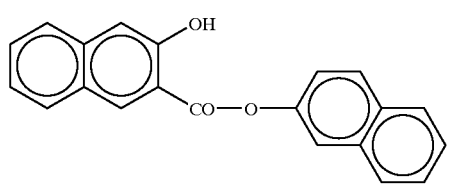
(54)
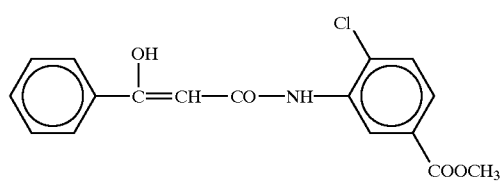
(55)
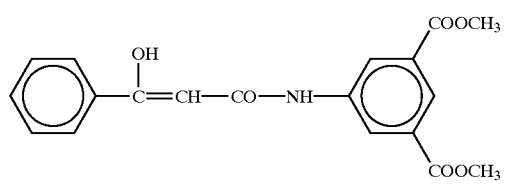
(56)
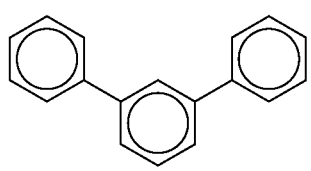
(57)
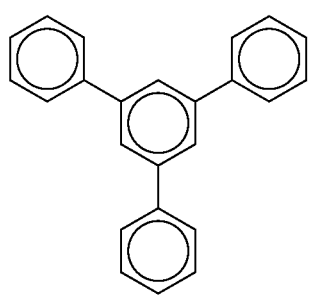
(58)
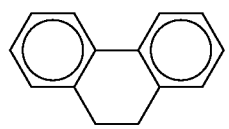
(59)
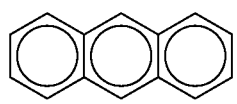
(60)
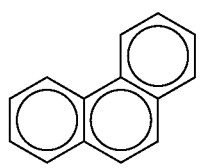
(61)
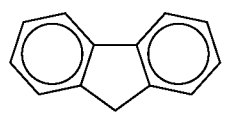
(62)
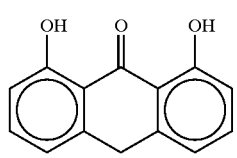
(63)
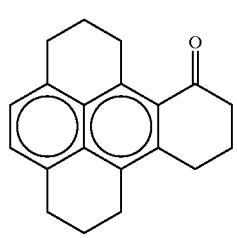
(64)

-continued
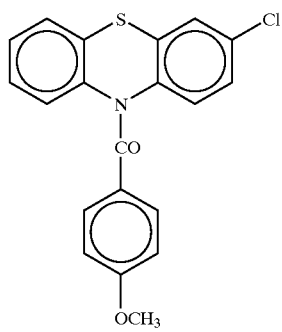 (65)
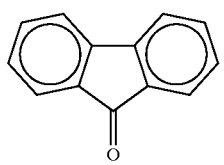 (66)
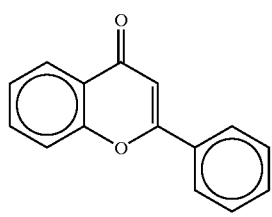 (67)
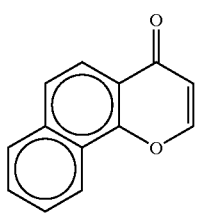 (68)
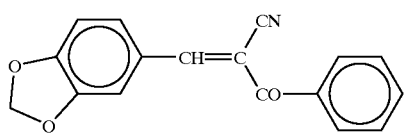 (69)
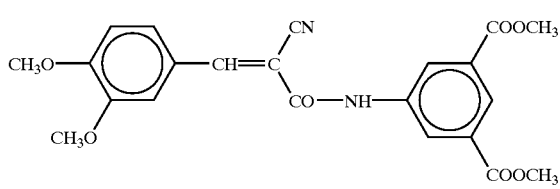 (70)
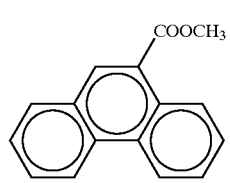 (71)
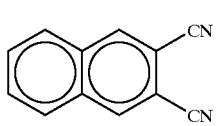 (72)
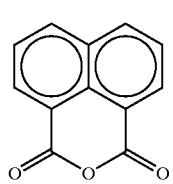 (73)
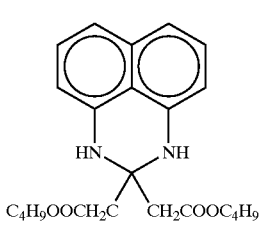 (74)
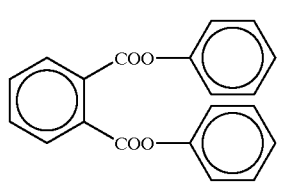 (75)
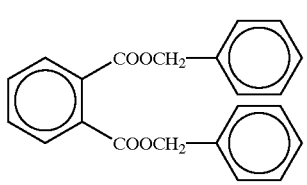 (76)

-continued
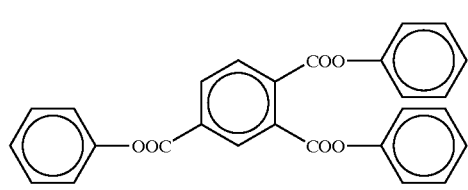 (77)
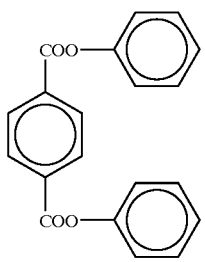 (78)
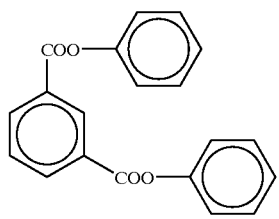 (79)
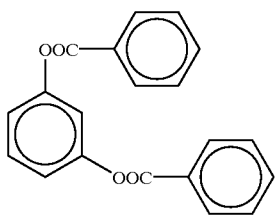 (80)
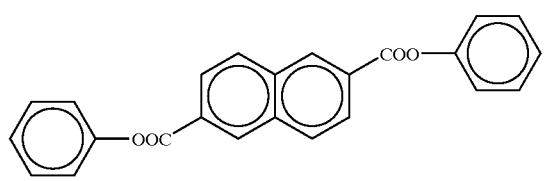 (81)
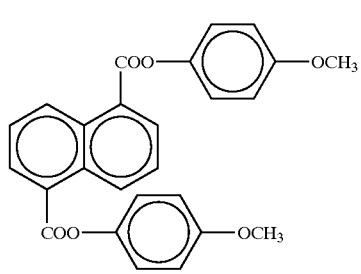 (82)
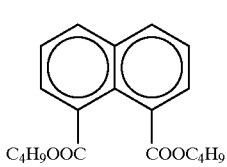 (83)
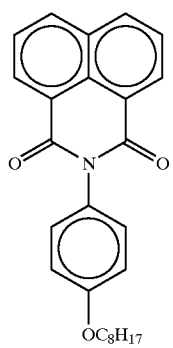 (84)
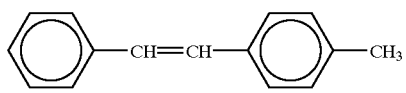 (85)
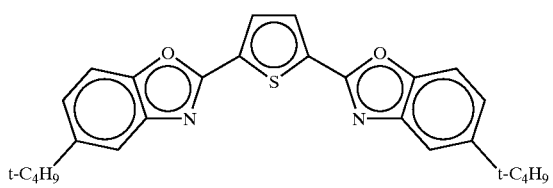 (86)

-continued
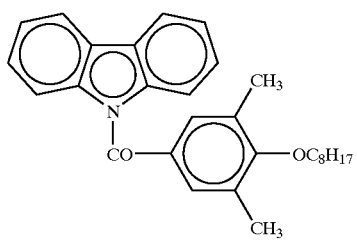 (87)
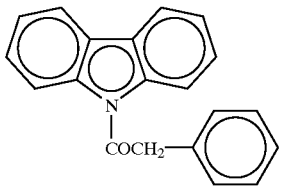 (88)
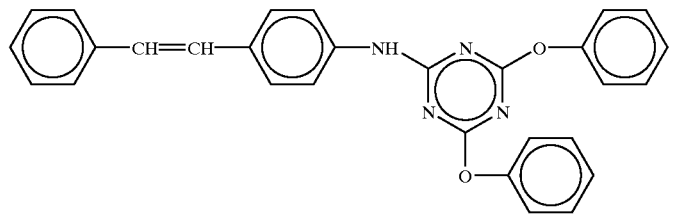 (89)
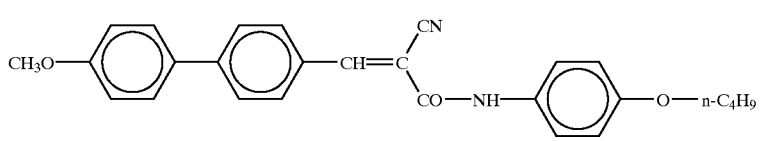 (90)
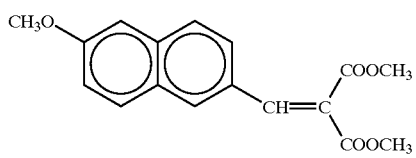 (91)
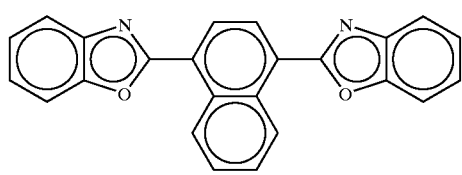 (92)
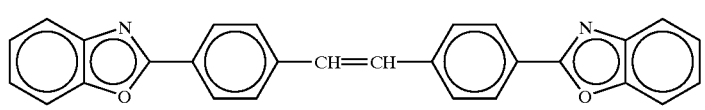 (93)
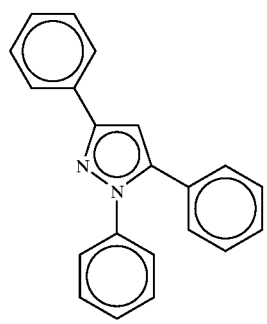 (94)
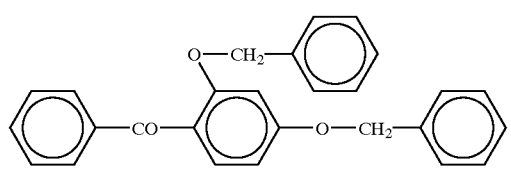 (95)

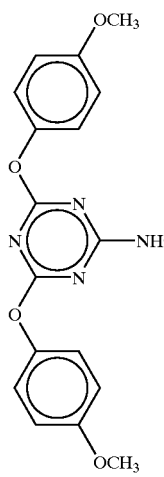 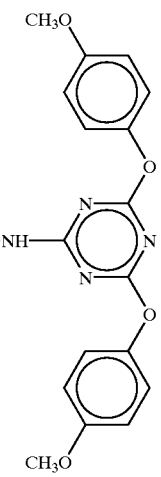

(96)

[Organic Solvent]

The cellulose acetate support is preferably prepared according to a solvent casting method. The solvent casting method comprises dissolving cellulose acetate in an organic solvent to prepare a solution (dope) and casting the dope to prepare a film.

The organic solvent is preferably selected from the group consisting of an ether having 3 to 12 carbon atoms, a ketone having 3 to 12 carbon atoms, an ester having 3 to 12 carbon atoms and a halogenated hydrocarbon having 1 to 6 carbon atoms.

The ether, ketone and ester may have a cyclic structure. A compound having two or more functional groups of the ether (—O—), ketone (—CO—) and ester (—COO—) can also be used as the organic solvent. The organic solvent can have another functional group, such as alcoholic hydroxyl. In the case that the organic solvent has two or more functional group, the number of the carbon atoms is defined as a compound having one functional group, which is optionally selected from the group of the organic solvents.

Examples of the ethers having 3 to 12 carbon atoms include diisopropyl ether, dimethoxymethane, 1,4-dioxane, 1,3-dioxolane, tetrahydrofuran, anisole and phenetole.

Examples of the ketones having 3 to 12 carbon atom include acetone, methyl ethyl ketone, diethyl ketone, cyclohexanone and methylcyclohexanone.

Examples of the esters having 3 to 12 carbon atoms include ethyl formate, propyl formate, pentyl formate, methyl acetate, ethyl acetate and pentyl acetate.

Examples of the compounds having two or more kinds of functional groups include 2-ethoxyethyl acetate, 2-methoxyethanol and 2-butoxyethanol.

The halogenated hydrocarbon preferably has one or two carbon atoms, and more preferably has one carbon atom. The halogen atom of the halogenated hydrocarbon preferably is chlorine. The ratio of the substitution of hydrogen with halogen is preferably in the range of 25 to 75 mole %, more preferably in the range of 30 to 70 mole %, further preferably in the range of 35 to 65 mole %, and most preferably in the range of 40 to 60 mole %. Methylene chloride is a representative halogenated hydrocarbon.

Two or more organic solvents can be used in combination.

The most preferred organic solvent is a mixture of three or more solvents. The first solvent of the mixture is selected from the group consisting of an ether having 3 to 12 carbon atoms, a ketone having 3 to 12 carbon atoms, an ester having 3 to 12 carbon atoms and a halogenated hydrocarbon having 1 to 6 carbon atoms. The second solvent of the mixture is a linear monohydric alcohol having 1 to 5 carbon atoms. The third solvent of the mixture is selected from the group consisting of an alcohol having a boiling point in the range of 30 to 170° C. and a hydrocarbon having a boiling point in the range of 30 to 170° C.

The first solvent (ether, ketone, ester or halogenated hydrocarbon) is described above.

The alcoholic hydroxyl of the second solvent is attached to the end carbon atom of the linear hydrocarbon chain (primary alcohol) or to the intermediate carbon atom of the chain (secondary alcohol). The second solvent is selected from the group consisting of methanol, ethanol, 1-propanol, 2-propanol, 1-butanol, 2-butanol, 1-pentanol, 2-pentanol and 3-pentanol. The second solvent preferably has 1 to 4 carbon atoms, more preferably has 1 to 3 carbon atoms, and most preferably has 1 or 2 carbon atoms. Ethanol is particularly preferred.

The alcohol of the third solvent preferably is monohydric. The hydrocarbon chain of the alcohol can have a linear, branched or cyclic structure. The hydrocarbon chain of the alcohol preferably is a saturated aliphatic hydrocarbon. Hydroxyl of the alcohol can be primary, secondary or tertiary.

Examples of the alcohols of the third solvent include methanol (boiling point: 64.65° C.), ethanol (78.325° C.), 1-propanol (97.15° C.), 2-propanol (82.4° C.), 1-butanol (117.9° C.), 2-butanol (99.5° C.), t-butanol (82.45° C.), 1-petanol (137.5° C.), 2-methyl-2-butanol (101.9° C.) and cyclohexanol (161° C.).

Though the alcohols of the third solvent overlap with the alcohols of the second solvent, an alcohol other than the alcohol used as the second solvent can be used as the third solvent. For example, where ethanol is used as the second solvent, the other alcohols (methanol, 1-propanol, 2-propanol, 1-butanol, 2-butanol, 1-pentanol, 2-pentanol and 3-pentanol) defined in the second solvent can be used as the third solvent.

The hydrocarbon of the third solvent can have a linear, branched or cyclic structure. The hydrocarbon can be aromatic or aliphatic. The aliphatic hydrocarbon can be saturated or not saturated.

Examples of the hydrocarbons of the third solvent include cyclohexane (boiling point: 80.7° C.), hexane (69° C.), benzene (80.1° C.), toluene (110.6° C.) and xylene (138.4 to 144.4° C.).

The mixed organic solvent contains the first solvent preferably in the range of 50 to 95 wt. %, more preferably in the range of 60 to 92 wt. %, further preferably in the range of 65 to 90 wt. %, and most preferably in the range of 70 to 88 wt. %. The mixed organic solvent contains the second solvent preferably in the range of 1 to 30 wt. %, more preferably in the range of 2 to 27 wt. %, further preferably in the range of 3 to 24 wt. %, and most preferably in the range of 4 to 22 wt. %. The mixed organic solvent contains the third solvent preferably in the range of 1 to 30 wt. %, more preferably in the range of 2 to 27 wt. %, further preferably in the range of 3 to 24 wt. %, and most preferably in the range of 4 to 22 wt. %.

Four or more organic solvents can be used in combination. The fourth solvent can be selected from the above-mentioned three (first, second and third) solvents. Further, nitromethane can be used as the fourth solvent.

[Preparation of Solution (Conventional Method)]

A cellulose acetate solution can be prepared according to a conventional method. The conventional method means that the solution is prepared at a temperature of not lower than 0° C. (ordinary or elevated temperature). The preparation of the solution can be conducted by using a process and apparatus for preparation of a dope in a conventional solvent casting method. The conventional method preferably uses a halogenated hydrocarbon (particularly methylene chloride) as an organic solvent.

The amount of cellulose acetate is so adjusted that a prepared solution contains cellulose acetate in an amount of 10 to 40 wt. %. The amount of cellulose acetate more preferably is 10 to 30 wt. %. An optional additive (described below) can be added to an organic solvent.

The solution can be prepared by stirring cellulose acetate and an organic solvent at an ordinary temperature (0 to 40° C.). A solution of a high concentration is preferably prepared by stirring them at an elevated temperature and at a high pressure. In more detail, cellulose acetate and the organic solvent are placed in a closed vessel, and are stirred at an elevated temperature and at a high pressure, which is higher than the boiling point of the solvent at atmospheric pressure and is lower than the boiling point of the solvent at the high pressure. The heating temperature is usually not lower than 40° C., preferably in the range of 60 to 200° C., and more preferably in the range of 80 to 110° C.

The components can be preliminary dispersed coarsely, and the coarse dispersion can be placed in the vessel. The components can also be placed in the vessel in series. The vessel should have a stirring device. A pressure can be formed in the vessel by inserting an inactive gas such as nitrogen gas into the vessel. The pressure can be a vapor pressure, which is formed by evaporation of the solvent by heating. Further, the components can be added to the vessel at a high pressure after the vessel is sealed.

The vessel is preferably heated outside. For example, the vessel can be heated by a jacket type heating apparatus. Further, a plate heater can be placed outside the vessel. Furthermore, a heated liquid can be circulated in a tube outside the vessel.

The components are stirred preferably by a stirring wing placed in the vessel. The stirring wing has such a length that the end of the wing reaches near the wall of the vessel. A scratching wing is preferably attached to the end of the stirring wing to scratch the solution retained along the wall of the vessel.

The vessel can have a meter such as a manometer or a thermometer. The components are dissolved in the solvent in the vessel. The prepared dope is cooled in the vessel, or the dope is cooled after the dope is taken out of the vessel. The dope can be cooled by a heat exchanger.

[Preparation of Solution (Cooling Dissolution Method)]

The solution can also be prepared according to a cooling dissolution method. According to the cooling dissolution method, cellulose acetate can be dissolved in various organic solvents (other than a halogenated hydrocarbon), in which cellulose acetate cannot be dissolved according to a conventional method. Even if cellulose acetate is dissolved in an organic solvent (such as a halogenated hydrocarbon), the cooling dissolution method can prepare a solution more quickly. Further, a cellulose acetate film having a high birefringence can be formed by using a solution prepared by the cooling dissolution method.

At the first stage of the cooling dissolution method, cellulose acetate is gradually added to an organic solvent while stirring at room temperature.

The amount of cellulose acetate is in the range of 10 to 40 wt. %, based on the amount of the mixture. The amount is preferably in the range of 10 to 30 wt. %. An optional additive (described below) may be added to the solvent.

At the next stage, the mixture is cooled to a temperature of −100 to −10° C., preferably −80 to −10° C., more preferably −50 to −20° C., and most preferably −50 to −30° C. The mixture can be cooled in a dry ice/methanol bath (−75° C.) or in a cooled diethylene glycol solution (−30 to −20° C.). At the cooling stage, the mixture of cellulose acetate and the solvent generally solidify.

The cooling rate is preferably faster than 4° C. per minute, more preferably faster than 8° C. per minute, and most preferably faster than 12° C. per minute. The cooling rate is preferably fast as possible. However, a theoretical upper limit of the cooling rate is 10,000° C. per second, a technical upper limit is 1,000° C. per second, and a practical upper limit is 100° C. per second. The cooling rate means the change of temperature at the cooling stage per the time taken to complete the cooling stage. The change of temperature means the difference between the temperature at which the cooling stage is started and the temperature at which the cooling stage is completed.

Subsequently, the mixture is warmed to a temperature of 0 to 200° C., preferably 0 to 150° C., more preferably 0 to 120° C., and most preferably 0 to 50° C. to dissolve the cellulose acetate in the solvent. The mixture can be warmed by keeping it at room temperature. The mixture can also be warmed on a bath.

The warming rate is preferably faster than 4° C. per minute, more preferably faster than 8° C. per minute, and most preferably faster than 12° C. per minute. The warming rate is preferably fast as possible. However, a theoretical upper limit of the warming rate is 10,000° C. per second, a technical upper limit is 1,000° C. per second, and a practical upper limit is 100° C. per second. The warming rate means the change of temperature at the warming stage per the time taken to complete the warming stage. The change of temperature means the difference between the temperature at which the warming stage is started and the temperature at which the warming stage is completed.

Thus a dope is formed as a uniform solution. If cellulose acetate is not sufficiently dissolved, the cooling and warming steps can be repeated. The dope is observed with eyes to determine whether cellulose acetate is sufficiently dissolved or not.

A sealed vessel is preferably used in the cooling dissolution method to prevent contamination of water, which is caused by dew condensation at the cooling step. The time for the cooling and warming stages can be shortened by conducting the cooling step at a high pressure and conducting the warming step at a low pressure. A pressure vessel is preferably used at a high or low pressure.

In the case that cellulose acetate (acetic acid content: 60.9%, viscosity average degree of polymerization: 299) is dissolved in methyl acetate by a cooling dissolution method to form 20 wt. % solution, the solution has a pseudo sol-gel phase transition point at about 33° C., which is measured by a viscoelastic rheology analysis (for example, with Oscillation procedure of TA Instruments CSL2 Rheometer). Under the transition point, the solution forms a uniform gel. Therefore, the solution should be stored at a temperature higher than the transition point, preferably at a temperature about 10° C. higher than the point. The pseudo sol-gel phase transition point depends on the combined average acetic acid content of cellulose acetate, the viscosity average degree of polymerization, the concentration of the dope and the nature of the solvent.

[Preparation of film]

The obtained cellulose acetate solution (dope) is cast on a support, and the solvent is evaporated to form a cellulose acetate film. A drum or a band is used as the support.

Before casting the dope, the concentration of the dope is so adjusted that the solid content of the dope is in the range of 18 to 35 wt. %. The surface of the drum or band is preferably polished to give a mirror plane. The casting and drying stages of the solvent cast methods are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

The drum or band preferably has a surface temperature of not higher than 10° C. when the dope is cast on the support. After casting the dope, the dope is preferably dried with air for at least 2 seconds. The formed film is peeled off the drum or band, and the film can be further dried with air to remove the solvent remaining in the film. The temperature of the air can be gradually elevated from 100 to 160° C. The above-mentioned method is described in 30 Japanese Patent Publication No. 5(1993)-17844. According to the method, the time for casting and peeling steps can be shortened. The method requires that the dope be set to gel at the surface temperature of the drum or band. The dope formed according to the present invention satisfies the requirement.

The cellulose acetate film has a thickness preferably in the range of 40 to 120, and more preferably in the range of 70 to 100 μm.

[Other Additives]

A plasticizer can be added to the cellulose acetate film to improve the mechanical strength of the film. The plasticizer has another function of shortening the time for the drying process. Phosphoric esters and carboxylic esters (such as phthalic esters and citric esters) are usually used as the plasticizer. Examples of the phosphoric esters include triphenyl phosphate (TPP) and tricresyl phosphate (TCP). Examples of the phthalic esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric esters include triethyl o-acetylcitrate (OACTE) and tributyl o-acetylcitrate (OACTB). Examples of the carboxylic esters include phthalic esters and citric esters. Examples of the other carboxylic esters include butyl oleate, methylacetyl ricinoleate, dibutyl sebacate and various trimellitic esters. Phthalic ester plasticizers (DMP, DEP, DBP, DOP, DPP, DEHP) are preferred. DEP and DPP are particularly preferred.

The amount of the plasticizer is preferably in the range of 0.1 to 25 wt. %, more preferably in the range of 1 to 20 wt. %, and most preferably in the range of 3 to 15 wt. % based on the amount of cellulose acetate.

Deterioration inhibitors (e.g., peroxide decomposer, radical inhibitor, metal inactivating agent, oxygen scavenger) or ultraviolet inhibitors can be incorporated into the cellulose acetate film. The deterioration inhibitors are described in Japanese Patent Provisional Publication No. 5(1993)-197073. The deterioration inhibitor is preferably in the range of 0.01 to 1 wt. %, and more preferably in the range of 0.01 to 0.2 wt. % based on the amount of the repared solution (dope). If the amount is less than 0.01 wt. %, the effect of the deterioration inhibitor. If the amount is more than 1 wt. %, the inhibitor would bleed out on the surface of the film. Butyrated hydroxytoluene (BHT) is a particularly preferred deterioration inhibitor. The ultraviolet inhibitors are described in Japanese Patent Provisional Publication No. 7(1995)-11056.

Cellulose acetate having an average acetic acid content of 55.0 to 58.0% is usually inferior to cellulose acetate having an average acetic acid content of higher than 58.0% in view of stability of the solution and physical properties of the film. However, the problem can substantially be solved by using the deterioration inhibitor such as butyrated hydroxytoluene (BHT).

[Stretch of Film]

The obtained cellulose acetate film can be stretched to increase the Bi birefringence or the Re retardation value of the film. The stretching process can be conducted at room temperature or at an elevated temperature, which preferably is not higher than the glass transition temperature of the film.

The film can be stretched by using a tenter while drying the film. The film can be stretched while conveying the film by rollers. For example, the film is stretched where a second roller is faster than the first roller. Further, the film can also be stretched by using a stretching machine after drying the film. An uniaxial-stretching is preferred.

The stretch ratio (the ratio of the increase of the length or width to the original length or width) is preferably in the range of 10 to 30%.

[Surface Treatment of Film]

The cellulose acetate film can be subjected to a surface treatment, which is conducted to improve the adhesion between the film (transparent support) and a polarizing membrane. The surface treatments include a corona discharge treatment, a glow discharge treatment, a flame treatment, an acid treatment, an alkaline treatment and an ultraviolet irradiation treatment.

The corona discharge treatment and the glow discharge treatment can be conducted by using a commercially available discharging machine.

The discharge treatment is preferably conducted in the presence of steam. The partial pressure of the steam is preferably in the range of 10 to 100%, and more preferably in the range of 40 to 90%. The discharge treatment is preferably conducted after preheating the film. The preheating temperature is preferably higher than 50° C., more preferably higher than 70° C., and most preferably higher than 80° C. The higher limit of the preheating temperature is the glass transition temperature of the cellulose acetate.

The degree of vacuum at the glow discharge treatment is preferably in the range of 0.005 to 20 Torr, and more preferably in the range of 0.02 to 2 Torr. The voltage at the glow discharge treatment is preferably in the range of 500 to 5,000 V, and more preferably in the range of 500 to 3,000 V. The glow discharge frequency is preferably in the range of 50 Hz to 20 MHz, and more preferably in the range of 1 KHz to 1 MHz. The glow discharge strength is preferably in the range of 0.01 to 5 KV·A·min/m², and more preferably in the range of 0.15 to 1 KV·A·min/m².

The film is preferably cooled immediately after the discharge treatment.

The important factor of the flame treatment is the ratio of the gas (natural gas, propane gas) to the air. The volume ratio of the gas to the air is preferably in the range of 1/13 to 1/21, and more preferably in the range of 1/14 to 1/20. The energy of the flame treatment based the surface of the film is preferably in the range of 1 to 50 kcal/m². The distance between the top of the inner flame and the surface of the film is preferably shorter than 4 cm.

The acid treatment preferably uses an inorganic acid, such as hydrochloric acid, sulfuric acid or nitric acid. The alkali treatment preferably uses hydroxide of alkali atom such as sodium hydroxide or potassium hydroxide. The acid or alkali treatment is conducted by immersing a film (the side to which a polarizing membrane is attached) in an aqueous acid or alkali solution. The film is immersed in the solution preferably for 30 seconds to 10 minutes. After immersing the film in the solution, the film is preferably washed with water.

The wavelength of the ultraviolet ray at the ultraviolet irradiation treatment is preferably in the range of 220 to 380 nm. The exposure of the ultraviolet ray is preferably in the range of 20 to 10,000 mJ/cm³, more preferably in the range of 50 to 2,000 mJ/cm³ and most preferably in the range of 100 to 1,500 mJ/cm³.

The acid or alkali treatment is preferred. The acid or alkali treatment can function as a saponification treatment of the cellulose acetate film.

The other side of the film (on which an orientation layer or an optically anisotropic layer is provided) is preferably not subjected to a surface treatment. After forming an optically anisotropic layer on the film, the lamination of the layer and the film can be immersed in an acid or alkali solution to subject only one surface of the film (to which a polarizing membrane is attached) to the acid or alkali treatment.

A gelatin undercoating layer is preferably provided between the transparent support and the orientation layer or the optically anisotropic layer. The gelatin undercoating layer has a thickness preferably in the range of 0.01 to 1 μm, more preferably in the range of 0.02 to 0.5 μm, and most preferably in the range of 0.05 to 0.2 μm.

Figure 16:
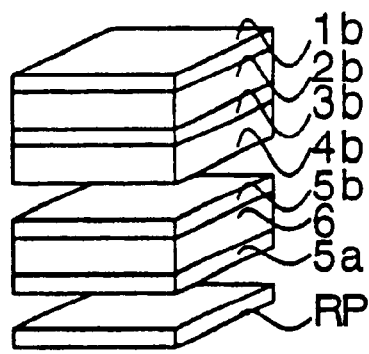
FIG. 16 is a sectional view schematically illustrating a transmissive liquid crystal display using an ellipsoidal polarizing plate.

FIG. 16 is a sectional view schematically illustrating a transmissive liquid crystal display using an ellipsoidal polarizing plate.

The liquid crystal display shown in (a) of FIG. 16 comprises a backlight (BL), a transparent protective film (1a), a polarizing membrane (2a), a transparent support (3a), an optically anisotropic layer (4a), a lower substrate of a liquid crystal cell (5a), a rod-like liquid crystal layer (6), an upper substrate of a liquid crystal cell (5b), an optically anisotropic layer (4b), a transparent support (3b), a polarizing membrane (2b) and a transparent protective film (1b) in this order. One ellipsoidal polarizing plate comprises the transparent protective film (1a), the polarizing membrane (2a), the transparent support (3a) and the optically anisotropic layer (4a). The other ellipsoidal polarizing plate comprises the optically anisotropic layer (4b), the transparent support (3b), the polarizing membrane (2b) and the transparent protective film (1b).

The liquid crystal display shown in (b) of FIG. 16 comprises a backlight (BL), a transparent protective film (1a), a polarizing membrane (2a), a transparent support (3a), an optically anisotropic layer (4a), a lower substrate of a liquid crystal cell (5a), a rod-like liquid crystal layer (6), an upper substrate of a liquid crystal cell (5b), a transparent protective film (1b), a polarizing membrane (2b) and a transparent protective film (1c) in this order. An ellipsoidal polarizing plate comprises the transparent protective film (1a), the polarizing membrane (2a), the transparent support (3a) and the optically anisotropic layer (4a).

The liquid crystal display shown in (c) of FIG. 16 comprises a backlight (BL), a transparent protective film (1a), a polarizing membrane (2a), a transparent protective film (1b), a lower substrate of a liquid crystal cell (5a), a rod-like liquid crystal layer (6), an upper substrate of a liquid crystal cell (5b), an optically anisbtropic layer (4b), a transparent support (3b), a polarizing membrane (2b) and a transparent protective film (1c) in this order. An ellipsoidal polarizing plate.comprises the optically anisotropic layer (4b), the transparent support (3b), the polarizing membrane (2b) and the transparent protective film (1c).

FIG. 17 is a sectional view schematically illustrating a reflective liquid crystal display using an ellipsoidal polarizing plate.

The liquid crystal display shown in FIG. 17 comprises a reflective plate (RP), a lower substrate of a liquid crystal cell (5a), a rod-like liquid crystal layer (6), an upper substrate of a liquid crystal cell (5b), an optically anisotropic layer (4b), a transparent support (3b), a polarizing membrane (2b) and a transparent protective film (1b) in this order. An ellipsoidal polarizing plate comprises the optically anisotropic layer (4b), the transparent support (3b), the polarizing membrane (2b) and the transparent protective film (1b).

[Structure of Liquid Crystal Display]

The obtained cellulose acetate film is used as an optical anisotropic support of an optical compensatory sheet. The optical compensatory sheet comprises the support and an optically anisotropic layer containing a discotic liquid crystal molecule. The optical compensatory sheet is advantageously used in a liquid crystal display.

The liquid crystal display usually comprises a liquid crystal cell, two polarizing elements arranged on both sides of the liquid crystal cell, and at least one optical compensatory sheet arranged between the liquid crystal cell and at least one of the polarizing elements.

The structure of a representative liquid crystal display is described below referring to FIG. 1.

FIG. 1 is a sectional view schematically illustrating a liquid crystal display.

A liquid crystal layer (7) is arranged between resin substrates (5a, 5b). Transparent electrode layers (6a, 6b) are provided on the liquid crystal side of the resin substrates (5a, 5b). A liquid crystal cell comprises the above-mentioned liquid crystal layer, transparent electrode layers and substrates (5 to 7).

Two optical compensatory sheets (4a, 4b) are attached to both sides of the liquid crystal cell. The optical compensatory sheet comprises a support and an optically anisotropic layer. The optically anisotropic layer is provided between the support and the substrate (5a or 5b) of the liquid crystal display. The optical compensatory sheets (4a, 4b) functions of protecting the surface of a polarizing film (3a or 3b) on which the protective film (2a or 2b) is not provided.

Two polarizing elements (2a, 2b, 3a, 3b) are attached to both sides of the optical compensatory sheets (4a, 4b). The polarizing elements comprise protective films (2a, 2b) and polarizing films (3a, 3b).

The liquid crystal display shown in FIG. 1 further comprises a surface treating film (1) on one polarizing element.

The surface treating film (1) is provided on the side from which an image is observed. A back light of the liquid crystal display is provided on the reverse side (the side of 2b).

The liquid crystal layer of the liquid crystal cell is usually prepared by inserting liquid crystal into a space formed by two substrates and a spacer. The transparent electrode layer is prepared by forming a transparent membrane containing an electroconductive substance: on the substrate.

A gas barrier layer, a hardcoating layer or an undercoating layer (used as an adhesive layer of the transparent electrode layer) can be provided in the liquid crystal cell. The layers are usually formed on the substrate.

The substrate of the liquid crystal cell has a thickness usually in the range of 80 to 500 µm.

The polarizing films of the polarizing elements include an iodine polarizing film, a dye such as a dichromatic dye polarizing film and a polyene polarizing film. The polarizing film is usually made of a polyvinyl alcohol film.

The protective film of the polarizing element has a thickness preferably in the range of 25 to 350 µm, and more preferably in the range of 50 to 200 µm.

A surface treating film can be provided, as is shown in FIG. 1. The surface treating film can function as a hard coating layer, an anti-fogging layer, an antiirradiation layer or an antireflection layer.

The cellulose acetate support of the optical compensatory sheet is described above. The optically anisotropic layer containing a discotic liquid crystal molecule of the optical compensatory sheet is described below.

[Optically Anisotropic Layer]

The optically anisotropic layer contains a discotic liquid crystal molecule. The discotic liquid crystal molecule preferably is negative uniaxial, and preferably is obliquely aligned. The discotic liquid crystal molecule preferably has a hybrid alignment, wherein the inclined angles (between the discotic planes and the planes parallel to the support) are changed along a normal line of the support. The discotic liquid crystal molecule has an optic axis along a normal line of the discotic plane. The birefringence along the discotic plane is larger than that along the optic axis.

The discotic liquid crystal molecule can also be aligned along the surface of the support, wherein the average inclined angle (between the discotic planes and the planes parallel to the support) is less than 5°.

An optically anisotropic layer is preferably formed by aligning a discotic liquid crystal molecule by an orientation layer, and fixing the alignment of the discotic liquid crystal molecule. The discotic liquid crystal molecule is fixed preferably by a polymerization reaction.

The minimum retardation value in the optically anisotropic layer is preferably larger than 0. In other words, a direction having retardation of 0 preferably is not present in the optically anisotropic layer.

The discotic liquid crystal molecule is described in various documents (C. Destrade et al., Mol. Crysr. Liq. Cryst., vol. 71, page 111 (1981); Japan Chemical Society, Quarterly Chemical Review (written in Japanese), chapter 5, and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994)). The polymerization reaction of the discotic liquid crystal molecule is described in Japanese Patent Provisional Publication No. 8(1996)-27284.

A polymerizable group should be bound to a discotic core of the discotic liquid crystal molecule to cause the polymerization reaction of the compound. However, if the polymerizable group is directly bound to the discotic core, it is difficult to keep the alignment at the polymerization reaction. Therefore, a linking group is introduced between the discotic core and the polymerizable group. Accordingly, the discotic liquid crystal molecule having a polymerizable group preferably is a compound represented by the following formula (I).

$$D(-L-P)_n \quad (I)$$

in which D is a discotic core; L is a divalent linking group; P is a polymerizable group; and n is an integer of 4 to 12.

Examples of the discotic cores (D) are shown below. In the examples, LP (or PL) means the combination of the divalent linking group (L) and the polymerizable group (P).

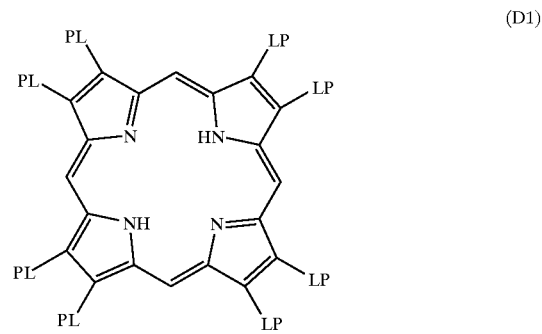

(D1)

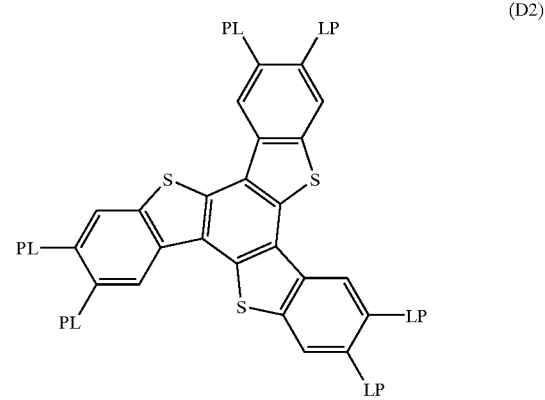

(D2)

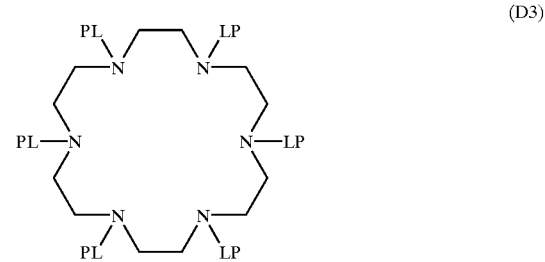

(D3)

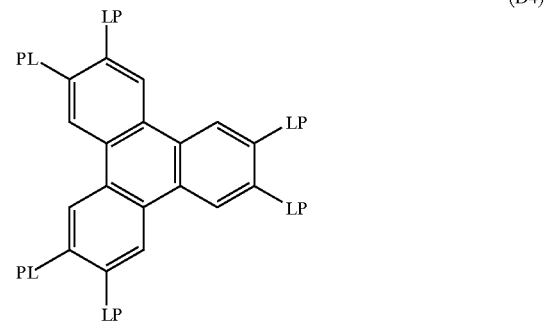

(D4)

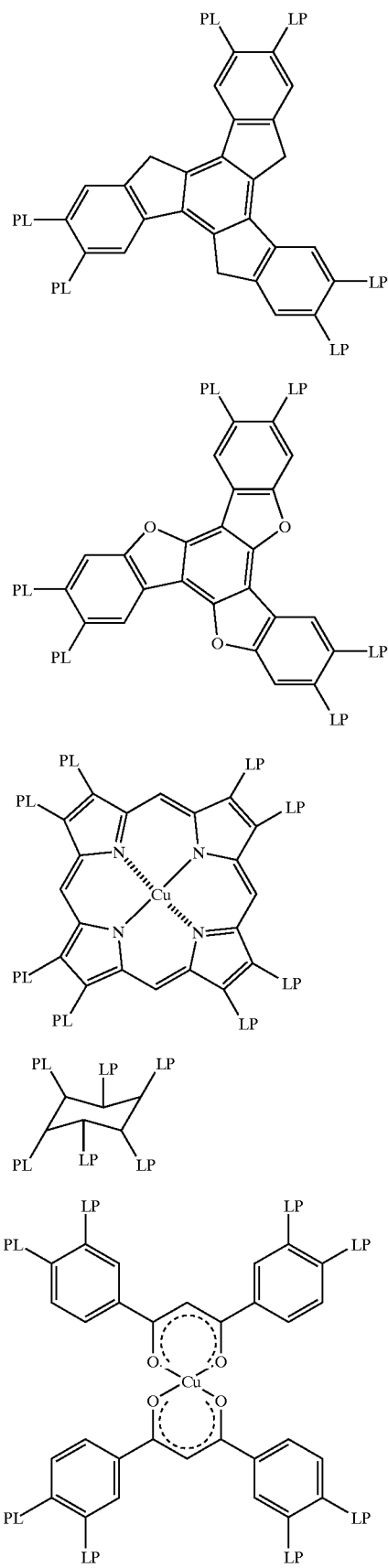
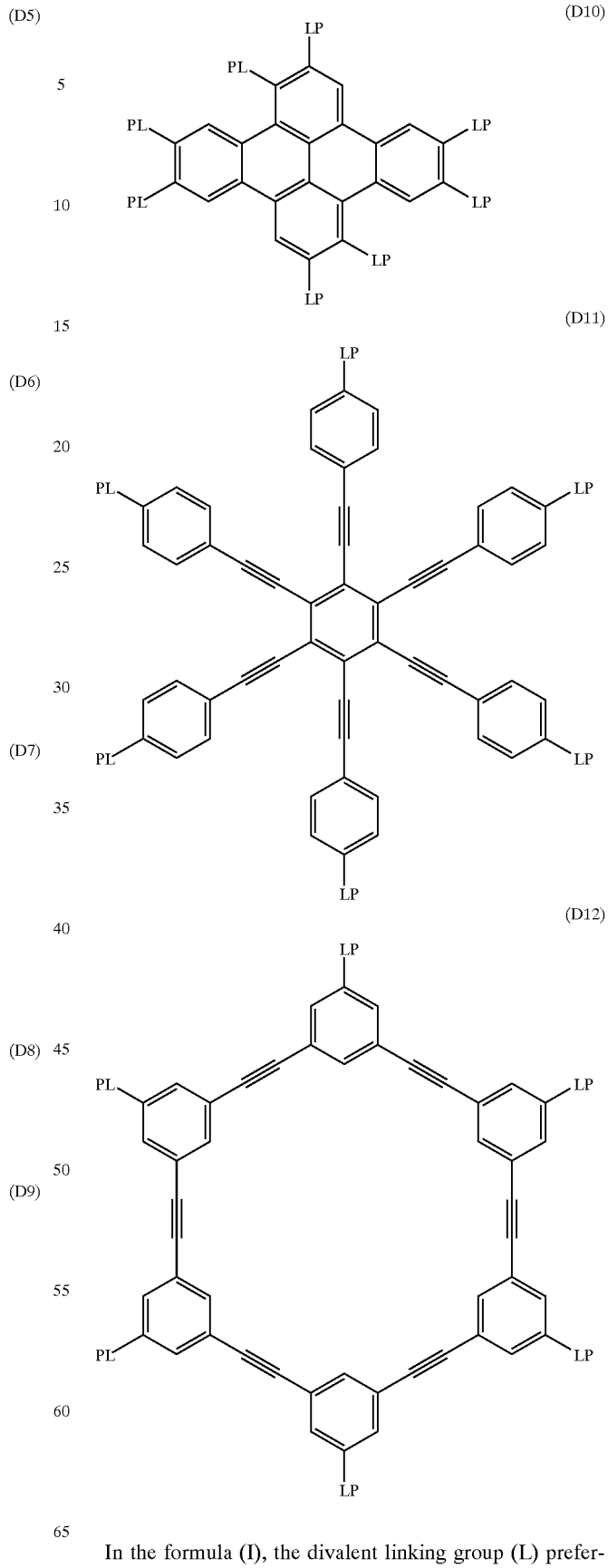
In the formula (I), the divalent linking group (L) preferably is selected from the group consisting of an alkylene group, an alkenylene group, an arylene group, —CO—, —NH—, —O—, —S— and combinations thereof. L more preferably is a divalent linking group comprising at least two divalent groups selected from the group consisting of an alkylene group, an alkenylene group, an arylene group, —CO—, —NH—, —C— and —S—. L more preferably is a divalent linking group comprising at least two divalent groups selected from the group consisting of an alkylene group, an alkenylene group, an arylene group —CO— and —O—. The alkylene group preferably has 1 to 12 carbon atoms. The alkenylene group preferably has 2 to 12 carbon atoms. The arylene group preferably has 6 to 10 carbon atoms. The alkylene group, the alkenylene group and the arylene group may have a substituent group (e.g., an alkyl group, a halogen atom, cyano, an alkoxy group, an acyloxy group).

Examples of the divalent linking groups (L) are shown below. In the examples, the left side is attached to the discotic core (D), and the right side is attached to the polymerizable group (P). AL means an alkylene group or an alkenylene group, and AR means an arylene group.

L1: —AL—CO—O—AL—
L2: —AL—CO—O—AL—O—
L3: —AL—CO—O—AL—O—AL—
L4: —AL—CO—O—AL—O—CO—
L5: —CO—AR—O—AL—
L6: —CO—AR—O—AL—O—
L7: —CO—AR—O—AL—O—CO—
L8: —CO—NH—AL—
L9: —NH—AL—O—
L10: —NH—AL—O—CO—
L11: —O—AL—
L12: —O—AL—O—
L13: —O—AL—O—CO—
L14: —O—AL—O—CO—NH—AL—
L15: —O—AL—S—AL—
L16: —O—CO—AR—O—AL—CO—
L17: —O—CO—AR—O—AL—O—CO—
L18: —O—CO—AR—O—AL—O—AL—O—CO—
L19: —O—CO—AR—O—AL—O—AL—O—AL—O—CO—
L20: —S—AL—
L21: —S—AL—O—
L22: —S—AL—O—CO—
L23: —S—AL—S—AL—
L24: —S—AR—Al—

The polymerizable group (P) is determined by the polymerization reaction. Examples of the polymerizable groups (P) are shown below.

—CH=CH₂ (P1)

—C≡CH (P2)

—CH₂—C≡CH (P3)

—NH₂ (P4)

—SO₃H (P5)

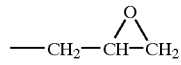 (P6)

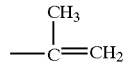 (P7)

—CH=CH—CH₃ (P8)

—N=C=S (P9)

—SH (P10)

—CHO (P11)

—OH (12)

—CO₂H (P13)

—N=C=O (P14)

—CH=CH—C₂H₅ (P15)

—CH=CH—n-C₃H₇ (P16)

 (P17)

The polymerizable group (P) preferably is an unsaturated polymerizable group (P1, P2, P3, P7, P8, P15, P16, P17) or an epoxy group (P6), more preferably is an unsaturated polymerizable group, and most preferably is an ethylenically unsaturated group (P1, P7, P8, P15, P16, P17).

In the formula (I), n is an integer of 4 to 12, which is determined by the chemical structure of the discotic core (D). The 4 to 12 combinations of L and P can be different from each other. However, the combinations are preferably identical.

Two or more discotic liquid crystal molecules can be used in combination.

An optically anisotropic layer can be formed by coating a solution containing the discotic liquid crystal molecule, a polymerization initiator (described below) and other optional components on an orientation layer.

The solution is preferably prepared by using an organic solvent. Examples of the organic solvents include an amide (e.g., dimethylformamide), a sulfoxide (e.g., dimethylsulfoxide), a heterocyclic compound (e.g., pyridine), a hydrocarbon (e.g., benzene, hexane), an alkyl halide (e.g., chloroform, dichloromethane), an ester (e.g., methyl acetate, butyl acetate), a ketone (e.g., acetone, methyl ethyl ketone) and an ether (e.g.,. tetrahydrofuran, 1,2-dimethoxyethane). The alkyl halide and the ketone are preferred. Two or more organic solvents can be used in combination.

The solution can be coated according to a conventional coating method (e.g., extrusion coating method, direct gravure coating method, reverse gravure coating method, die coating method).

The aligned discotic liquid crystal molecule is preferably fixed while keeping the alignment. The discotic liquid crystal molecule is fixed preferably by a polymerization reaction. The polymerization reaction can be classified a thermal reaction using a thermal polymerization initiator and a photo reaction using a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No.

2,448,828), α-hydrocarbon substituted acyloin compounds (described in U.S. Pat. No. 2,722,512), polycyclic quinone compounds (described in U.S. Pat. Nos. 2,951,758, 3,046, 127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution of the layer.

The light irradiation for the photo polymerization is preferably conducted by an ultraviolet ray. The exposure energy is preferably in the range of 20 to 5,000 mJ, and more preferably in the range of 100 to 800 mJ. The light irradiation can be conducted while heating the layer to accelerate the photo polymerization reaction.

The optically anisotropic layer has a thickness preferably in the range of 0.1 to 10 μm, more preferably in the range of 0.5 to 5 μm and most preferably in the range of 1 to 5 μm.

[Orientation Layer]

The orientation layer has a function of aligning discotic liquid crystal molecules. The orientation layer can be formed by rubbing treatment of an organic compound (preferably a polymer), oblique evaporation of an inorganic compound, formation of a micro groove layer, or stimulation of an organic compound (e.g., ω-tricosanoic acid, dioctadecylmethylammonium chloride, methyl stearate) according to a Langmuir-Blodgett method. Further, the aligning function of the orientation layer can be activated by applying an electric or magnetic field to the layer or irradiating the layer with light.

The orientation layer is preferably formed by rubbing a polymer. The polymer preferably is polyvinyl alcohol. A denatured polyvinyl alcohol having a hydrophobic group is particularly preferred. The discotic liquid crystal molecule can uniformly be aligned by introducing the hydrophobic group into polyvinyl alcohol because the hydrophobic group has an affinity with the discotic liquid crystal molecule. The hydrophobic group is attached to the side chain or the end of the main chain of polyvinyl alcohol.

The hydrophobic group preferably is an aliphatic group (more preferably an alkyl group or an alkenyl group) having 6 or more carbon atoms or an aromatic group.

In the case that the hydrophobic group is attached to the end of the main chain, a linking group is preferably introduced between the hydrophobic group and the end of the main chain. Examples of the linking group include —S—, —C(CN)R$^1$—, —NR$^2$—, —CS— and combinations thereof. Each of R$^1$ and R$^2$ is hydrogen or an alkyl group having 1 to 6 carbon atoms, and preferably is an alkyl group having 1 to 6 carbon atoms.

In the case that the hydrophobic group is attached to the side chain, the acetyl group of the vinyl acetate units in polyvinyl alcohol is partially replaced with an acyl group (—CO—R$^3$) having 7 or more carbon atoms. R$^3$ is an aliphatic group having 6 or more carbon atoms or an aromatic group.

Commercially available denatured polyvinyl alcohols (e.g., MP103, MP203, R1130, Kuraray Co., Ltd.) can be used in the orientation layer.

The (denatured) polyvinyl alcohol has a saponification degree preferably of not smaller than 80%. The (denatured) polyvinyl alcohol has a polymerization degree preferably of not smaller than 200.

The rubbing treatment can be conducted by rubbing the layer with a paper or cloth several times along a certain direction. A cloth is preferred to a paper. The cloth preferably uniformly contains uniform (about length and thickness) fibers.

A cellulose acetate, a fluorine containing surface active agent or a melamine compound can be added to the orientation layer to align the discotic liquid crystal molecule along the surface of the support, wherein the average inclined angle (between the discotic planes and the planes parallel to the support) is less than 5°. The amount of the cellulose acetate is preferably in the range of 0.01 to 1 wt. % based on the amount of the discotic liquid crystal molecule. The amount of the fluorine containing surface active agent is preferably in the range of 2 to 30 wt. % based on the amount of the discotic liquid crystal molecule. The amount of the melamine compound is 0.1 to 20 wt. % based on the amount of the discotic liquid crystal molecule.

After the discotic liquid crystal molecule is aligned by using the orientation layer and fixed while keeping the alignment to form an optically anisotropic layer, the optically anisotropic layer can be transferred to a support. The aligned and fixed discotic liquid crystal molecule can keep the alignment without the orientation layer. Accordingly, the orientation layer is not essential in the optical compensatory sheet, while the orientation layer is essential in the preparation of the optical compensatory sheet using the discotic liquid crystal molecule.

[Liquid Crystal Display of VA Mode]

The optical compensatory sheet of the present invention can be advantageously used in a liquid crystal display of a vertical alignment (VA) mode.

The liquid crystal display of the VA mode is described below referring to FIGS. 2 to 9.

Figure 2:
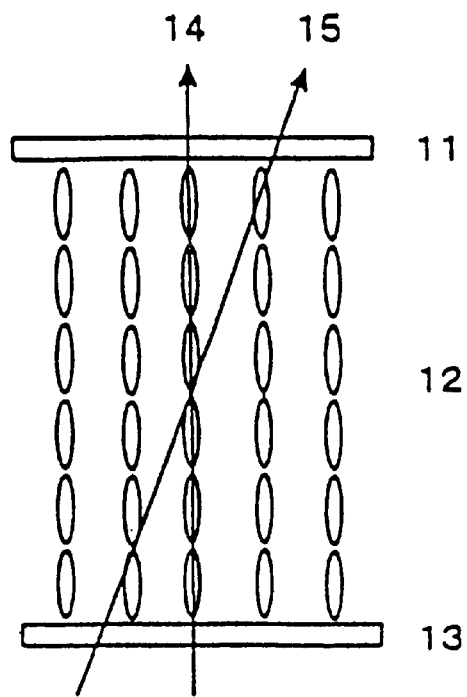
FIG. 2 is a sectional view schematically illustrating alignment of liquid crystal molecules when voltage is not applied to a liquid crystal cell of a VA mode.

FIG. 2 is a sectional view schematically illustrating alignment of liquid crystal molecules when voltage is not applied to a vertically aligned (VA) liquid crystal cell.

As is shown in FIG. 2, a liquid crystal cell comprises an upper substrate (11), a lower substrate (13) and liquid crystal molecules (12) sealed between the substrates. The liquid crystal molecules (12) used in a VA liquid crystal cell generally has a negative dielectric constant anisotropy. When voltage is not applied to a VA liquid crystal cell, the liquid crystal molecules (12) are vertically aligned. Where a pair of polarizing elements (not shown in FIG. 2) are arranged on both sides of the upper and lower substrates (11, 13), no retardation is caused along a normal line (14) of the substrate surface. As a result, light is not transmitted along the normal line (14) to display black.

If the cell is viewed along a direction (15) inclined from the normal line (14), retardation is caused to transmit light. As a result, a contrast of an image is degraded. The retardation along the inclined direction (15) can be compensated with an optical anisotropy of an optical compensatory sheet. The details are described below referring to FIG. 5.

FIG. 2 shows that all the liquid crystal molecules (12) are completely vertically aligned. However, the aligned compounds are slightly slanted (pretilted) to a direction. The slanted compounds can be aligned to the pretilted direction when voltage is applied to a VA liquid crystal cell (described below referring to FIG. 3).

Figure 3:
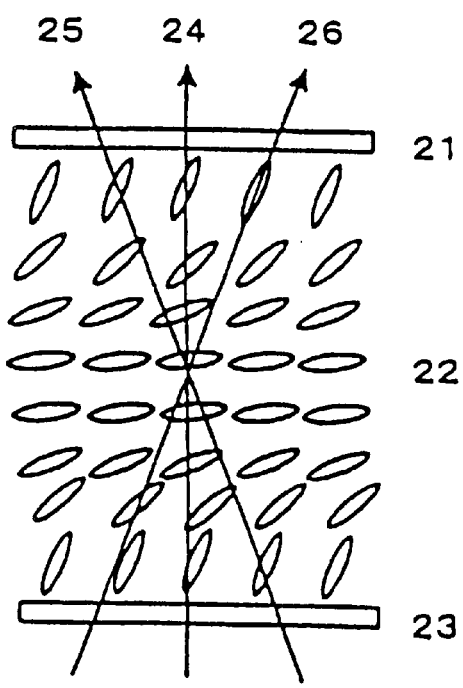
FIG. 3 is a sectional view schematically illustrating alignment of liquid crystal molecules when voltage is applied to a liquid crystal cell of a VA mode.

FIG. 3 is a sectional view schematically illustrating alignment of liquid crystal molecules when voltage is applied to a vertically aligned (VA) liquid crystal cell.

Each of upper and lower substrates (21, 23) has an electrode layer (not shown in FIG. 3) to apply voltage to liquid crystal molecules (22). As is shown in FIG. 3, the liquid crystal molecules placed in the middle of the cell are horizontally aligned by applying voltage to the cell. As a result, retardation is caused along a normal line (24) of the substrate surface to transmit light.

Each of an upper substrate (21) and a lower substrate (23) further has an orientation layer (not shown in FIG. 3) having a function of aligning the liquid crystal molecules (22) vertically. Accordingly, the liquid crystal molecules near the orientation layer are not horizontally aligned, but obliquely aligned along a pretilted direction, though the molecules placed in the middle of the cell are horizontally aligned. If the cell is viewed along a direction (25) inclined from the normal line (24), change of the angle of retardation is relatively small. On the other hand, change of the angle of retardation is relatively large where the cell is viewed along another direction (26). If the pretilted direction (the same as 26) is placed along downward direction in an image, viewing angles along leftward and rightward directions would be wide and symmetrical, a viewing angle along a downward direction would be wide, but a viewing angle an upward direction would be narrow so that the viewing angles along downward and upward directions would be asymmetrical. The retardation caused by the obliquely (not horizontally) aligned liquid crystal molecules while applying voltage to the cell should be compensated to correct the asymmetrical viewing angles (asymmetrical transmittance).

The optical compensatory sheet of the present invention has a function of compensating the above-mentioned retardation to improve the viewing angle (correcting the asymmetrical viewing angle while applying voltage to the cell).

Figure 4:
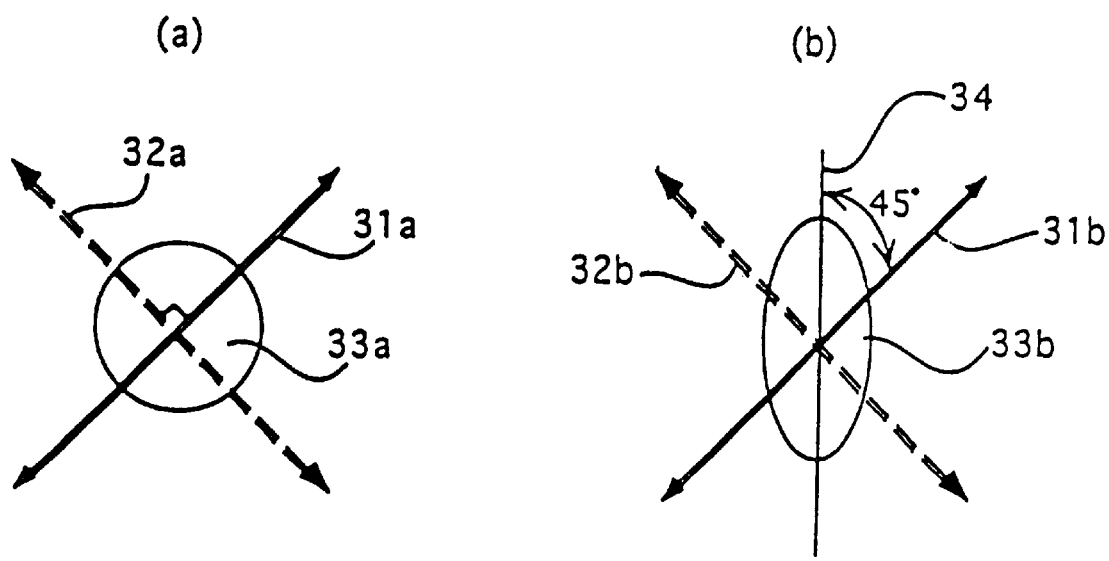
FIG. 4 schematically illustrates a refractive index ellipsoid obtained by viewing a liquid crystal cell of a VA mode and a polarizing element of crossed nicols arrangement along a normal line of a cell substrate.

FIG. 4 schematically illustrates a refractive index ellipsoid obtained by viewing a liquid crystal cell of a vertical alignment mode and a polarizing element of crossed nicols arrangement along a normal line of a cell substrate. FIG. 4(a) shows a refractive index ellipsoid when voltage is not applied to the cell, and FIG. 4(b) shows a refractive index ellipsoid when voltage is applied to the cell.

As is shown in FIG. 4, a transmission axis on an incident side (31a, 31b) of a polarizing element is arranged perpendicular to a transmission axis on the other side (32a, 32b) of a polarizing element according to crossed nicols arrangement.

The liquid crystal molecules are vertically aligned (perpendicular to the substrate surface) when voltage is not applied to the cell. A refractive index ellipsoid (33a) has a circular shape shown in FIG. 4(a) when voltage is not applied to the cell. Therefore, the liquid crystal cell having no retardation shown in FIG. 4(a) does not transmit light.

On the other hand, most of the liquid crystal molecules are horizontally aligned (parallel to the substrate surface) when voltage is applied to the cell. A refractive index ellipsoid (33b) has an oval shape shown in FIG. 4(b) when voltage is applied to the cell. Therefore, the liquid crystal cell having a retardation shown in FIG. 3(b) transmits light along a direction (34), which is an orthographic projection of an optic axis of the liquid crystal molecule in the cell to the cell substrate surface.

Figure 5:
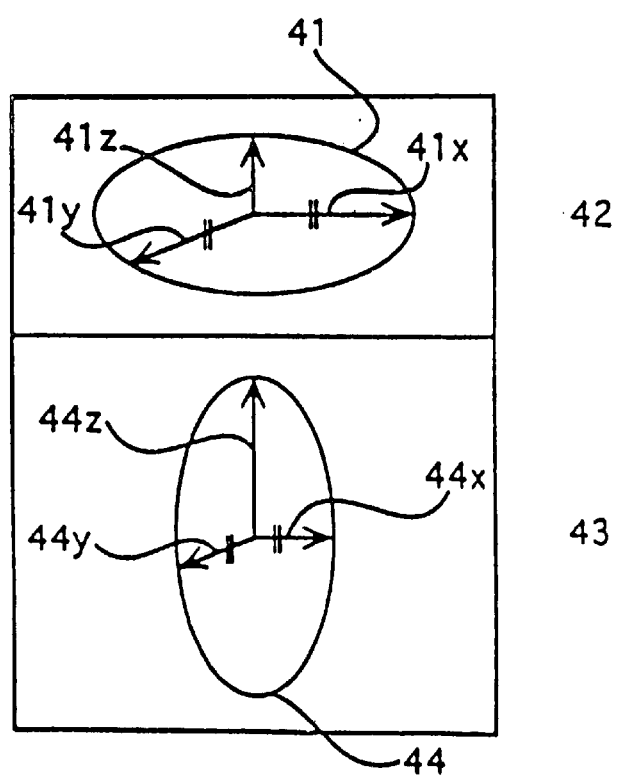
FIG. 5 schematically illustrates a refractive index ellipsoid of a positive uniaxial liquid crystal cell and a refractive index ellipsoid of a negative uniaxial optical compensatory sheet.

FIG. 5 schematically illustrates a refractive index ellipsoid of a positive uniaxial liquid crystal cell and a refractive index ellipsoid of a negative uniaxial optical compensatory sheet.

Where a positive uniaxial optical anisotropy is caused in a liquid crystal cell (43), a refractive index ellipsoid (44), which is formed by refractive indexes in plane (44x, 44y) and a refractive index along a vertical direction (44z) has a shape like a standing football. If a liquid crystal cell having a football-like (not spherical) refractive index ellipsoid is viewed along an inclined direction (15 in FIG. 2), retardation is caused in the cell. The retardation is canceled by a negative uniaxial optical compensatory sheet (42) to prevent transmission of light.

The negative uniaxial optical compensatory sheet (42) has a refractive index ellipsoid (41) having a shape like a pressed beach ball, which is formed by refractive indexes in plane (41x, 41y) and a refractive index along a vertical direction (41z). Therefore, the sum of 41x and 44x, the sum of 41y and 44y and the sum 41z and 44z are identical values. As a result, the retardation caused in the liquid crystal cell is canceled.

The optical compensatory sheet of the present invention has another function of preventing transmission of light incident from an inclined direction when voltage is not applied to the cell as well as a function of improving the viewing angle when voltage is not applied to the cell (described above referring to FIG. 3).

Figure 6:
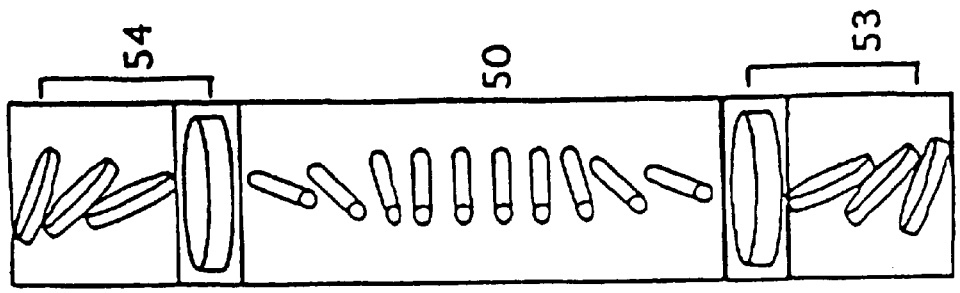
FIGS. 6(a)–6(u) are sectional view schematically illustrating combinations of a liquid crystal cell of a VA mode and an optical compensatory sheet of the first embodiment of the present invention.
Figure 6:
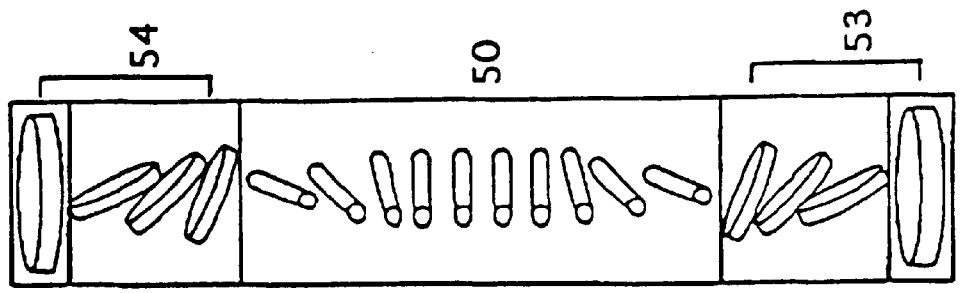
Figure 6:
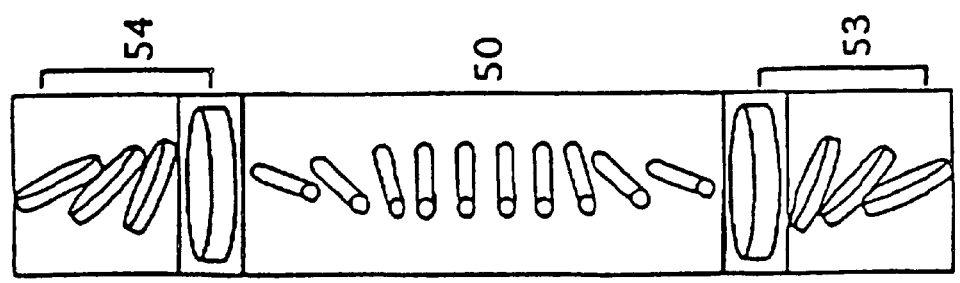
Figure 6:
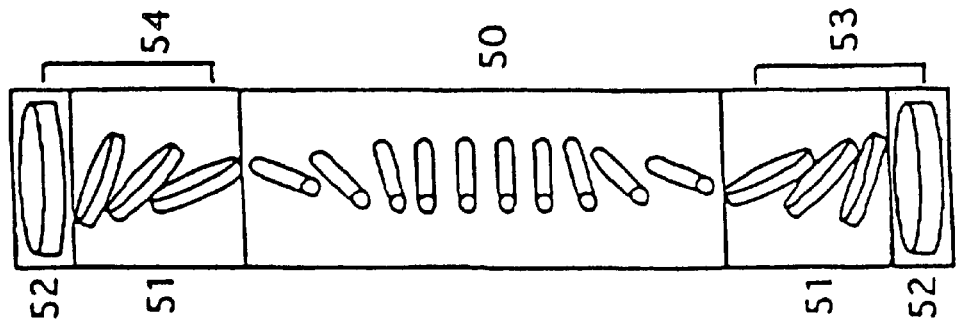

FIG. 6 is a sectional view schematically illustrating combinations of a liquid crystal cell of a vertical alignment mode and two optical compensatory sheets of the present invention.

As is shown in FIG. 6, the optical compensatory sheets (53, 54) are combined with a VA liquid crystal cell (50) according to four variations (a) to (d).

According to the variations (a) and (c), optically anisotropic layers (51) containing a discotic liquid crystal molecule of the optical compensatory sheets (53, 54) are attached to the VA liquid crystal cell (50). In the variation (a), the discotic liquid crystal molecule is aligned by an orientation layer (not shown in FIG. 6) arranged between the optically anisotropic layer (51) and the support (52). In the variation (c), the discotic liquid crystal molecule is aligned by an orientation layer (not shown in FIG. 6) arranged between the optically anisotropic layer (51) and the VA liquid crystal cell (50).

According to the variations (b) and (d), supports (52) of the optical compensatory sheets (53, 54) are attached to the VA liquid crystal cell (50). In the variation (b), the discotic liquid crystal molecule is aligned by an orientation layer (not shown in FIG. 5) arranged between the optically anisotropic layer (51) and the support (52). In the variation (c), the discotic liquid crystal molecule is aligned by an orientation layer (not shown in FIG. 6) arranged outside the optically anisotropic layer (51).

Figure 7:
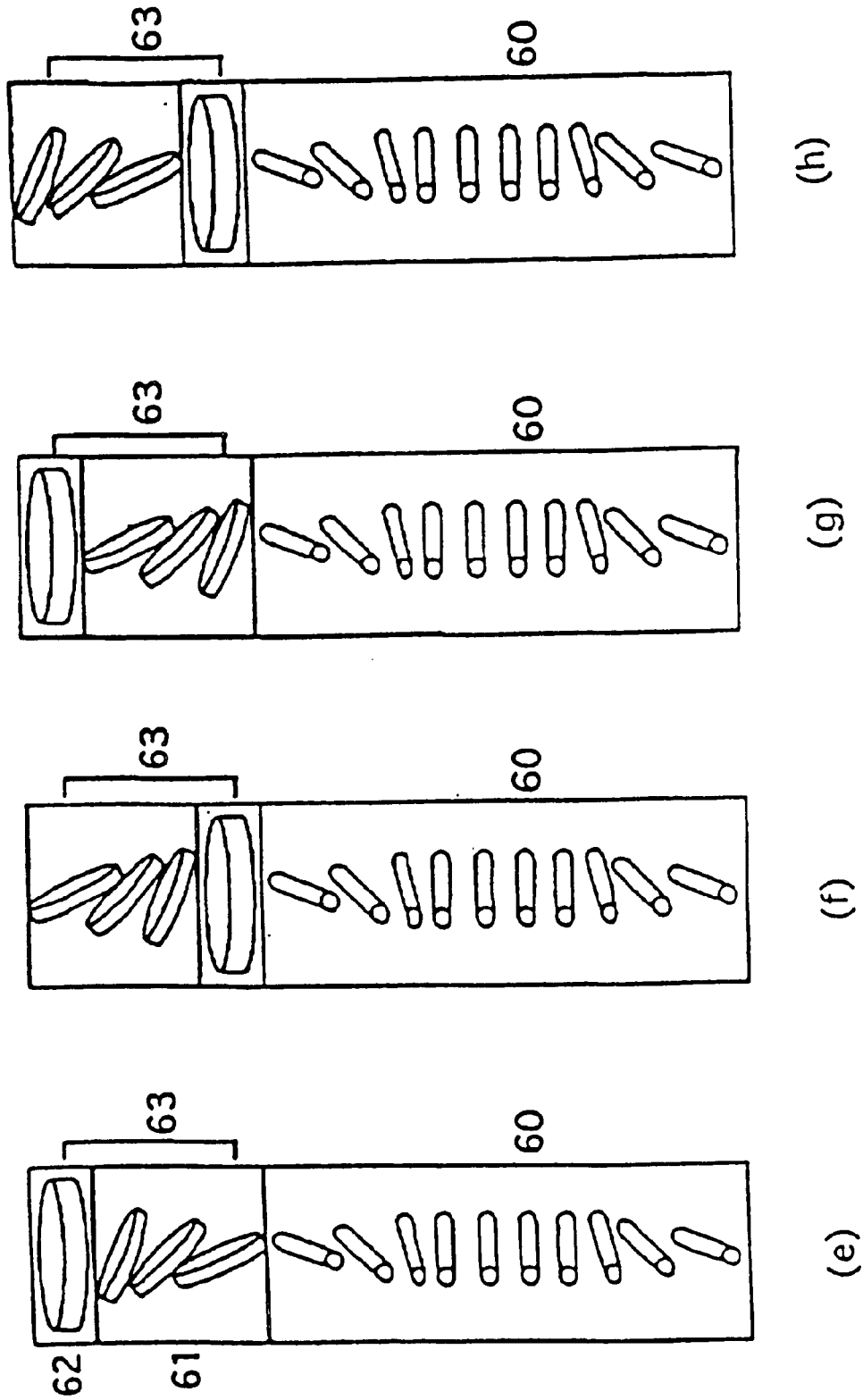
FIG. 7 is a sectional view schematically illustrating combinations of a liquid crystal cell of a VA mode and an optical compensatory sheet of the second embodiment of the present invention.

FIG. 7 is a sectional view schematically illustrating combinations of a liquid-crystal cell of a vertical alignment mode and an optical compensatory sheet of the present invention.

As is shown in FIG. 7, the optical compensatory sheet (63) of the second embodiment is combined with a VA liquid crystal cell (60) according to four variations (e) to (h).

According to the variations (e) and (g), an optically anisotropic layer (61) containing a discotic liquid crystal molecule of the optical compensatory sheet (63) is attached to the VA liquid crystal cell (60). In the variation (e), the discotic liquid crystal molecule is aligned by an orientation layer (not shown in FIG. 7) arranged between the optically anisotropic layer (61) and the support (62). In the variation (g), the discotic liquid crystal molecule is aligned by an orientation layer (not shown in FIG. 6) arranged between the optically anisotropic layer (61) and the VA liquid crystal cell (60).

According to the variations (f) and (h), a support (62) of the optical compensatory sheet (63) is attached to the VA liquid crystal cell (60). In the variation (f), the discotic liquid crystal molecule is aligned by an orientation layer (not shown in FIG. 6) arranged between the optically anisotropic layer (61) and the support (62). In the variation (h), the discotic liquid crystal molecule is aligned by an orientation layer (not shown in FIG. 7) arranged outside the optically anisotropic layer (61).

Figure 8:
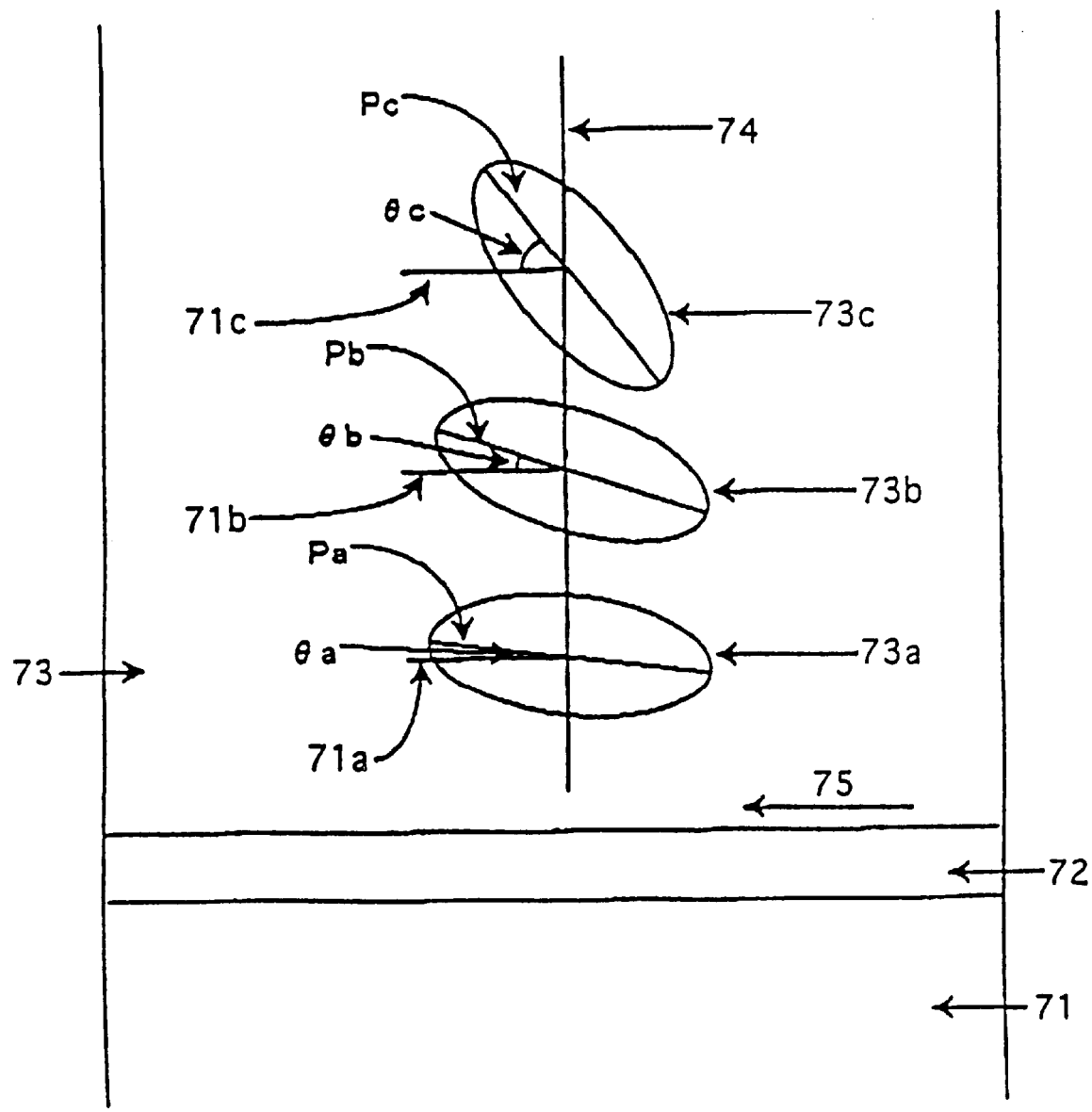
FIG. 8 is a sectional view schematically illustrating a representative embodiment of an optical compensatory sheet for a liquid crystal cell of a VA mode.

FIG. 8 is a sectional view schematically illustrating a representative embodiment of an optical compensatory sheet.

The optical compensatory sheet shown in FIG. 8 comprises a support (71), an orientation layer (72) and an optically anisotropic layer (73) in the order. The layered structure corresponds to (a) and (b) in FIG. 6 and (e) and (f) in FIG. 6. The orientation layer (72) has an aligning function caused by rubbing the layer along a direction (75).

Discotic liquid crystal molecules (73a, 73b, 73c) contained in the optically anisotropic layer (73) are planer molecules. Each of the molecules has only one plane, namely discotic plane (Pa, Pb, Pc). The discotic planes (Pa, Pb, Pc) are inclined to planes (71a, 71b, 71c) parallel to the surface of the support (71). The angle between the discotic planes (Pa, Pb, Pc) and the paralleled planes (71a, 71b, 71c) are inclined angles (θa, θb, θc). As the distance between the molecule and the orientation layer (72) increases along a normal line (74) of the support (71), the inclined angles increases (θa<θb<θc).

The inclined angles (θa, θb, θc) are preferably in the range of 0 to 60°. The minimum inclined angle is preferably in the range of 0 to 55°, and more preferably in the range of 5 to 40°. The maximum inclined angle is preferably in the range of 5 to 60°, and more preferably in the range of 20 to 60°. The difference between the minimum and maximum angles is preferably in the range of 5 to 55°, and more preferably in the range of 10 to 40°.

An optical compensatory sheet has a function of improving the viewing angle. The function can be further improved where the inclined angles are changed as is shown in FIG. 8. The optical compensatory sheet shown in FIG. 8 has another function of preventing an image from reversion, gray-scale inversion and color contamination of a displayed image.

Figure 9:
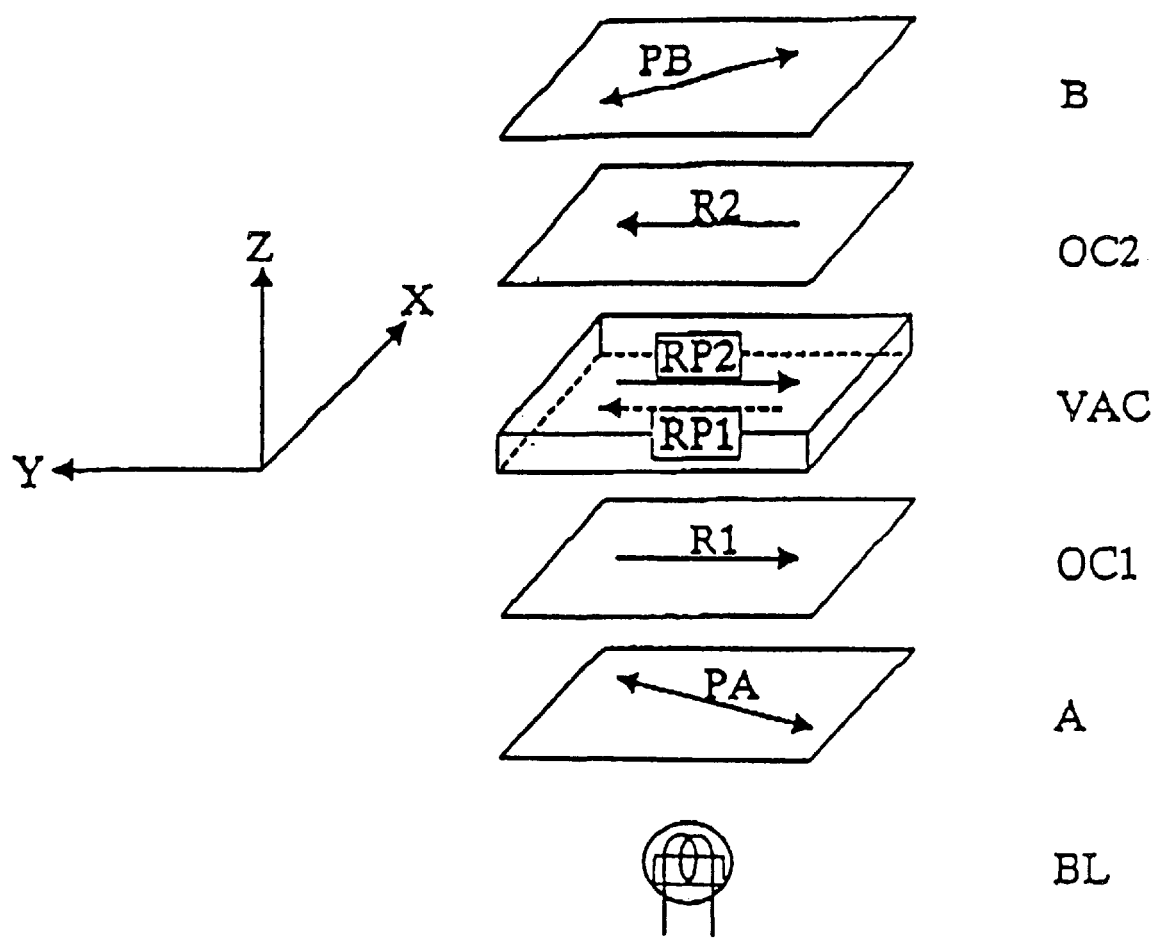
FIG. 9 is a sectional view schematically illustrating a representative embodiment of a liquid crystal display of a VA mode.

FIG. 9 is a sectional view schematically illustrating a representative embodiment of a liquid crystal display of a VA mode.

The liquid crystal display shown in FIG. 9 comprises a liquid crystal cell of a vertical alignment mode (VAC), a pair of polarizing elements (A, B) arranged on both sides of the liquid crystal cell, a pair of optical compensatory sheets (OC1, OC2) arranged between the liquid crystal cell and the polarizing elements, and a back light (BL). The pair of the optical compensatory sheets (OC1, OC2) are arranged, as is shown in FIG. 9. However, only one optical compensatory sheet can be arranged on one side of the liquid crystal cell.

The arrows (R1, R2) in the optical compensatory sheets (OC1, OC2) mean rubbing directions of orientation layers (corresponding to the arrow 75 in FIG. 8) provided on the optical compensatory sheets. In the liquid crystal display shown in FIG. 9, an optically anisotropic layers of the optical compensatory sheets (OC1, OC2) are attached to the liquid crystal cell (VAC). The optically anisotropic layers can also be attached to the polarizing elements (A, B). The rubbing directions of an orientation layer (R1, R2) should be reversed where the optically anisotropic layers are attached to the polarizing elements.

The arrows (RP1, RP2) in the liquid crystal cell (VAC) mean the rubbing directions of orientation layers provided on the cell substrates.

The arrows (PA, PB) in the polarizing elements (A, B) mean the transmission axes of light polarized in the elements.

The rubbing directions in the optical compensatory sheets (R1, R2) is preferably essentially parallel (or reversal parallel) to the rubbing directions in the liquid crystal cell (RP1, RP2). The transmission axes of the polarizing elements (PA, PB) are preferably essentially parallel or perpendicular to each other.

The term "essentially parallel (or reversal parallel) or perpendicular" means that a margin for error based on the exactly parallel (or reversal parallel) or perpendicular angle is in the range of +20°. The margin for error is preferably in the range of +15°, more preferably in the range of ±10°, and most preferably in the range of ±5°.

The angle between the rubbing directions in the liquid crystal cell (RP1, RP2) and the transmission axes of the polarizing elements (PA, PB) is preferably in the range of 10 to 800, more preferably in the range of 20 to 70°, and most preferably in the range of 35 to 55°.

The optical compensatory sheet used in the liquid crystal display of the VA mode has a direction of the minimum retardation, which is preferably not present in plane and not present along a normal line of the sheet.

The optical characteristic of the optical compensatory sheet depends on optical characteristics of the optically anisotropic layer and the support and on arrangement of the layer and the support. The optical characteristics are described below.

The optical characteristics of (1) the optical anisotropic layer, (2) the support and (3) the optical compensatory sheet include a Re retardation value, a Rth retardation value and an angle between a direction of the minimum retardation and a normal line of the sheet (β).

The Re and Rth retardation values are defined above about the retardation value of the cellulose acetate support. In the definitions of the optical anisotropic layer and the optical compensatory sheet, nx, ny and nz (described above about the cellulose acetate support) mean principle refractive induces satisfying the formula of nx>ny>nz.

In the case that two optical compensatory sheets are used in the liquid crystal display of a VA mode, each of the optical compensatory sheets preferably has a Re retardation value in the range of −5 to 5 nm. Accordingly, the absolute Re retardation value of the optical compensatory sheet ($Re^{31}$) preferably satisfies the formula of $0 \leq R^{31} \leq 5$.

The optically anisotropic layer and the support are preferably so arranged that slow axis of the optically anisotropic layer is essentially perpendicular to slow axis of the support to adjust $Re^{31}$ within the above-mentioned range. Further, each of the optically anisotropic layer and the support preferably has a Re retardation value satisfying the following formula:

$$|Re^1 - Re^2| \leq 5 \text{ nm}$$

in which $Re^1$ is an absolute Re retardation value of the optically anisotropic layer, and $Re^2$ is an absolute Re retardation value of the support.

In the case that one optical compensatory sheet is used in the liquid crystal display of a VA mode, the optical compensatory sheet preferably has a retardation value in plane in the range of −10 to 10 nm. Accordingly, the absolute Re retardation value of the optical compensatory sheet ($Re^{32}$) preferably satisfies the formula of $0 \leq R^{32} \leq 10$.

The optically anisotropic layer and the support are preferably so arranged that slow axis of the optically anisotropic layer is essentially perpendicular to slow axis of the support to adjust $Re^{32}$ within the above-mentioned range. Further, each of the optically anisotropic layer and the support preferably has retardation in plane satisfying the following formula:

$|Re^1-Re^2| \leq 10$ nm in which $Re^1$ is an absolute retardation value in plane of the optically anisotropic layer, and $Re^2$ is an absolute retardation value in plane of the support.

Preferred optical characteristics of (1) the optical anisotropic layer, (2) the support and (3) the optical compensatory sheet are shown below. The unit of Re and Rth is nm. The superscripted number 1 means a value of the optical anisotropic layer, the superscripted number 2 means a value of the support and the superscripted number 3 means a value of the optical compensatory sheet. The Rth retardation value of the support ($Rth^2$) and the Re retardation value of the support ($Re^2$) have been described about the cellulose acetate support. The meanings of $R^{31}$ and $R^{32}$ are described above.

| Preferred range | More preferred | Most preferred |
|---|---|---|
| $0 < Re^1 \leq 200$ | $5 \leq Re^1 \leq 150$ | $10 \leq Re^1 \leq 100$ |
| $0 \leq Re^{31} \leq 4.5$ | $0 \leq Re^{31} \leq 4$ | $0 \leq Re^{31} \leq 3.5$ |
| $0 \leq Re^{32} \leq 9$ | $0 \leq Re^{32} \leq 8$ | $0 \leq Re^{32} \leq 7$ |
| $10 \leq Rth^1 \leq 400$ | $20 \leq Rth^1 \leq 300$ | $30 \leq Rth^1 \leq 200$ |
| $10 \leq Rth^3 \leq 600$ | $60 \leq Rth^3 \leq 500$ | $100 \leq Rth^3 \leq 400$ |
| $0° < \beta^1 \leq 60°$ | $0° < \beta^1 \leq 50°$ | $0° < \beta^1 \leq 40°$ |
| $0° \leq \beta^2 \leq 10°$ | $0° \leq \beta^2 \leq 5°$ | $0° \leq \beta^2 \leq 3°$ |
| $0° < \beta^3 \leq 50°$ | $0° < \beta^3 \leq 45°$ | $0° < \beta^3 \leq 40°$ |

[Liquid Crystal Display of OCB and HAN Mode]

The optical compensatory sheet of the present invention can also be advantageously used in a liquid crystal display of an optically compensatory bend (OCB) mode or a hybrid aligned nematic (HAN) mode.

The liquid crystal displays of the OCB mode and the HAN mode are described below referring to FIGS. 10 to 15.

Figure 10:
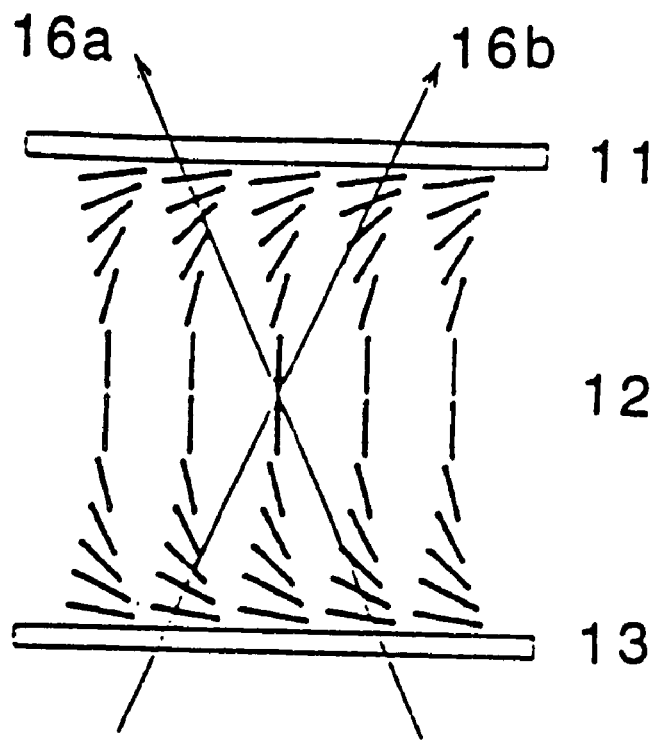
FIG. 10 is a sectional view schematically illustrating alignment of liquid crystal molecules in a liquid crystal cell of an OCB mode.

FIG. 10 is a sectional view schematically illustrating alignment of liquid crystal molecules in an optically compensatory bend (OCB) liquid crystal cell. The cell of FIG. 10 shows a black image, which corresponds to a normally white mode when voltage is applied to the cell or a normally black mode when voltage is not applied to the cell.

As is shown in FIG. 10, a liquid crystal cell comprises an upper substrate (11), a lower substrate (13) and liquid crystal molecules (12) sealed between the substrates. In the liquid crystal cell of the OCB mode, the birefringence of liquid crystal molecules (12) near the upper substrate (11) is large to a direction of light (16*a*), while the birefringence of liquid crystal molecules (12) near the lower substrate (13) is small. To another direction of light (16*b*), which is symmetric with respect to the normal line of the substrates, the birefringence of liquid crystal molecules (12) near the upper substrate (11) is small, while the birefringence of liquid crystal molecules (12) near the lower substrate (13) is large. As is described above, the retardation values of the OCB liquid crystal cell are symmetric with respect to the normal line of the substrates. Accordingly, the cell has a function of optically compensate itself. Therefore, the OCB cell has a large viewing angle in principle.

Figure 11:
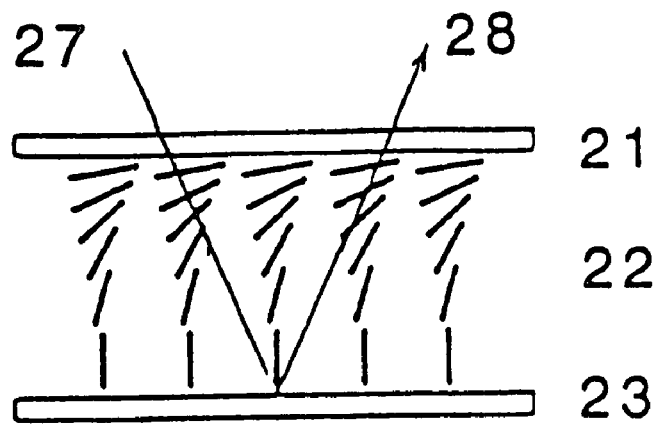
FIG. 11 is a sectional view schematically illustrating alignment of liquid crystal molecules in a liquid crystal cell of a HAN mode.

FIG. 11 is a sectional view schematically illustrating alignment of liquid crystal molecules in a hybrid aligned nematic (HAN) liquid crystal cell. The cell of FIG. 11 shows a black image, which corresponds to a normally white mode when voltage is applied to the cell or a normally black mode when voltage is not applied to the cell.

As is shown in FIG. 11, a liquid crystal cell comprises an upper substrate (21), a lower substrate (23) and liquid crystal molecules (22) sealed between the substrates. In the liquid crystal cell of the HAN mode, the birefringence of liquid crystal molecules (22) near the upper substrate (21) is large to incident light (27), while the birefringence of liquid crystal molecules (12) near the lower substrate (13) is small. To reflected light (28), the birefringence of liquid crystal molecules (22) near the upper substrate (21) is small, while the birefringence of liquid crystal molecules (22) near the lower substrate (23) is large. As is described above, the retardation values of incident light and reflected light are symmetric. Accordingly, the cell has a function of optically compensate itself. Therefore, the HAN cell has a large viewing angle in principle.

Even if the OCB or HAN cell is used, the light transmittance is increased within the black area to decrease a contrast of an image where the viewing is further enlarged. The optical compensatory sheet is used to keep the contrast when light is incident along an inclined direction, to improve the viewing angle and the front contrast.

A positive uniaxial liquid crystal cell (displaying black) can be optically compensated by a negative uniaxial optical compensatory sheet, as is described above referring to FIG. 5.

Figure 12:
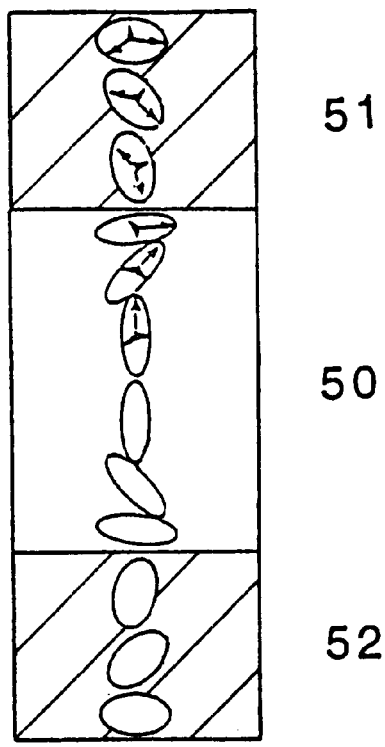
FIG. 12 is a sectional view schematically illustrating a combination of a liquid crystal cell of an OCB mode and two optical compensatory sheets.

FIG. 12 is a sectional view schematically illustrating a combination of a liquid crystal cell of the OCB mode and two optical compensatory sheets of the present invention.

As is shown in FIG. 12, the two optical compensatory sheets are preferably so arranged that the liquid crystal cell of the OCB mode (50) is provided between the optically anisotropic layers (51, 52). The discotic liquid crystal molecules of the optically compensatory sheets (51, 52) are aligned corresponding to (optically compensating) the alignment of the liquid crystal molecule of the liquid crystal cell of the OCB mode.

Figure 13:
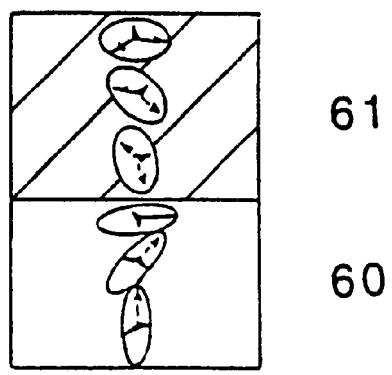
FIG. 13 is a sectional view schematically illustrating a combination of a liquid crystal cell of a HAN mode and an optical compensatory sheet.

FIG. 13 is a sectional view schematically illustrating a combination of a liquid crystal cell of the HAN mode and one optical compensatory sheet of the present invention.

As is shown in FIG. 13, the optical compensatory sheet is preferably so arranged that the optically anisotropic layer (61) is provided on the display surface of the liquid crystal cell of the HAN mode (60). The discotic liquid crystal molecules of the optically compensatory sheet (61) are aligned corresponding to (optically compensating) the alignment of the liquid crystal molecule of the liquid crystal cell of the HAN mode.

As is shown in FIGS. 12 and 13, the alignment of the liquid crystal molecule of the cell of the OCB or HAN mode can be optically compensated by the optically anisotropic layer containing a discotic liquid crystal molecule. However, the retardation of the liquid crystal cell cannot be sufficiently corrected by only the optically anisotropic layer. Further the retardation caused in the optically anisotropic layer cannot be corrected by the layer itself. Therefore, the above-described optically anisotropic support (cellulose acetate film) is used to correct the retardation.

The combinations of the optically anisotropic layer and the optical anisotropic support are the same as those described about the liquid crystal display of the VA mode shown in FIG. 8.

Figure 14:
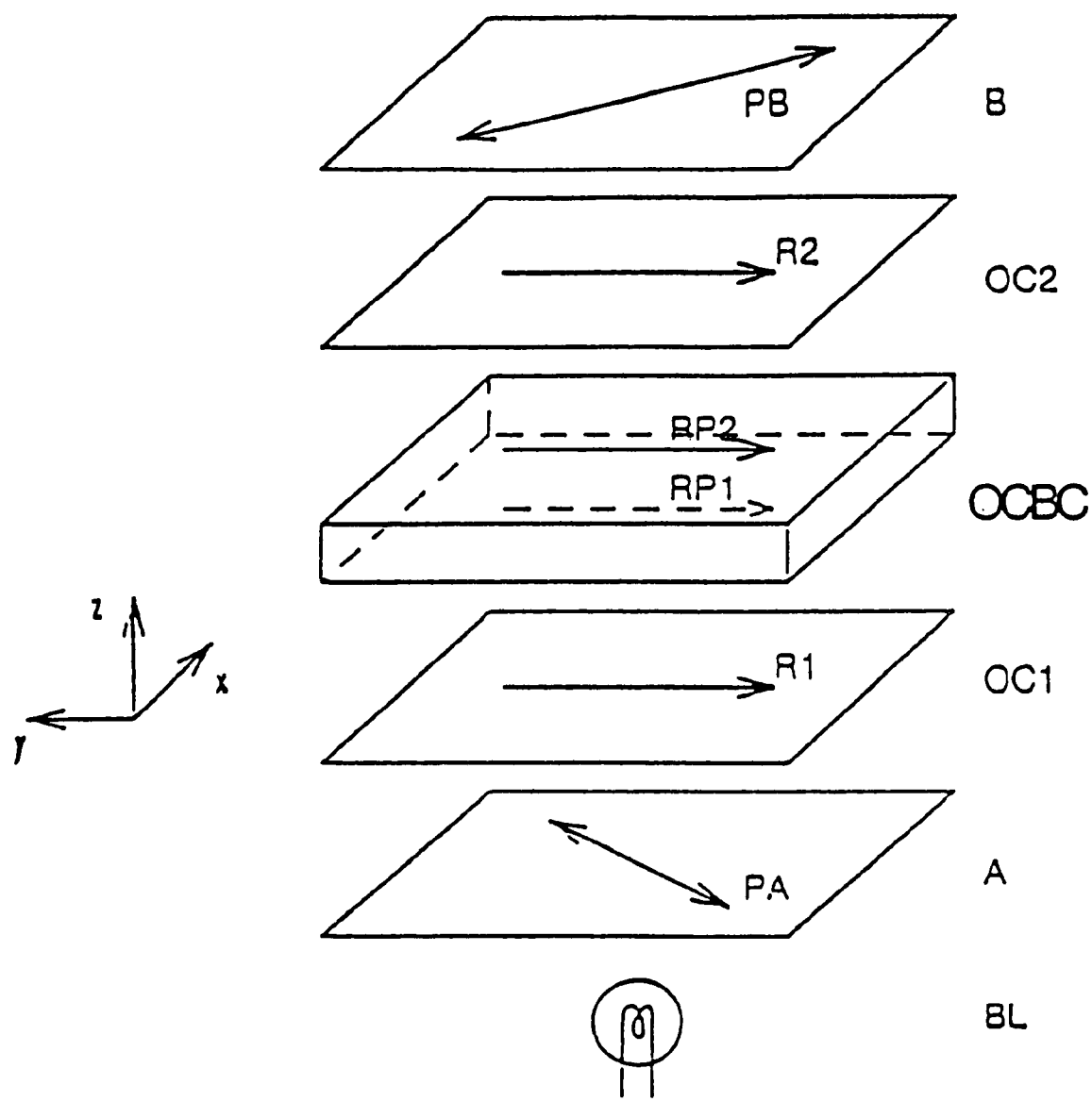
FIG. 14 is a sectional view schematically illustrating a representative embodiment of a liquid crystal display of an OCB mode.

FIG. 14 is a sectional view schematically illustrating a representative embodiment of a liquid crystal display of an OCB mode.

The liquid crystal display shown in FIG. 14 comprises a liquid crystal cell of an optically compensatory bend mode (OCBC), a pair of polarizing elements (A, B) arranged on both sides of the liquid crystal cell, a pair of optical compensatory sheets (OC1, OC2) arranged between the liquid crystal cell and the polarizing elements, and a back light (BL). The pair of the optical compensatory sheets (OC1, OC2) are arranged, as is shown in FIG. 14. However, only one optical compensatory sheet can be arranged on one side of the liquid crystal cell.

The arrows (R1, R2) in the optical compensatory sheets (OC1, OC2) mean rubbing directions of orientation layers provided on the optical compensatory sheets. In the liquid crystal display shown in FIG. 14, optically anisotropic layers of the optical compensatory sheets (OC1, OC2) are attached to the liquid crystal cell (OCBC). The optically anisotropic layers can also be attached to the polarizing elements (A, B). The rubbing directions of an orientation layer (R1, R2) should be reversed where the optically anisotropic layers are attached to the polarizing elements.

The arrows (RP1, RP2) in the liquid crystal cell (OCBC) mean the rubbing directions of orientation layers provided on the cell substrates.

The arrows (PA, PB) in the polarizing elements (A, B) mean the transmission axes of light polarized in the elements.

The rubbing directions in the optical compensatory sheets (R1, R2) are preferably essentially parallel (or reversal parallel) to the rubbing directions in the liquid crystal cell (RP1, RP2). The transmission axes of the polarizing elements (PA, PB) are preferably essentially parallel or perpendicular to each other.

The term "essentially parallel (or reversal parallel) or perpendicular" means that a margin for error based on the exactly parallel (or reversal parallel) or perpendicular angle is in the range of ±20°. The margin for error is referably in the range of ±15°, more preferably in the range of ±10°, and most preferably in the range of ±5°.

The angle between the rubbing directions in the liquid crystal cell (RP1, RP2) and the transmission axes of the polarizing elements (PA, PB) is preferably in the range of 10 to 80°, more preferably in the range of 20 to 70°, and most preferably in the range of 35 to 55°.

Figure 15:
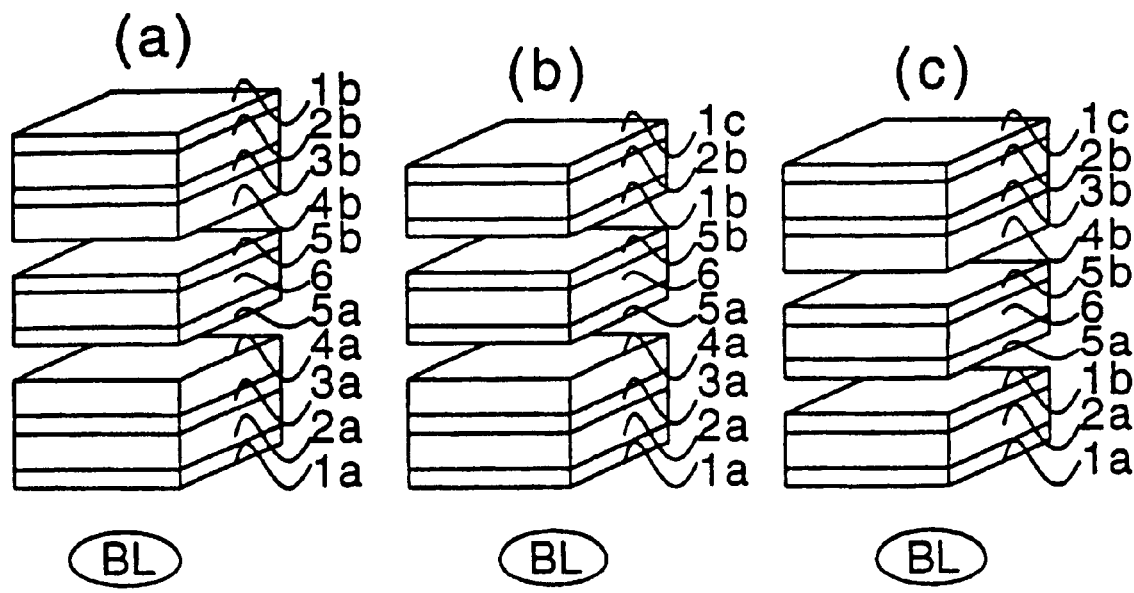
FIG. 15 is a sectional view schematically illustrating a representative embodiment of a liquid crystal display of a HAN mode.

FIG. 15 is a sectional view schematically illustrating a representative embodiment of a liquid crystal display of a HAN mode.

The liquid crystal display shown in FIG. 10 comprises a liquid crystal cell of a hybrid aligned nematic mode (HANC), a polarizing element (A) arranged on the display side of the liquid crystal cell, an optical compensatory sheet (OC) arranged between the liquid crystal cell and the polarizing element, and a reflection board (RB).

The arrow (R) in the optical compensatory sheet (OC) means a rubbing direction of an orientation layer provided on the optical compensatory sheet.

The arrow (RP) in the liquid crystal cell (HANC) means a rubbing direction of an orientation layer provided on the cell substrates.

The arrow (PA) in the polarizing element (A) means the transmission axis of light polarized in the element.

The rubbing direction in the optical compensatory sheet (R) is preferably essentially parallel (or reversal parallel) to the rubbing direction in the liquid crystal cell (RP).

The term "essentially parallel (or reversal parallel) or perpendicular" means that a margin for error based on the exactly parallel (or reversal parallel) or perpendicular angle is in the range of ±20°. The margin for error is preferably in the range of ±15°, more preferably in the range of ±10°, and most preferably in the range of ±5°.

The angle between the rubbing direction in the liquid crystal cell (RPI) and the transmission axis of the polarizing element (PA) is preferably in the range of 10 to 80°, more preferably in the range of 20 to 70°, and most preferably in the range of 35 to 55°.

The optical compensatory sheet used in the liquid crystal display of the OCB or HAN mode has a direction of the minimum retardation, which is preferably not present in plane and not present along a normal line of the sheet.

The optical characteristic of the optical compensatory sheet depends on optical characteristics of the optically anisotropic layer and the support and on arrangement of the layer and the support. The optical characteristics are described below.

The optical characteristics of (1) the optical anisotropic layer, (2) the support and (3) the optical compensatory sheet include a Re retardation value and a Rth retardation value. In the liquid crystal cell of the OCB or HAN mode, the optical characteristics of the optical compensatory sheet is preferably adjusted based on the optical characteristics of the OCB or HAN cell.

The Re and Rth retardation values are defined above about the retardation value of the cellulose acetate support. In the definitions of the optical anisotropic layer and the optical compensatory sheet, nx, ny and nz (described above about the cellulose acetate support) mean principle refractive induces satisfying the formula of $$nx \geq ny \geq nz.$$

In the case that two optical compensatory sheets are used in the, liquid crystal display of the OCB mode, the Re retardation value of the optical compensatory sheet ($Re^3$) and the Re retardation value of the liquid crystal cell ($Re^4$) preferably satisfy the following formula.

$$Re^4 - 20 \leq |Re^3| \times 2 \leq Re^4 + 20$$

In the case that one optical compensatory sheet is used in the liquid crystal display of the OCB or HAN mode, the Re retardation value of the optical compensatory sheet ($Re^3$) and the Re retardation value of the liquid crystal cell ($Re^4$) preferably satisfy the following formula.

$$Re^4 - 20 \leq |Re^3| \leq Re^4 + 20$$

Preferred optical characteristics of (1) the optical anisotropic layer and (3) the optical compensatory sheet are shown below. The unit of Re and Rth is nm. The superscripted number 1 means a value of the optical anisotropic layer, the superscripted number 2 means a value of the support and the superscripted number 3 means a value of the optical compensatory sheet. The Rth retardation value of the support ($Rth^2$) and the Re retardation value of the support ($Re^2$) have been described about the cellulose acetate support.

| Preferred range | More preferred | Most preferred |
| --- | --- | --- |
| $0 < Re^1 \leq 200$ | $5 \leq Re^1 \leq 150$ | $10 \leq Re^1 \leq 100$ |
| $0 \leq Re^3 \leq 4.5$ | $0 \leq Re^3 \leq 4$ | $0 \leq Re^3 \leq 3.5$ |
| $50 \leq Rth^1 \leq 1,000$ | $50 \leq Rth^1 \leq 800$ | $100 \leq Rth^1 \leq 500$ |
| $50 \leq Rth^3 \leq 1,000$ | $60 \leq Rth^3 \leq 500$ | $100 \leq Rth^3 \leq 400$ |

[Other Liquid Crystal Displays]

The optical compensatory sheet of the present invention can also be advantageously used in a liquid crystal display of an axially symmetric aligned microcell (ASM) mode.

The liquid crystal cell of the ASM mode comprises a vertical alignment layer and negative dielectric liquid crystal. The ASM mode is characterized in that the cell thickness is maintained by position-controllable resin spacers. The other characteristics of the ASM mode are the same as those of the conventional TN mode.

The liquid crystal display of the ASM mode is described in Kume et al., SID 98 Digest, 1089 (1998).

The optical compensatory sheet of the present invention can also be used in a liquid crystal display of a conventional twisted nematic (TN) mode.

The liquid crystal display of the TN mode using an optical compensatory sheet is described in U.S. Pat. Nos. 5,583,679 and 5,646,703.

Preliminary Experiment 1

With 80.28 weight parts of a mixed organic solvent (methyl acetate/methanol/n-butanol=80 wt. %/15 wt. %/5 wt. %), 17 weight parts of cellulose acetate (average acetic acid content: 57.0%) and 2.72 weight parts of triphenyl phosphate (plasticizer) were mixed at room temperature. Cellulose acetate was not dissolved, but swelled in the organic solvent. The swelled mixture formed a slurry.

The swelled mixture was placed in a jacketed vessel. The mixture was slowly stirred while pouring a mixture of water and ethylene glycol (cooling medium) into the outer jacket. Thus, the mixture placed in the inner vessel was cooled to −30° C. (cooling rate: 8° C. per minute). The mixture was uniformly cooled to complete gelation (30 minutes).

The cooling medium in the outer jacket was removed from the vessel, and warmed water was poured into the jacket. After the mixture was melted to some extent, the mixture was stirred. Thus the mixture was warmed to room temperature (warming rate: 8° C. per minute).

The cooling and warming stages were repeated again.

The obtained solution (dope) was cast on a band using a band casting machine (effective length: 6 m). The dry thickness of the formed film was 100 μm. The temperature of the band was 0° C. The film was dried with air for 2 seconds (remaining solvent content: 50 wt. %), and peeled off the band. The film was further gradually dried at 100° C. for 3 minutes, at 130° C. for 5 minutes and at 160° C. for 5 minutes to evaporate the remaining solvent, while not fixing the end of the film. The obtained film (solvent content: 10 wt. %) was further heated at 150° C. for 1 hour.

Preliminary Experiments 2 to 5

Cellulose acetate films were prepared in the same manner as in the preliminary experiment 1, except that the average acetic acid content of cellulose acetate was changed to 55% (Experiment 2), 57.9% (Experiment 3), 59% (Experiment 4) or 61% (Experiment 5).

(Evaluation of Retardation Values and Birefringences)

The Rth and Re retardation values and the Bth and Bi birefringences of the obtained films were measured by using an ellipsometer (M-150, Japan Spectrum Co., Ltd.). The wavelength of light was 400, 550 or 700 nm. Further, the gradient (a) of the Rth distribution and the gradient (b) of the Re distribution were calculated. The results are set forth in Table 1.

TABLE 1

| Experiment | Acetic acid content | $Rth^{550}$ | $Bth^{550}$ | $Re^{550}$ | $Bi^{550}$ | Gradient (a) | Gradient (b) |
|---|---|---|---|---|---|---|---|
| 1 | 57% | 250 nm | 0.0025 | 5 nm | 0.00005 | −0.0010 | −0.0019 |
| 2 | 55% | 300 nm | 0.0030 | 8 nm | 0.00008 | −0.0020 | −0.0030 |
| 3 | 57.9% | 200 nm | 0.0020 | 4 nm | 0.00004 | −0.0003 | −0.0015 |
| 4 | 59% | 150 nm | 0.0015 | 3 nm | 0.00003 | 0.0004 | −0.0013 |
| 5 | 61% | 80 nm | 0.0008 | 2 nm | 0.00002 | 0.0012 | 0.0013 |

Preliminary Experiments 6 to 8

Cellulose acetate films were prepared in the same manner as in the preliminary experiments 1 to 3, except that diphenyl phosphate was used as a plasticizer in place of triphenyl phosphate. The retardation values and birefringences of the films were measured in the same manner as in the preliminary experiments 1 to 5. The results are set forth in Table 2.

TABLE 2

| Experiment | Acetic acid content | $Rth^{550}$ | $Bth^{550}$ | $Re^{550}$ | $Bi^{550}$ | Gradient (a) | Gradient (b) |
|---|---|---|---|---|---|---|---|
| 6 | 57% | 320 nm | 0.0032 | 5 nm | 0.00005 | −0.0020 | −0.0019 |
| 7 | 55% | 400 nm | 0.0040 | 8 nm | 0.00008 | −0.0030 | −0.0030 |
| 8 | 57.9% | 300 nm | 0.0030 | 4 nm | 0.00004 | −0.0006 | −0.0015 |

Preliminary Experiment 9

A cellulose acetate solution was prepared in the same manner as in the preliminary experiment 1, except that 1 weight part of butyrated hydroxytoluene (BHT) was added to 100 weight parts of the solution.

The obtained solution and the solution obtained in the preliminary experiment 1 were left at 80° C. for 200 hours. Viscosity was measured with respect to the solution of the experiment 1 before heating and the solutions of the experiments 1 and 9 after heating. The measurement was conducted by using a high viscosity viscometer (Rotovisco, Haake). The sharing speed was 0.1 (liter per second). The temperature was 0° C.

Further, cellulose acetate films were prepared in the same manner as in the preliminary experiment 1 except that the above-prepared solutions were used. The films were left at 90° C. and the relative humidity of 100% for 200 hours. The films were dissolved in methylene chloride. The limiting viscosity (η) of the solution was measured by using a viscosity tube in which flow time of water at 30° C. is 150 seconds. First, flow time (t0) of solvent (i.e., methylene chloride) was measured. Next, flow times (t) of solutions of 0.3, 0.6 and 1.0 g per liter were measured. The value of ln(t/t0)/c where c=0 based on the concentration c (g per dl) was obtained as the limiting viscosity (η). The results are set forth in Table 3.

TABLE 3

| Solution or film (number of experiment) | Viscosity of solution before preparing film (relative value) | Limiting viscosity (η) of solution of prepared film |
| --- | --- | --- |
| 1 (before heating) | 100 | 1.2 |
| 1 (after heating) | 80 | 0.8 |
| 7 (after heating) | 100 | 1.2 |

EXAMPLE 1

Support of Optical Compensatory Sheet

The cellulose acetate film prepared in the preliminary experiment 6 was used as a cellulose acetate support of an optical compensatory sheet.

Formation of Orientation Layer

A coating solution of the following composition was coated on the cellulose acetate support by using a slide coater. The coating amount was 25 ml per m². The coated layer was air dried at 60° C. for 60 seconds, and further air dried at 90° C. for 150 seconds to form an orientation layer.

| Coating solution for orientation layer | |
| --- | --- |
| The following denatured polyvinyl alcohol | 10 weight parts |
| Water | 371 weight parts |
| Methanol | 119 weight parts |
| Glutaric aldehyde (cross-linking agent) | 0.5 weight part |

(Denatured polyvinyl alcohol)

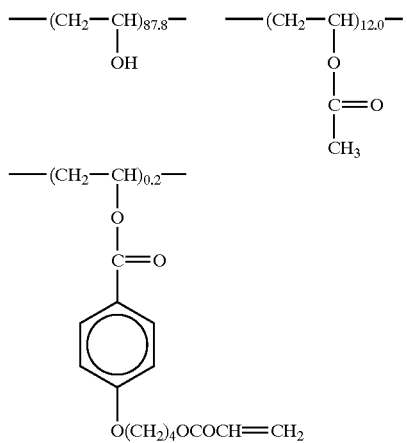

The formed layer was subjected to a rubbing treatment. The rubbing direction was parallel to the slow axis of the support.

Formation of Optically Anisotropic Layer

In 8.43 g of methyl ethyl ketone, 1.8 g of the following discotic liquid crystal molecule, 0.2 g of trimethylolpropane triacrylate denatured with ethylene oxide (V#360, Osaka Organic Chemical Co., Ltd.), 0.04 g of cellulose acetate butyrate (CAB551-0.2, Eastman Chemical), 0.06 g of a photopolymerization initiator (Irgacure 907, Ciba-Geigy) and 0.02 g of a sensitizer (Kayacure DETX, Nippon Kayaku Co., Ltd.) were dissolved to prepare a coating solution. The coating solution was coated on the orientation layer by using a wire bar of #2.5. The sheet was adhered to a metal frame, and heated in a thermostat at 130° C. for 2 minutes to align the discotic liquid crystal molecule. The sheet was irradiated with an ultraviolet ray at 130° C. for 1 minute by using a high pressure mercury lamp of 120 W/cm. The sheet was cooled to room temperature to obtain an optical compensatory sheet (1).

(Discotic liquid crystal molecule)

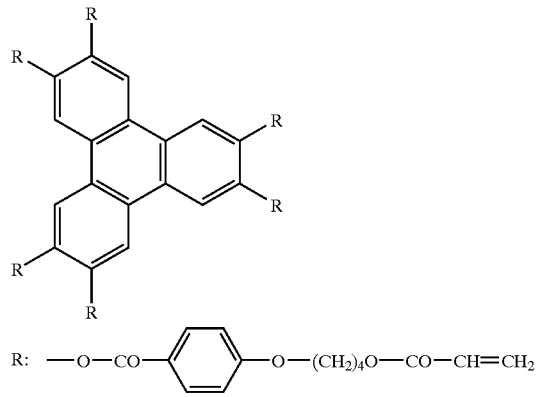

(Evaluation of Optical Compensatory Sheet)

The thickness of the optically anisotropic layer was about 1.0 μm. The retardation value of the optically anisotropic layer was measured along the rubbing direction. As a result, a direction having retardation of 0 was not found in the optically anisotropic layer.

The average inclined angle of the optic axis of the optically anisotropic layer, namely the angle between the direction of the minimum retardation and the normal line of the sheet was 28° ($\beta^1$=28°). The Re retardation value was 15 nm ($Re^1$=15), and the Rth retardation value was 35 nm ($Rth^1$=35).

The optical compensatory sheet (1) was vertically sliced along the rubbing direction to obtain a ultra-thin section (sample). The sample was placed an atmosphere of $OsO_4$ for 48 hours to dye the sample. The dyed sample was observed with a transparent electron microscope (TEM) to obtain a microscopic photograph. In the sample, the acryloyl group of the discotic liquid crystal molecule was dyed to show an image in the photograph.

Upon checking the photograph, the discotic units in the optically anisotropic layer were inclined from the surface plane of the support. The inclined angle continuously increased as the distance from the surface of the substrate increased.

(Preparation of VA Liquid Crystal Cell)

To a 3 wt. % aqueous solution of polyvinyl alcohol, 1 wt. % of octadecyldimethylammonium chloride (coupling agent) was added. The mixture was coated on a glass plate having an ITO electrode by using a spin coater. After heating the coating layer at 160° C., the layer was subjected to a rubbing treatment to form an orientation layer for vertical alignment. The orientation layers were formed on two glass plates. The rubbing direction on one glass plate was reverse to the rubbing direction on the other plate. The two glass plates were placed by facing the orientation layer with each other. The cell gap (d) was 5.5 μm. A liquid crystal molecule (Δn: 0.05) comprising an ester liquid crystal molecule and an ethane liquid crystal molecule was injected into the cell gap to prepare a liquid crystal cell of a vertical alignment mode. The product of Δn and d was 275 nm.

(Preparation of Liquid Crystal Display of VA Mode)

Two optical compensatory sheets (1) were arranged on both sides of the liquid crystal cell of a vertical alignment mode. The optically anisotropic layer of the optical compensatory sheet was faced with the glass plate of the liquid crystal cell. The rubbing direction of the orientation layer of the liquid crystal cell was reversely parallel to the rubbing direction of the orientation layer of the optical compensatory sheet. Two polarizing elements were arranged on the optical compensatory sheet according to a crossed nicols arrangement.

Voltage of a square wave was applied to the liquid crystal cell of the vertical alignment mode. An image was displayed according to an NB mode (black: 2V, white: 6V). A ratio of the transmittance (white/black) was measured as a contrast ratio. The upward, downward, leftward and rightward contrast ratios were measured by using a meter (EZ-Contrast 160D, ELDIM). As a result, the contrast ratio (white/black) was 300, and the viewing angles that can view an image having a contrast ratio of not smaller than 10 along upward (U), downward (D), leftward (L) or rightward (R) direction was 70°.

EXAMPLE 2

(Support of Optical Compensatory Sheet)

The cellulose acetate film prepared in the preliminary experiment 6 was used as a cellulose acetate support of an optical compensatory sheet.

(Formation of Orientation Layer)

A coating solution of the following composition was coated on the cellulose acetate support by using a slide coater. The coating amount was 25 ml per m². The coated layer was air dried at 60° C. for 2 minutes to form an orientation layer.

| Coating solution for orientation layer | |
|---|---|
| 10 Wt. % aqueous solution of the denatured polyvinyl alcohol used in Example 1 | 24 g |
| Water | 73 g |
| Methanol | 23 g |
| 50 wt. % aqueous solution of glutaric aldehyde (cross-linking agent) | 0.2 g |

The formed layer was subjected to a rubbing treatment. The rubbing direction was parallel to the slow axis of the support. The diameter of the rubbing roll was 150 mm, the speed of transferring the film was 10 m per minute, the rubbing angle was 60, and the rotating speed of the rubbing roll was 1,200 rpm.

(Formation of Optically Anisotropic Layer)

In 3.4 g of methyl ethyl ketone, 1.8 g of the discotic liquid crystal molecule used in Example 1, 0.2 g of trimethylolpropane triacrylate denatured with ethylene oxide (V#360, Osaka Organic Chemical Co., Ltd.), 0.04 g of cellulose acetate butyrate (CAB551-0.2, Eastman Chemical), 0.06 g of a photopolymerization initiator (Irgacure 907, Ciba-Geigy) and 0.02 g of a sensitizer (Kayacure DETX, Nippon Kayaku Co., Ltd.) were dissolved to prepare a coating solution. The coating solution was coated on the orientation layer by using a wire bar of #6. The sheet was adhered to a metal frame, and heated in a thermostat at 140° C. for 3 minutes to align the discotic liquid crystal molecule. The sheet was irradiated with an ultraviolet ray at 140° C. for 1 minute by using a high pressure mercury lamp of 120 W/cm. The sheet was cooled to room temperature to obtain an optical compensatory sheet (2).

(Evaluation of Optical Compensatory Sheet)

The thickness of the optically anisotropic layer was about 2.0 µm. The retardation value of the optically anisotropic layer was measured along the rubbing direction. As a result, a direction having retardation of 0 was not found in the optically anisotropic layer. Simulation of fitting the retardation values confirmed a hydride retardation wherein the negative uniaxes were changed from 40 to 68° successively along a thickness direction.

The Re retardation value of the optically anisotropic layer was 43 nm ($Re^1=43$), and the Rth retardation value of the optically anisotropic layer was 135 nm ($Rth^1=135$).

The optical compensatory sheet (2) was vertically sliced along the rubbing direction to obtain a ultra-thin section (sample). The sample was placed in an atmosphere of $OSO_4$ for 48 hours to dye the sample. The dyed sample was observed with a transparent electron microscope (TEM) to obtain a microscopic photograph. In the sample, the acryloyl group of the discotic liquid crystal molecule was dyed to show an image in the photograph.

Upon checking the photograph, the discotic units in the optically anisotropic layer were inclined from the surface plane of the support. The inclined angle continuously increased as the distance from the surface of the substrate increased.

(Preparation of OCB Liquid Crystal Cell)

A polyimide membrane was formed on a glass plate having an ITO electrode as an orientation layer. The orientation layer was subjected to a rubbing treatment. The rubbing direction on one glass plate was reverse to the rubbing direction on the other plate. The two glass plates were placed by facing the orientation layer with each other. The cell gap (d) was 8 µm. A liquid crystal molecule having Δn of 0.1396 (ZLI1132, Merck & Co., Inc.) was injected into the cell gap to prepare a liquid crystal cell of an optically compensatory bend mode. The product of Δn and d was 1,117 nm. The Re retardation value was 92 nm ($Re^4=92$).

(Preparation of Liquid Crystal Display of OCB Mode)

Two optical compensatory sheets (2) were arranged on both sides of the liquid crystal cell of an optically compensatory bend mode. The optically anisotropic layer of the optical compensatory sheet was faced with the glass plate of the liquid crystal cell. The rubbing direction of the orientation layer of the liquid crystal cell was reversely parallel to the rubbing direction of the orientation layer of the optical compensatory sheet. Two polarizing elements were arranged on the optical compensatory sheet according to a crossed nicols arrangement.

Voltage of a square wave was applied to the liquid crystal cell of the optically compensatory bend mode. An image was displayed according to an NW mode (black: 6V, white: 2V). A ratio of the transmittance (white/black) was measured as a contrast ratio. The upward, downward, left-ward and rightward contrast ratios were measured by using a meter (LCD-5000, Ohtsuka Electron Co., Ltd.). As a result, the viewing angles that can view an image having a contrast ratio of not smaller than 10 were 800 or more along upward (U) direction, 580 along downward (D) direction and 660 along leftward (L) or rightward (R) direction.

EXAMPLE 3

(Preparation of HAN Liquid Crystal Cell)

A polyimide membrane was formed on a glass plate having an ITO electrode as an orientation layer. The orientation layer was subjected to a rubbing treatment. Silicon oxide was evaporated on another a glass plate having an ITO electrode to form an orientation layer. The two glass plates were placed by facing the orientation layer with each other.

The cell gap (d) was 4 μm. A liquid crystal molecule having Δn of 0.1396 (ZLI1132, Merck & Co., Inc.) was injected into the cell gap to prepare a liquid crystal cell of a hybrid aligned nematic mode. The product of Δn and d was 558 nm. The Re retardation value was 46 nm ($Re^4$=46).

(Preparation of Liquid Crystal Display of HAN Mode)

One optical compensatory sheet (2) prepared in Example 2 was arranged on a display side of the liquid crystal cell of a hybrid aligned nematic mode. The optically anisotropic layer of the optical compensatory sheet was faced with the glass plate of the liquid crystal cell. The rubbing direction of the orientation layer of the liquid crystal cell was reversely parallel to the rubbing direction of the orientation layer of the optical compensatory sheet. A polarizing element was arranged on the optical compensatory sheet wherein the angle between the transmittance axis and the rubbing direction of the liquid crystal cell was 45°. A scattering plate was placed on the polarizing element. A mirror (reflecting board) was placed on the reverse side of the liquid crystal cell.

Light was irradiated to the liquid crystal cell of the hybrid aligned nematic mode along the direction inclined by 200 from the normal line of the display surface. Voltage of a square wave was applied to the liquid crystal cell of the hybrid aligned nematic mode. An image was displayed according to an NW mode (black: 6V, white: 2V). A ratio of the transmittance (white/black) was measured as a contrast ratio. The upward, downward, leftward and rightward contrast ratios were measured by using a meter (bm-7, TOPCON). As a result, the viewing angles that can view an image having a contrast ratio of not smaller than 10 were 44° along upward (U) direction, 26° along downward (D) direction and 39° along leftward (L) or rightward (R) direction.

EXAMPLE 4

(Stretch of Cellulose Acetate Film)

A cellulose acetate film was prepared in the same manner as in the preliminary experiment 6, except that the peeling speed (when the film is peeled off the band) and the rolling speed (when the formed film is rolled) was so adjusted that the ratio of the peeling speed to the rolling speed was 1:1.1. Thus, the film was stretched.

The $Re^{550}$ retardation value of the stretched film was 30. nm. The $Rth^{550}$ retardation value was 240 nm.

(Preparation of Optical Compensatory Sheet)

An optical compensatory sheet was prepared in the same manner as in Example 1, except that the stretched film was used as the support and the coating amount of the optically anisotropic layer was increased twice.

(Preparation of Liquid Crystal Display of VA Mode)

A liquid crystal display of VA mode was prepared in the same manner as in Example 1, except that the above-prepared optical compensatory sheet was used.

Voltage of a square wave was applied to the liquid crystal cell of the vertical alignment mode. An image was displayed according to an NB mode (black: 2V, white: 6V). A ratio of the transmittance (white/black) was measured as a contrast ratio. The upward, downward, leftward and rightward contrast ratios were measured by using a meter (EZ-Contrast 160D, ELDIM). As a result, the contrast ratio (white/black) was 290, and the viewing angles that can view an image having a contrast ratio of not smaller than 10 along upward (U), downward (D), leftward (L) or rightward (R) direction was 68° or more.

EXAMPLE 5

(Stretch of Cellulose Acetate Film)

A cellulose acetate film prepared in the preliminary experiment 6 was stretched at 140° C. in a long stretching machine. The film was stretched by 10% along the machine direction. The film was not stretched along the cross direction. Thus, the film was stretched along the longitudinal direction.

The $Re^{550}$ retardation value of the stretched film was 30 nm. The $Rth^{550}$ retardation value was 240 nm.

(Preparation of Optical Compensatory Sheet)

An optical compensatory sheet was prepared in the same manner as in Example 1, except that the stretched film was used as the support and the coating amount of the optically anisotropic layer was increased twice.

(Preparation of Liquid Crystal Display of VA Mode)

A liquid crystal display of VA mode was prepared in. the same manner as in Example 1, except that the above-prepared optical compensatory sheet was used.

Voltage of a square wave was applied to the liquid crystal cell of the vertical alignment mode. An image was displayed according to an NB mode (black: 2V, white: 6V). A ratio of the transmittance (white/black) was measured as a contrast ratio. The upward, downward, leftward and rightward contrast ratios were measured by using a meter (EZ-Contrast 160D, ELDIM). As a result, the contrast ratio (white/black) was 290, and the viewing angles that can view an image having a contrast ratio of not smaller than 10 along upward (U), downward (D), leftward (L) or rightward (R) direction was 68° or more.

EXAMPLE 6

(Preparation of Optical Compensatory Sheet)

An optical compensatory sheet was prepared in the same manner as in Example 2, except that the stretched film prepared in Example 4 was used as the support and the coating amount of the optically anisotropic layer was increased twice.

(Preparation of Liquid Crystal Display of OCB Mode)

A liquid crystal display of OCB mode was prepared in the same manner as in Example 2, except that the above-prepared optical compensatory sheet was used.

Voltage of a square wave was applied to the liquid crystal cell of the optically compensatory bend mode. An image was displayed according to an NW mode (black: 6V, white: 2V). A ratio of the transmittance (white/black) was measured as a contrast ratio. The upward, downward, leftward and rightward contrast ratios were measured by using a meter (LCD-5000, Ohtsuka Electron Co., Ltd.). As a result, the viewing angles that can view an image having a contrast ratio of not smaller than 10 were 80° or more along upward (U) direction, 60° along downward (D) direction and 68° along leftward (L) or rightward (R) direction.

EXAMPLE 7

(Preparation of Optical Compensatory Sheet)

An optical compensatory sheet was prepared in the same manner as in Example 2, except that the stretched film prepared in Example 5 was used as the support and the coating amount of the optically anisotropic layer was increased twice.

(Preparation of Liquid Crystal Display of OCB Mode)

A liquid crystal display of OCB mode was prepared in the same manner as in Example 2, except that the above-prepared optical compensatory sheet was used.

Voltage of a square wave was applied to the liquid crystal cell of the optically compensatory bend mode. An image was displayed according to an NVJ mode (black: 6V, white: 2V). A ratio of the transmittance (white/black) was measured as a contrast ratio. The upward, downward, leftward and rightward contrast ratios were measured by using a meter (LCD-5000, Ohtsuka Electron Co., Ltd.). As a result, the viewing angles that can view an image having a contrast ratio of not smaller than 10 were 800 or more along upward (U) direction, 600 along downward (D) direction and 680 along leftward (L) or rightward (R) direction.

EXAMPLE 8
(Preparation of Liquid Crystal Display of HAN Mode)

A liquid crystal display of HAN mode was prepared in the same manner as in Example 3, except that the optical compensatory sheet prepared in Example 6 was used.

Light was irradiated to the liquid crystal cell of the hybrid aligned nematic mode along the direction inclined by 20° from the normal line of the display surface. Voltage of a square wave was applied to the liquid crystal cell of the hybrid aligned nematic mode. An image was displayed according to an NW mode (black: 6V, white: 2V). A ratio of the transmittance (white/black) was measured as a contrast ratio. The upward, downward, leftward and rightward contrast ratios were measured by using a meter (bm-7, TOPCON). As a result, the viewing angles that can view an image having a contrast ratio of not smaller than 10 were 48° along upward (U) direction, 28° along downward (D) direction and 41° along leftward (L) or rightward (R) direction.

EXAMPLE 9
(Preparation of Liquid Crystal Display of HAN Mode)

A liquid crystal display of HAN mode was prepared in the same manner as in Example 3, except that the optical compensatory sheet prepared in Example 7 was used.

Light was irradiated to the liquid crystal cell of the hybrid aligned nematic mode along the direction inclined by 20° from the normal line of the display surface. Voltage of a square wave was applied to the liquid crystal cell of the hybrid aligned nematic mode. An image was displayed according to an NW mode (black: 6V, white: 2V). A ratio of the transmittance (white/black) was measured as a contrast ratio. The upward, downward, leftward and rightward contrast ratios were measured by using a meter (bm-7, TOPCON). As a result, the viewing angles that can view an image having a contrast ratio of not smaller than 10 were 48° along upward (U) direction, 28° along downward (D) direction and 41° along leftward (L) or rightward (R) direction.

EXAMPLE 10
(Preparation of Liquid Crystal Display of OCB Mode)

A liquid crystal display of OCB mode was prepared in the same manner as in Example 6, except that the projected direction of the nominal line of the discotic plane of the optical anisotropic layer and the slow axis of the cellulose acetate support was so adjusted that the angle between the average projected direction and the slow axis was 45°.

An image was displayed on the liquid crystal display. As a result, leak of light along an inclined direction was decreased while displaying a black image.

EXAMPLE 11
(Preparation of Liquid Crystal Display of OCB Mode)

A liquid crystal display of OCB mode was prepared in the same manner as in Example 7, except that the projected direction of the nominal line of the discotic plane of the optical anisotropic layer and the slow axis of the cellulose acetate support was so adjusted that the angle between the average projected direction and the slow axis was 45°.

An image was displayed on the liquid crystal display. As a result, leak of light along an inclined direction was decreased while displaying a black image.

EXAMPLE 12
(Preparation of Liquid Crystal Display of VA Mode)

The optical compensatory sheet prepared in Example 4 was attached to one side of a polarizing layer (stretched polyvinyl alcohol film doped with iodine). A commercially available protective film (TD80U, Fuji Photo Film Co., Ltd.) was attached to the other side of the polarizing layer to prepare a polarizing element.

A liquid crystal display of VA mode was prepared in the same manner as in Example 1, except that the optical compensatory sheet was not used and the above-prepared polarizing element was used on one side of the liquid crystal cell (the polarizing element on the other side was not changed).

The quality of the displayed image was the same as the quality in Example 1.

EXAMPLE 13
(Preparation of Liquid Crystal Display of OCB Mode)

The optical compensatory sheet prepared in Example 6 was attached to one side of a polarizing layer (stretched polyvinyl alcohol film doped with iodine). A commercially available protective film (TD80U, Fuji Photo Film Co., Ltd.) was attached to the other side of the polarizing layer to prepare a polarizing element.

A liquid crystal display of OCB mode was prepared in the same manner as in Example 2, except that the optical compensatory sheet was not used and the above-prepared polarizing element was used on one side of the liquid crystal cell (the polarizing element on the other side was not changed).

The quality of the displayed image was the same as the quality in Example 2.

EXAMPLE 14
(Preparation of Liquid Crystal Display of HAN Mode)

A liquid crystal display of HAN mode was prepared in the same manner as in Example 3, except that the optical compensatory sheet was not used and the above-prepared polarizing element was used the display side of the liquid crystal cell.

The quality of the displayed image was the same as the quality in Example 3.

Preliminary Experiment 10

With 45 weight parts of cellulose acetate (average acetic acid content: 60.9%), 0.90 weight parts of the birefringence increasing agent (5), 232.72 weight parts of methylene chloride, 42.57 weight parts of methanol and 8.50 weight parts of n-butanol were mixed at room temperature to prepare a solution.

The obtained solution (dope) was cast on a band using a band casting machine (effective length: 6 m). The dry thickness of the formed film was 100 µm.

The Rth retardation values and Bth birefringences of the obtained film were measured by using an ellipsometer (M-150, Japan Spectrum Co., Ltd.). The wavelength of light was 550 nm. The results are set forth in Table 4.

Preliminary Experiment 11

A cellulose acetate film was prepared and evaluated in the same manner as in the preliminary experiment 10, except that the birefringence increasing agent (5) was not used. The results are set forth in Table 4.

Preliminary Experiments 12 to 20

Cellulose acetate films were prepared and evaluated in the same manner as in the preliminary experiment 10, except that 0.90 weight parts of the birefringence increasing agents (6), (7), (31), (36), (37), (38), (44), (50) and (81) were used in place of the agent (5) respectively. The results are set forth in Table 4.

Preliminary Experiments 21 to 24

Cellulose acetate films were prepared and evaluated in the same manner as in the preliminary experiment 10, except that 0.90 weight parts of the following comparative compounds (x1), (x2), (x3) and (x4) were used in place of the agent (5) respectively. The results are set forth in Table 4.

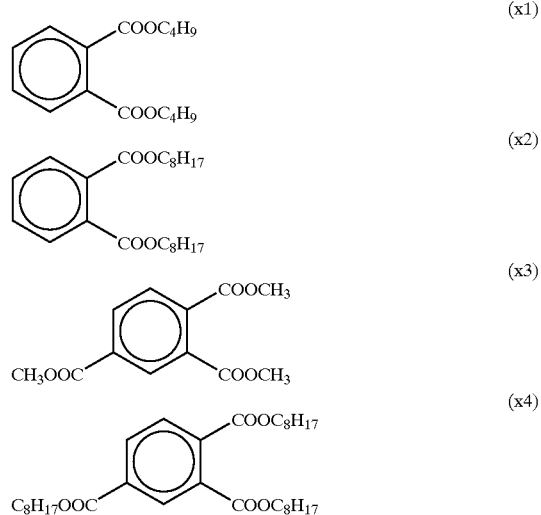

TABLE 4

| Film | Birefringence increasing agent | $Rth^{550}$ retardation value | $Bth^{550}$ birefringence |
|---|---|---|---|
| 10 | (5) | 181 nm | 0.00181 |
| 11 | None | 20 nm | 0.00020 |
| 12 | (6) | 200 nm | 0.00200 |
| 13 | (7) | 222 nm | 0.00222 |
| 14 | (31) | 99 nm | 0.00099 |
| 15 | (36) | 158 nm | 0.00158 |
| 16 | (37) | 158 nm | 0.00158 |
| 17 | (38) | 166 nm | 0.00166 |
| 18 | (44) | 71 nm | 0.00071 |
| 19 | (50) | 75 nm | 0.00075 |
| 20 | (81) | 80 nm | 0.00080 |
| 21 | (x1) | 30 nm | 0.00030 |
| 22 | (x2) | 30 nm | 0.00030 |
| 23 | (x3) | 30 nm | 0.00030 |
| 24 | (x4) | 30 nm | 0.00030 |

Preliminary Experiment 25

With 45 weight parts of cellulose acetate (average acetic acid content: 60.9%), 0.90 weight parts of the birefringence increasing agent (3), 2.75 weight parts of triphenyl phosphate (plasticizer), 2.20 weight parts of biphenyldiphenyl phosphate (plasticizer), 232.72 weight parts of methylene chloride, 42.57 weight parts of methanol and 8.50 weight parts of n-butanol were mixed at room temperature to prepare a solution.

The obtained solution (dope) was cast on a band using a band casting machine (effective length: 6 m). The dry thickness of the formed film was 100 μm.

The Rth retardation values and the Bth birefringences of the obtained film were measured by using an ellipsomreter (M-150, Japan Spectrum Co., Ltd.). The wavelength of light was 550 nm. The results are set forth in Table 5.

Preliminary Experiment 26

A cellulose acetate film was prepared and evaluated in the same manner as in the preliminary experiment 25, except that the birefringence increasing agent (3) was not used. The results are set forth in Table 5.

Preliminary Experiments 27 to 29

Cellulose acetate films were prepared and evaluated in the same manner as in the preliminary experiment 25, except that 0.90 weight parts of the birefringence increasing agents (8), (31) and (75) were used in place of the agent (3) respectively. The results are set forth in Table 5.

TABLE 5

| Film | Birefringence increasing agent | $Rth^{550}$ retardation value | $Bth^{550}$ birefringence |
|---|---|---|---|
| 25 | (3) | 120 nm | 0.00120 |
| 26 | None | 50 nm | 0.00050 |
| 27 | (8) | 120 nm | 0.00120 |
| 28 | (31) | 180 nm | 0.00180 |
| 29 | (75) | 120 nm | 0.00120 |

Preliminary Experiments 30 to 33

Cellulose acetate films were prepared and evaluated in the same manner as in the preliminary experiments 25 and 27 to 29, except that the amount of the birefringence increasing agent was changed to 2.00 weight parts. The results are set forth in Table 6.

TABLE 6

| Film | Birefringence increasing agent | $Rth^{550}$ retardation value | $Bth^{550}$ birefringence |
|---|---|---|---|
| 30 | (3) | 240 nm | 0.00240 |
| 26 | None | 50 nm | 0.00050 |
| 31 | (3) | 240 nm | 0.00240 |
| 32 | (31) | 300 nm | 0.00300 |
| 33 | (75) | 240 nm | 0.00240 |

EXAMPLE 15

(Preparation of Liquid Crystal Display of VA Mode)

A liquid crystal display of VA mode was prepared in the same manner as in Example 1, except that the cellulose acetate film prepared in the preliminary experiment 25 was used as the cellulose acetate support of the optical compensatory sheet.

Voltage of a square wave was applied to the liquid crystal cell of the vertical alignment mode. An image was displayed according to an NB mode (black: 2V, white: 6V). A ratio of the transmittance (white/black) was measured as a contrast ratio. The upward, downward, leftward and rightward contrast ratios were measured by using a meter (EZ-Contrast 160D, ELDIM). As a result, the contrast ratio (white/black) was 300, and the viewing angles that can view an image having a contrast ratio of not smaller than 10 along upward (U), downward (D), leftward (L) or rightward (R) direction was 70°.

EXAMPLE 16
(Preparation of Liquid Crystal Display of OCB Mode)

A liquid crystal display of OCB mode was prepared in the same manner as in Example 2, except that the cellulose acetate film prepared in the preliminary experiment 25 was used as the cellulose acetate support of the optical compensatory sheet.

Voltage of a square wave was applied to the liquid crystal cell of the optically compensatory bend mode. An image was displayed according to an NW mode (black: 6V, white: 2V). A ratio of the transmittance (white/black) was measured as a contrast ratio. The upward, downward, leftward and rightward contrast ratios were measured by using a meter (LCD-5000, Ohtsuka Electron Co., Ltd.). As a result, the viewing angles that can view an image having a contrast ratio of not smaller than 10 were 800 or more along upward (U) direction, 580 along downward (D) direction and 660 along leftward (L) or rightward (R) direction.

EXAMPLE 17
(Preparation of Liquid Crystal Display of HAN Mode)

A liquid crystal display of HAN mode was prepared in the same manner as in Example 3, except that the cellulose acetate film prepared in the preliminary experiment 25 was used as the cellulose acetate support of the optical compensatory sheet.

Light was irradiated to the liquid crystal cell of the hybrid aligned nematic mode along the direction inclined by 20° from the normal line of the display surface. Voltage of a square wave was applied to the liquid crystal cell of the hybrid aligned nematic mode. An image was displayed according to an NW mode (black: 6V, white: 2V). A ratio of the transmittance (white/black) was measured as a contrast ratio. The upward, downward, leftward and rightward contrast ratios were measured by using a meter (bm-7, TOPCON). As a result, the viewing angles that can view an image having a contrast ratio of not smaller than 10 were 44° along upward (U) direction, 26° along downward (D) direction and 39° along leftward (L) or rightward (R) direction.

EXAMPLE 18
(Stretch of Cellulose Acetate Film)

A cellulose acetate film was prepared in the same manner as in the preliminary experiment 25, except that 1.35 weight parts of the birefringence increasing agent (4) was used in place of 0.90 weight parts of the birefringence increasing agent (3), and the peeling speed (when the film is peeled off the band) and the rolling speed (when the formed film is rolled) was so adjusted that the ratio of the peeling speed to the rolling speed was 1:1.1. Thus, the film was stretched.

The $Re^{550}$ retardation value of the stretched film was 30 nm. The $Rth^{550}$ retardation value was 240 nm.

(Preparation of Optical Compensatory Sheet)

An optical compensatory sheet was prepared in the same manner as in Example 15, except that the stretched film was used as the support and the coating amount of the optically anisotropic layer was increased twice.

(Preparation of Liquid Crystal Display of VA Mode)

A liquid crystal display of VA mode was prepared. in the same manner as in Example 15, except that the above-prepared optical compensatory sheet was used.

Voltage of a square wave was applied to the liquid crystal cell of the vertical alignment mode. An image was displayed according to an NB mode (black: 2V, white: 6V). A ratio of the transmittance (white/black) was measured as a contrast ratio. The upward, downward, leftward and rightward contrast ratios were measured by using a meter (EZ-Contrast 160D, ELDIM). As a result, the contrast ratio (white/black) was 290, and the viewing angles that can view an image having a contrast ratio of not smaller than 10 along upward (U), downward (D), leftward (L) or rightward (R) direction was 68° or more.

EXAMPLE 19
(Stretch of Cellulose Acetate Film)

A cellulose acetate film was prepared in the same manner as in the preliminary experiment 25, except that 1.35 weight parts of the birefringence increasing agent (4) was used in place of 0.90 weight parts of the birefringence increasing agent (3). The obtained film was stretched at 140° C. in a long stretching machine. The film was stretched by 10% along the machine direction. The film was not stretched along the cross direction. Thus, the film was stretched along the longitudinal direction.

The Re retardation value of the stretched film was 30 nm. The Rth retardation value was 240 nm.

(Preparation of Optical Compensatory Sheet)

An optical compensatory sheet was prepared in the same manner as in Example 15, except that the stretched film was used as the support and the coating amount of the optically anisotropic layer was increased twice.

(Preparation of Liquid Crystal Display of VA Mode)

A liquid crystal display of VA mode was prepared in the same manner as in Example 1, except that the above-prepared optical compensatory sheet was used.

Voltage of a square wave was applied to the liquid crystal cell of the vertical alignment mode. An image was displayed according to an NB mode (black: 2V, white: 6V). A ratio of the transmittance (white/black) was measured as a contrast ratio. The upward, downward, leftward and rightward contrast ratios were measured by using a meter (EZ-Contrast 160D, ELDIM). As a result, the contrast ratio (white/black) was 290, and the viewing angles that can view an image having a contrast ratio of not smaller than 10 along upward (U), downward (D), leftward (L) or rightward (R) direction was 68° or more.

EXAMPLE 20
(Preparation of Optical Compensatory Sheet)

An optical compensatory sheet was prepared in the same manner as in Example 16, except that the stretched film prepared in Example 18 was used as the support and the coating amount of the optically anisotropic layer was increased twice.

(Preparation of Liquid Crystal Display of OCB Mode)

A liquid crystal display of OCB mode was prepared in the same manner as in Example 16, except that the above-prepared optical compensatory sheet was used.

Voltage of a square wave was applied to the liquid crystal cell of the optically compensatory bend mode. An image was displayed according to an NW mode (black: 6V, white: 2V). A ratio of the transmittance (white/black) was measured as a contrast ratio. The upward, downward, leftward and rightward contrast ratios were measured by using a meter (LCD-5000, Ohtsuka Electron Co., Ltd.). As a result, the viewing angles that can view an image having a contrast ratio of not smaller than 10 were 80° or more along upward (U) direction, 60° along downward (D) direction and 68° along leftward (L) or rightward (R) direction.

EXAMPLE 21
(Preparation of Optical Compensatory Sheet)

An optical compensatory sheet was prepared in the same manner as in Example 16, except that the stretched film prepared in Example 19 was used as the support and the coating amount of the optically anisotropic layer was increased twice.

(Preparation of Liquid Crystal Display of OCB Mode)

A liquid crystal display of OCB mode was prepared in the same manner as in Example 16, except that the above-prepared optical compensatory sheet was used.

Voltage of a square wave was applied to the liquid crystal cell of the optically compensatory bend mode. An image was displayed according to an NW mode (black: 6V, white: 2V). A ratio of the transmittance (white/black) was measured as a contrast ratio. The upward, downward, leftward and rightward contrast ratios were measured by using a meter (LCD-5000, Ohtsuka Electron Co., Ltd.). As a result, the viewing angles that can view an image having a contrast ratio of not smaller than 10 were 80° or more along upward (U) direction, 600 along downward (D) direction and 68° along leftward (L) or rightward (R) direction.

EXAMPLE 22
(Preparation of Liquid Crystal Display of HAN Mode)

A liquid crystal display of HAN mode was prepared in the same manner as in Example 17, except that the optical compensatory sheet prepared in Example 20 was used.

Light was irradiated to the liquid crystal cell of the hybrid aligned nematic mode along the direction inclined by 20° from the normal line of the display surface. Voltage of a square wave was applied to the liquid crystal cell of the hybrid aligned nematic mode. An image was displayed according to an NW mode (black: 6V, white: 2V). A ratio of the transmittance (white/black) was measured as a contrast ratio. The upward, downward, leftward and rightward contrast ratios were measured by using a meter (bm-7, TOPCON). As a result, the viewing angles that can view an image having a contrast ratio of not smaller than 10 were 480 along upward (U) direction, 280 along downward (D) direction and 41° along leftward (L) or rightward (R) direction.

EXAMPLE 23
(Preparation of Liquid Crystal Display of HAN Mode)

A liquid crystal display of HAN mode was prepared in the same manner as in Example 17, except that the optical compensatory sheet prepared in Example 21 was used.

Light was irradiated to the liquid crystal cell of the hybrid aligned nematic mode along the direction inclined by 20° from the normal line of the display surface. Voltage of a square wave was applied to the liquid crystal cell of the hybrid aligned nematic mode. An image was displayed according to an NW mode (black: 6V, white: 2V). A ratio of the transmittance (white/black) was measured as a contrast ratio. The upward, downward, leftward and rightward contrast ratios were measured by using a meter (bm-7, TOPCON). As a result, the viewing angles that can view an image having a contrast ratio of not smaller than 10 were 48° along upward (U) direction, 28° along downward (D) direction and 41° along leftward (L) or rightward (R) direction.

EXAMPLE 24
(Preparation of Liquid Crystal Display of OCB Mode)

A liquid crystal display of OCB mode was prepared in the same manner as in Example 20, except that the projected direction of the nominal line of the discotic plane of the optical anisotropic layer and the slow axis of the cellulose acetate support was so adjusted that the angle between the average projected direction and the slow axis was 45°.

An image was displayed on the liquid crystal display. As a result, leak of light along an inclined direction was decreased while displaying a black image.

EXAMPLE 25
(Preparation of Liquid Crystal Display of OCB Mode)

A liquid crystal display of OCB mode was prepared in the same manner as in Example 21, except that the projected direction of the nominal line of the discotic plane of the optical anisotropic layer and the slow axis of the cellulose acetate support was so adjusted that the angle between the average projected direction and the slow axis was 45°.

An image was displayed on the liquid crystal display. As a result, leak of light along an inclined direction was decreased while displaying a black image.

EXAMPLE 26
(Preparation of Liquid Crystal Display of VA Mode)

The optical compensatory sheet prepared in Example 18 was attached to one side of a polarizing layer (stretched polyvinyl alcohol film doped with iodine). A commercially available protective film (TD80U, Fuji Photo Film Co., Ltd.) was attached to the other side of the polarizing layer tp prepare a polarizing element.

A liquid crystal display of VA mode was prepared in the same manner as in Example 15, except that the optical compensatory sheet was not used and the above-prepared polarizing element was used on one side of the liquid crystal cell (the polarizing element on the other side was not changed).

The quality of the displayed image was the same as the quality in Example 15.

EXAMPLE 27
(Preparation of Liquid Crystal Display of OCB Mode)

The optical compensatory sheet prepared in Example 20 was attached to one side of a polarizing layer (stretched polyvinyl alcohol film doped with iodine). A commercially available protective film (TD80U, Fuji Photo Film Co., Ltd.) was attached to the other side of the polarizing layer to prepare a polarizing element.

A liquid crystal display of OCB mode was prepared in the same manner as in Example 16, except that the optical compensatory sheet was not used and the above-prepared polarizing element was used on one side of the liquid crystal cell (the polarizing element on the other side was not changed).

The quality of the displayed image was the same as the quality in Example 16.

EXAMPLE 28
(Preparation of Liquid Crystal Display of HAN Mode)

A liquid crystal display of HAN mode was prepared in the same manner as in Example 17, except that the optical compensatory sheet was not used and the above-prepared polarizing element was used the display side of the liquid crystal cell.

The quality of the displayed image was the same as the quality in Example 17.

EXAMPLE 29
(Preparation of Transparent Support)

With 45 weight parts of cellulose acetate (average acetic acid content: 60.9%), 1.35 weight parts of the birefringence increasing agent (4), 232.72 weight parts of methylene chloride, 42.57 weight parts of methanol and 8.50 weight parts of n-butanol were mixed at room temperature to prepare a solution.

The obtained solution (dope) was cast on a band using a band casting machine (effective length: 6 m). The dry thickness of the formed film was 100 μm.

The Rth retardation value and Bth birefringence of the obtained film were measured by using an ellipsometer (M-150, Japan Spectrum Co., Ltd.). The wavelength of light was 550 nm. The $Rth^{550}$ retardation value was 80 μm, and the $Bth^{550}$ birefringence was 0.0008.

(Formation of Orientation Layer)

A gelatin undercoating layer (thickness: 0.1 μm) was formed on the transparent support.

An aqueous solution of the denatured polyvinyl alcohol used in Example 1 was coated on the undercoating layer, and air dried at 80° C. The layer was subjected to a rubbing treatment to form an orientation layer.

(Formation of Optically Anisotropic Layer)

In 3.43 g of methyl ethyl ketone, 1.8 g of the discotic liquid crystal molecule used in Example 1, 0.2 g of trimethylolpropane triacrylate denatured with ethylene oxide (V#360, Osaka Organic Chemical Co., Ltd.), 0.04 g of cellulose acetate butyrate (CAB531-1.0, Eastman Chemical), 0.06 g of a photopolymerization initiator (Irgacure 907, Ciba-Geigy) and 0.02 g of a sensitizer (Kayacure DETX, Nippon Kayaku Co., Ltd.) were dissolved to prepare a coating solution. The coating solution was coated on the orientation layer by using a wire bar of #3. The sheet was adhered to a metal frame, and heated in a thermostat at 120° C. for 3 minutes to align the discotic liquid crystal molecule. The sheet was irradiated with an ultraviolet ray at 120° C. for 1 minute by using a high pressure mercury lamp of 120 W/cm. The sheet was cooled to room temperature.

The thickness of the optically anisotropic layer was 1.0 μm. The retardation value of the optically anisotropic layer was measured along the rubbing direction. The average inclined angle of the optic axis of the optically anisotropic layer was 14°. The Rth retardation value of the sheet was 154 nm.

(Surface Treatment of Transparent Support)

The sheet (comprising the transparent support and the optically anisotropic layer) was immersed in 1 N aqueous solution of sodium hydroxide at 50° C. for 3 minutes. The sheet was washed with water in a bath at the room temperature. The sheet was neutralized with 1.5 N of sulfuric acid. The sheet was again washed with water in a bath at the room temperature. The sheet was air dried at 100° C. Thus, the back side (on which the optically anisotropic layer was not provided) of the transparent support was subjected to the saponification treatment.

(Preparation of Transparent Protective Film)

A cellulose triacetate film (Fuji TAC, Fuji Photo Film Co., Ltd.) having the thickness of 100 μm was subjected to a saponification treatment in the same manner as is described above to prepare a transparent protective film. The $Rth^{550}$ retardation value of the protective film was 40 nm, and the $Bth^{550}$ birefringence was 0.0004. The optical axis of the film was essentially parallel to the nominal line of the film, which means that the film is optically uniaxially negative.

(Preparation of Ellipsoidal Polarizing Plate)

A stretched polyvinyl alcohol film adsorbing iodine was used as a polarizing membrane. The transparent support of the sheet (comprising the support and the optical anisotropic layer) was attached to one side of the polarizing membrane by using a polyvinyl alcohol adhesive. The transparent protective film was attached to the other side of the membrane by using a polyvinyl alcohol adhesive. The light absorbing axis of the polarizing membrane was parallel to the rubbing direction of the optically anisotropic layer. Thus an ellipsoidal polarizing plate was prepared.

The ellipsoidal polarizing plate was attached to a glass plate by using an acrylic adhesive, and subjected to an aging treatment at a high temperature under a high pressure. The plate was further placed in a thermostat of 90° C., and left for 500 hours. The ellipsoidal polarizing plate was then examined. As a result, problems (such as separation, bubbles, wrinkles) were not observed. The plate was furthermore placed in the thermostat of 90° C., and left for 500 hours (total: 1,000 hours). The ellipsoidal polarizing plate was then examined. As a result, problems (such as separation, bubbles, wrinkles) were not observed.

(Preparation of Liquid Crystal Display)

A polyimide orientation layer was formed on a transparent ITO electrode on a glass substrate. The orientation layer was subjected to a rubbing treatment. The two substrates were laminated while placing spacers of 5 μm between the substrates. The rubbing direction of one orientation layer was perpendicular to the rubbing direction of the other orientation layer. A rod-like liquid crystal molecules (ZL4792, Merck Japan) was inserted tin to the gap of the substrates to form a liquid crystal layer. The Δn of the liquid crystal molecule was 0.0969.

Two ellipsoidal polarizing plates were laminated on the each side of the prepared TN liquid crystal cell to prepare a liquid crystal display. The optically anisotropic layer was attached to the substrate of the liquid crystal cell. The rubbing direction of the optically anisotropic layer was parallel to the rubbing direction of the liquid crystal cell.

Voltage was applied to the liquid crystal cell. A ratio of the transmittance (white of 2V per black of 5V) was measured as a contrast ratio. The upward, downward, leftward and rightward contrast ratios were measured. As a result, the viewing angles that can view an image having a contrast ratio of not smaller than 10 were 1100 along upward and downward direction and 120° along leftward and rightward direction.

EXAMPLE 30

(Surface Treatment of Transparent Support)

On the transparent support of the sheet (comprising the support and the optically anisotropic layer) prepared in Example 29, 1.5 N aqueous solution of sodium hydroxide (60° C.) was sprayed. An extra amount of the solution was scraped with a bar coater. After 3 minutes, the sheet was washed with water in a bath at the room temperature. The sheet was neutralized with 1.5 N of sulfuric acid. The sheet was again washed with water in a bath at the room temperature. The sheet was air dried at 100° C. Thus, the back side (on which the optically anisotropic layer was not provided) of the transparent support was subjected to the saponification treatment.

(Preparation of Ellipsoidal Polarizing Plate)

An ellipsoidal polarizing plate was prepared in the same manner as in Example 29, except that the above-treated sheet was used.

The prepared ellipsoidal polarizing plate was attached to a glass plate by using an acrylic adhesive, and subjected to an aging treatment at a high temperature under a high pressure. The plate was further placed in a thermostat of 90° C., and left for 500 hours. The ellipsoidal polarizing plate was then examined. As a result, problems (such as separation, bubbles, wrinkles) were not observed. The plate was furthermore placed in the thermostat of 90° C., and left for 500 hours (total: 1,000 hours). The ellipsoidal polarizing plate was then examined. As a result; problems (such as separation, bubbles, wrinkles) were not observed.

(Preparation of Liquid Crystal Display)

A liquid crystal display was prepared in the same manner as in Example 29, except that the above-prepared ellipsoidal polarizing plate was used.

Voltage was applied to the liquid crystal cell. A ratio of the transmittance (white of 2V per black of 5V) was measured as a contrast ratio. The upward, downward, leftward and rightward contrast ratios were measured. As a result, the viewing angles that can view an image having a contrast ratio of not smaller than 10 were 110° along upward and downward direction and 120° along leftward and rightward direction.

EXAMPLE 31

(Surface Treatment of Transparent Support)

The transparent support of the sheet (comprising the support and the optically anisotropic layer) prepared in Example 29 was subjected to a corona discharge treatment by using a solid state corona discharging machine (Model 6KVA, Pillar). The treating speed was 20 m per min, treating amount was 0.375 KV·A·min/m$^2$, the discharging frequency was 9.6 KHz, and the gap clearance between the electrode and the dielectric roll was 1.6 mm. Thus, the back side (on which the optically anisotropic layer was not provided) of the transparent support was subjected to the corona discharge treatment.

(Preparation of Ellipsoidal Polarizing Plate)

An ellipsoidal polarizing plate was prepared in the same manner as in Example 29, except that the above-treated sheet was used.

The prepared ellipsoidal polarizing plate was attached to a glass plate by using an acrylic adhesive, and subjected to an aging treatment at a high temperature under a high pressure. The plate was further placed in a thermostat of 90° C., and left for 500 hours. The ellipsoidal polarizing plate was then examined. As a result, problems (such as separation, bubbles, wrinkles) were not observed. The plate was furthermore placed in the thermostat of 90° C., and left for 500 hours (total: 1,000 hours). The ellipsoidal polarizing plate was then examined. As a result, problems (such as separation, bubbles, wrinkles) were not observed.

(Preparation of Liquid Crystal Display)

A liquid crystal display was prepared in the same manner as in Example 29, except that the above-prepared ellipsoidal polarizing plate was used.

Voltage was applied to the liquid crystal cell. A ratio of the transmittance (white of 2V per black of 5V) was measured as a contrast ratio. The upward, downward, leftward and rightward contrast ratios were measured. As a result, the viewing angles that can view an image having a contrast ratio of not smaller than 10 were 1100 along upward and downward direction and 120° along leftward and rightward direction.

EXAMPLE 32

(Surface Treatment of Transparent Support)

The transparent support of the sheet (comprising the support and the optically anisotropic layer) prepared in Example 29 was irradiated with an ultraviolet ray at 115° C. for 2 minutes. The light source was a cylinder crystal high pressure mercury lamp of 1 KW. The distance between the lamp and the transparent support was 10 cm, the width of the lamp was 50 cm, the arc length of the lamp was 30 cm, the main wavelength of the ultraviolet ray was 365 nm, and the amount of the exposure was 500 mJ/cm$^2$. Thus, the back side (on which the optically anisotropic layer was not provided) of the transparent support was subjected to the ultraviolet irradiation treatment.

(Preparation of Ellipsoidal Polarizing Plate)

An ellipsoidal polarizing plate was prepared in the same manner as in Example 29, except that the above-treated sheet was used.

The prepared ellipsoidal polarizing plate was attached to a glass plate by using an acrylic adhesive, and subjected to an aging treatment at a high temperature under a high pressure. The plate was further placed in a thermostat of 90° C., and left for 500 hours. The ellipsoidal polarizing plate was then examined. As a result, problems (such as separation, bubbles, wrinkles) were not observed. The plate was furthermore placed in the thermostat of 90° C., and left for 500 hours (total: 1,000 hours). The ellipsoidal polarizing plate was then examined. As a result, problems (such as separation, bubbles, wrinkles) were not observed.

(Preparation of Liquid Crystal Display)

A liquid crystal display was prepared in the same manner as in Example 29, except that the above-prepared ellipsoidal polarizing plate was used.

Voltage was applied to the liquid crystal cell. A ratio of the transmittance (white of 2V per black of 5V) was measured as a contrast ratio. The upward, downward, leftward and rightward contrast ratios were measured. As a result, the viewing angles that can view an image having a contrast ratio of not smaller than 10 were 110° along upward and downward direction and 120° along leftward and rightward direction.

EXAMPLE 33

(Preparation of Transparent Support)

With 45 weight parts of cellulose acetate (average acetic acid content: 60.9%), 1.35 weight parts of the birefringence increasing agent (4), 2.75 weight parts of triphenyl phosphate (plasticizer), 2.20 weight parts of biphenyl diphenyl phosphate, 232.72 weight parts of methylene chloride, 42.57 weight parts of methanol and 8.50 weight parts of n-butanol were mixed at room temperature to prepare a solution.

The obtained solution (dope) was cast on a band using a band casting machine (effective length: 6 m). The dry thickness of the formed film was 100 μm.

The Rth retardation value and Bth birefringence of the obtained film were measured by using an ellipsometer (M-150, Japan Spectrum Co., Ltd.). The wavelength of light was 550 nm. The Rth$^{550}$ retardation value was 240 nm, and the Bth$^{550}$ birefringence was 0.0024. The Re$^{550}$ retardation value was 5 nm, and the Bi$^{550}$ birefringence was 0.00005.

(Formation of Orientation Layer and Optically Anisotropic Layer)

An orientation layer and an optically anisotropic layer were formed in the same manner as in Example 29, except that the above-prepared transparent support was used.

(Preparation of Ellipsoidal Polarizing Plate)

An ellipsoidal polarizing plate was prepared in the same manner as in Example 29, except that the above-prepared lamination was used.

(Preparation of Liquid Crystal Display)

A liquid crystal display was prepared and evaluated in the same manner as in Example 29, except that the above-prepared ellipsoidal polarizing plate was used. As a result, a good image was displayed in the same manner as in Example 29.

EXAMPLE 33

(Preparation of Transparent Support)

With 45 weight parts of cellulose acetate (average acetic acid content: 60.9%), 1.01 weight part of the birefringence increasing agent (4), 0.34 weight part of the birefringence increasing agent (95), 2.75 weight parts of triphenyl phosphate (plasticizer), 2.20 weight parts of biphenyl diphenyl phosphate, 232.72 weight parts of methylene chloride, 42.57 weight parts of methanol and 8.50 weight parts of n-butanol were mixed at room temperature to prepare a solution.

The obtained solution (dope) was cast on a band using a band casting machine (effective length: 6 m). The dry thickness of the formed film was 100 um.

The Rth retardation value and Bth birefringence of the obtained film were measured by using an ellipsometer (M-150, Japan Spectrum Co., Ltd.). The wavelength of light was 550 nm. The $Rth^{550}$ retardation value was 240 nm, and the $Bth^{550}$ birefringence was 0.0024. The $Re^{550}$ retardation value was 5 nm, and the $Bi^{550}$ birefringence was 0.00005.

(Formation of Orientation Layer and Optically Anisotropic Layer)

An orientation layer and an optically anisotropic layer were formed in the same manner as in Example 29, except that the above-prepared transparent support was used.

(Preparation of Ellipsoidal Polarizing Plate)

An ellipsoidal polarizing plate was prepared in the same manner as in Example 29, except that the above-prepared lamination was used.

(Preparation of Liquid Crystal Display)

A liquid crystal display was prepared and evaluated in the same manner as in Example 29, except that the above-prepared ellipsoidal polarizing plate was used. As a result, a good image was displayed in the same manner as in Example 29.

We claim:

1. An optical compensatory sheet comprising a cellulose acetate support comprising cellulose acetate, and an optically anisotropic layer containing a discotic liquid crystal molecule, wherein the cellulose acetate support has a $Bth^{550}$ birefringence defined by the following formula in the range of 0.0007 to 0.004:

$$Bth^{550}=\{(nx+ny)/2\}-nz$$

in which each of nx and ny is a principal refractive index measured by light of 550 nm in plane of the support; and nz is a principal refractive index measured by light of 550 nm along a thickness direction of the support, wherein the cellulose acetate support has a thickness in the range of 40 to 120 μm, wherein the cellulose acetate support contains a compound having at least two aromatic rings, the compound being present in an amount of 0.3 to 20 weight parts based on 100 weight parts of the cellulose acetate, and wherein the compound having at least two aromatic rings has a plane of a π bond of at least seven carbon atoms and has a molecular weight in the range of 300 to 800.

2. The optical compensatory sheet as defined in claim 1, wherein the cellulose acetate support has a $Bi^{550}$ birefringence defined by the following formula in the range of 0.0002 to 0.003:

$$Bi^{550}=|nx-ny|$$

in which each of nx and ny is a principal refractive index measured by light of 550 nm in plane of the support.

3. The optical compensatory sheet as defined in claim 1, wherein the cellulose acetate has an acetic acid content in the range of 58.0 to 62.5%.

4. The optical compensatory sheet as defined in claim 1, wherein the cellulose acetate has an acetic acid content in the range of 55.0 to 58.0%.

5. The optical compensatory sheet as defined in claim 1, wherein the compound has a molecular structure that does not cause a steric hindrance of the configuration between the two aromatic rings.

6. The optical compensatory sheet as defined in claim 1, wherein the cellulose acetate support is formed by a solvent casting method.

7. An ellipsoidal polarizing plate comprising a transparent protective film, a polarizing membrane, a cellulose acetate support and an optically anisotropic layer containing a discotic liquid crystal molecule in this order, wherein the cellulose acetate support has a $Bth^{550}$ birefringence defined by the following formula in the range of 0.0007 to 0.004:

$$Bth^{550}=\{(nx+ny)/2\}-nz$$

in which each of nx and ny is a principal refractive index measured by light of 550 nm in plane of the support; and nz is a principal refractive index measured by light of 550 nm along a thickness direction of the support, wherein the cellulose acetate support has a thickness in the range of 40 to 120 μm, wherein the cellulose acetate support contains a compound having at least two aromatic rings, the compound being present in an amount of 0.3 to 20 weight parts based on 100 weight parts of the cellulose acetate, and wherein the compound having at least two aromatic rings has a plane of a π bond of at least seven carbon atoms and has a molecular weight in the range of 300 to 800.

8. The ellipsoidal polarizing plate as defined in claim 7, wherein the cellulose acetate support has a $Bi^{550}$ birefringence defined by the following formula in the range of 0.0002 to 0.003:

$$Bi^{550}=|nx-ny|$$

in which each of nx and ny is a principal refractive index measured by light of 550 nm in plane of the support.

9. The ellipsoidal polarizing plate as defined in claim 7, wherein the cellulose acetate has an acetic acid content in the range of 58.0 to 62.5%.

10. The ellipsoidal polarizing plate as defined in claim 7, wherein the cellulose acetate has an acetic acid content in the range of 55.0 to 58.0%.

11. The ellipsoidal polarizing plate as defined in claim 7, wherein the compound has a molecular structure that does not cause a steric hindrance of the configuration between the two aromatic rings.

12. The ellipsoidal polarizing plate as defined in claim 7, wherein the cellulose acetate support is formed by a solvent casting method.

13. A liquid crystal display comprising a liquid crystal cell and two polarizing elements arranged on both sides of the liquid crystal cell, at least one of said polarizing elements being an ellipsoidal polarizing plate comprising a transparent protective film, a polarizing membrane, a cellulose acetate support and an optically anisotropic layer containing a discotic liquid crystal molecule in this order, wherein the cellulose acetate support has a $Bth^{550}$ birefringence defined by the following formula in the range of 0.0007 to 0.004:

$$Bth^{550}=\{(nx+ny)/2\}-nz$$

in which each of nx and ny is a principal refractive index measured by light of 550 nm in plane of the support; and nz is a principal refractive index measured by light of 550 nm along a thickness direction of the support, wherein the cellulose acetate support has a thickness in the range of 40 to 120 μm, wherein the cellulose acetate support contains a compound having at least two aromatic rings, the compound being present in an amount of 0.3 to 20 weight parts based on 100 weight parts of the cellulose acetate, and wherein the compound having at least two aromatic rings has a plane of a π bond of at least seven carbon atoms and has a molecular weight in the range of 300 to 800.

14. The liquid crystal display as defined in claim 13, wherein the optically anisotropic layer is arranged between the liquid crystal cell and the cellulose acetate support.

15. The liquid crystal display as defined in claim 13, wherein the cellulose acetate support has a $Bi^{550}$ birefringence defined by the following formula in the range of 0.0002 to 0.003:

$$Bt^{550}=|nx-ny|$$

in which each of nx and ny is a principal refractive index measured by light of 550 nm in plane of the support.

16. The liquid crystal display as defined in claim 13, wherein the liquid crystal cell is a cell of a vertically aligned mode, an optically compensatory bend mode or a hybrid aligned nematic mode.

* * * * *